(12) United States Patent
Gill et al.

(10) Patent No.: US 7,641,107 B1
(45) Date of Patent: *Jan. 5, 2010

(54) FAULT MONITORING AND NOTIFICATION SYSTEM FOR AUTOMATED BANKING MACHINES

(75) Inventors: Robert Bradley Gill, Hamilton (CA); Gaby Baghdadi, Markham (CA); Robert D. Symonds, Novelty, OH (US); Irek Singer, Mississauga (CA); Peter St. George, Mississauga (CA); Roy Shirah, Clover, SC (US); Timothy M. Stock, Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 155 days.

This patent is subject to a terminal disclaimer.

(21) Appl. No.: 11/904,639

(22) Filed: Sep. 27, 2007

Related U.S. Application Data

(62) Division of application No. 10/896,209, filed on Jul. 20, 2004, now Pat. No. 7,366,646, which is a division of application No. 09/411,013, filed on Oct. 1, 1999, now Pat. No. 6,768,975, which is a division of application No. 08/813,511, filed on Mar. 7, 1997, now Pat. No. 5,984,178.

(60) Provisional application No. 60/032,160, filed on Nov. 29, 1996.

(51) Int. Cl.
*G06F 17/50* (2006.01)
*G06G 7/62* (2006.01)

(52) U.S. Cl. .................. 235/379; 235/380; 235/382; 703/13; 434/345; 902/38; 902/40

(58) Field of Classification Search ................. 235/379, 235/380, 382; 434/345; 703/13; 902/38, 902/40
See application file for complete search history.

(56) References Cited

U.S. PATENT DOCUMENTS 4,282,424 A * 8/1981 Hirose ........................ 235/379
4,317,957 A 3/1982 Dendrow (Continued)

OTHER PUBLICATIONS

Deitrich, Dave; Patterson, Walter; Warner, Byron, "Class Project Group N Report" Georgia Institute of Technology, CS 6751, Summer 1994, pp. Part 2: ATM design prototypes pp. 1-18, Interface Sketches pp. 10-5, Part III Final Design pp. 1-7.

(Continued)

*Primary Examiner*—Steven S Paik
*Assistant Examiner*—Minghui Yang
(74) *Attorney, Agent, or Firm*—Ralph E. Jocke; Christopher L. Parmelee; Walker & Jocke

(57) ABSTRACT

An automated banking machine includes a card reader operative to read data from user cards and to use the data read by the card reader in operation of the machine. Status messages are received from automated banking machines operating in a network. The messages are received by an event management system operating at least one computer in operative connection with a data store. The data store includes information representative of the banking machines in the network, status messages generated by the banking machines and actions to be taken including entities to be notified of conditions which cause status messages to be sent by the various banking machines.

7 Claims, 58 Drawing Sheets

U.S. PATENT DOCUMENTS

| | | |
|---|---|---|
| 4,998,206 A | 3/1991 | Jones et al. |
| 5,119,465 A | 6/1992 | Jack et al. |
| 5,184,179 A | 2/1993 | Tarr et al. |
| 5,253,167 A | 10/1993 | Yoshida et al. |
| 5,355,364 A | 10/1994 | Abali |
| 5,546,072 A | 8/1996 | Creuseremee et al. |
| 5,551,875 A | 9/1996 | Shaffer et al. |
| 5,563,393 A | 10/1996 | Coutts |
| 5,566,339 A | 10/1996 | Perholtz et al. |
| 5,619,024 A | 4/1997 | Kolls |
| 5,694,323 A | 12/1997 | Koropitzer et al. |
| 5,694,580 A | 12/1997 | Narita et al. |
| 5,764,226 A | 6/1998 | Consolatti et al. |
| 5,896,523 A | 4/1999 | Bissett et al. |
| 5,984,178 A | 11/1999 | Gill et al. |
| 5,999,908 A | 12/1999 | Abelow |
| 6,279,826 B1 | 8/2001 | Gill et al. |
| 7,366,646 B1 * | 4/2008 | Gill et al. .......... 703/13 |

OTHER PUBLICATIONS

Jorgensen, Paul C. and Erickson, Carl, "Object-Oriented Integration Testing", Communication of the ACM, vol. 37, N. 9, Sep. 1994, pp. 30-38.

* cited by examiner

ATMs

| Field | Value |
|---|---|
| Terminal ID | B001 |
| Controller ID | 1link |
| ATM Group | Group-1 |
| Location ID | LOCN-2 |
| FL Diebold Product Key | 1234FL |
| SL Diebold Product KEY | 1234 |
| Diebold Product Description | Walk-up ATM (without Quickcash Fascia) |
| Voice File | |
| Base ATM Type | 911 TABS |
| Actual ATM Type | 1072 (4785)Walk-up ATM (without Quickcash Fascia) |
| ATM Mode | 911 Native Mode |
| Model Number | T1062L |
| Serial Number | 01000ML02000 |

Status
- Status: Active — Reasons...
- Status Date: 12/13/1995 21:39:24
- Operational Status: Operational

Statistics
- Current Trouble Ticket: 66
- Trouble Tickets To Date: 9

Update DECAL   Comments...

Locations

| | |
|---|---|
| Location ID | LOCN-002 |
| Location Name | Fourth Financial - Branch 2 |
| Address | 12345 Maim St. |
| City | Any City |
| Country Code | USA  Zip Code 12345-6789 |
| | State MD |
| Intersection | Main St. and West St. |
| Voice File | |
| Diebold Site Number | 000000001 |

Contact Name: Mr. Brown

Business Hours

| | Open | Close |
|---|---|---|
| Monday | 09:00 | 16:30 |
| Tuesday | 09:00 | 16:30 |
| Wednesday | 09:00 | 16:30 |
| Thursday | 09:00 | 16:30 |
| Friday | 09:00 | 17:00 |
| Saturday | 09:00 | 13:30 |
| Sunday | 00:00 | 00:00 |

Status

| | |
|---|---|
| Status | Active |
| Status Date | 08/07/1996 08:51:01 |

Reasons

Update DECAL  Comments...

Vendors

Vendor ID: FourthFin
Name: Fourth Financial
Address: 123 Any Street
City: Any City    State: MD
Country Code: USA    Zip Code: 12345-6789

Contact 1
Name: Mrs. Johnson
Phone: (888) 555-1234
Fax: (888) 555-1235

Contact 2
Name: Mrs. Smith
Phone: (888) 555-1234
Fax: (888) 555-1235

Allow ATTN message to close calls: YES

Comments...

| Holidays | | |
|---|---|---|
| Location ID | Date | Description |
| ALL | 01/01/1996 | New Years Day |
| ALL | 01/15/1996 | Martin Luther King, Jr. Day |
| ALL | 02/19/1996 | President's Day |
| ALL | 05/27/1996 | Memorial Day |
| ALL | 07/04/1996 | Independence Day |
| ALL | 09/02/1996 | Labor Day |
| ALL | 10/14/1996 | Columbus Day |
| ALL | 11/11/1996 | Veteran's Day |
| ALL | 11/28/1996 | Thanksgiving Day |
| ALL | 12/25/1996 | Christmas Day |

FIG. 15

Message Recipients

| Pram SID | Contact Name | Mailbox Number | Password | Phone Number | Fax Number | Paper Number |
|---|---|---|---|---|---|---|
| 4 | SITE ID | 9999 | | | | |
| 177 | ADELPHIUNI | 081 | | 6256 | 9-604-9236 | |
| 155 | ANNANDALE | 507 | | 5081 | 9-422-9117 | |
| 188 | ANNAPOLIS | 066 | | 5507 | 9-703-914-0457 | |
| 174 | ARDMOREARD | 026 | | 85066 | 9-1-410-266-7891 | |
| 164 | ASPENHILL | 009 | | 5026 | 9-773-4516 | |
| 113 | AVONDALE | 003 | | 5009 | 9-301-460-6769 | |
| 161 | BELPRE | 031 | | 5003 | 9-301-864-7853 | |
| 159 | BELTSVILLE | 113 | | 5031 | 9-301-781-8092 | |
| 145 | BETHESDAW | 105 | | 5113 | 9-301-937-3821 | |
| 171 | BLAIRPARK | 010 | | 5105 | 9-718-8077 | |
| 126 | BRANCHAVE | 037 | | 5010 | 9-585-7652 | |
| 124 | BRANCHVILLE | 017 | | 5037 | 9-301-899-2055 | |
| 141 | BUCKINGHAM | 502 | | 5017 | 9-301-441-4519 | |
| 107 | BURTONSVIL | 098 | | 5502 | 9-703-528-0560 | |
| 146 | CABINJOHN | 029 | | 5089 | 9-301-421-1477 | |
| 158 | CALVERTON | 025 | | 5029 | 9-299-1722 | |
| | | | | 5025 | 9-301-572-5781 | |

FIG. 16

| DATA FIELD NAME | DESCRIPTION |
|---|---|
| ATM_MODE_DESC | Emulation mode which the ATM is running. |
| ATM_MODEL_NUMBER | Model number of the ATM. |
| ATM_SERIAL_NUMBER | Serial number of the ATM. |
| ATM_SERVICE_GRP_DESC | Name of the ATM group associated with the ATM. |
| ATM_STATUS_DESC | Indicates the fault monitoring status of the ATM. |
| ATM_TYPE_DESC | Type of ATM. |
| CONSUMER_STATUS_DESCRIPTION | Description of the ATM status. |
| CONTACT_NAME | Point of contact at the site. |
| DEVICE_ID_DESC | Description of the failed component on the ATM. |
| DS_CORRECTIVE_ACTION | Device status corrective action. |
| DS_STATUS_DESCRIPTION | Device status description. |
| FAULT_CODE | EMS fault code associated with the event. |
| FAULT_DESCRIPTION | Description of the fault. |
| FAULT_SHORT_DESCRIPTION | Abbreviated description of the fault. |
| FC_CORRECTIVE_ACTION | Fault code corrective action. |
| LUNO | ATM logical unit number. |
| MESSAGE_TYPE_DESC | Identifies the message as solicited or unsolicited. |
| NETWORK_ID | Identifies the network associated with the terminal. |
| PROBLEM_ID | Trouble ticket numbered generated by the EMS system. |
| PROBLEM_STATUS | Abbreviated trouble ticket status. |
| PROBLEM_STATUS_DESC | Description of the trouble ticket status. |
| SITE_ADDR1 | Address where the site is located. |
| SITE_ADDR2 | Holds additional address information. |
| SITE_CITY | City where the site is located. |
| SITE_COUNTRY | Country where the site is located. |
| SITE_ID | System identifier of the site associated with the ATM. |
| SITE_NAME | Identifies the site where the ATM is located. |
| SITE_STATE | State where the site is located. |
| SITE_ZIP_CODE | Zip code of the site location. |
| STATUS_BYTES | Detailed service status bytes from the fault messages. |
| STATUS_DATE | Date which the event occurred. |
| STATUS_TIME | Time which the event occurred. |
| TERM_ID | Identifies the terminal associated with the event. |

FIG. 17

| | | Trouble Ticket Monitor | | | | |
|---|---|---|---|---|---|---|
| Enter Selection Critera | | | | | | |
| ☒ Open ☐ Canceled | | Location I.D. | | | Operational Status | |
| ☒ Notified ☒ Pending Close | | | | | | |
| ☒ Acknowledged ☐ Closed | | Terminal I.D. | | | | |
| ☒ Onsite | | | | | | |
| | | Fault Code | | | | |

| NEW | Ticket Number | Status | Terminal I.D. | Open Date | Fault Code | Operational Status | Most Recent Action Event |
|---|---|---|---|---|---|---|---|
| | 1934 | Open | B002 | 07/21/1996 09:10 | CUST:MaintCall | Partially Operational | Call Create |
| | 1933 | Notified | B001 | 07/21/1996 09:00 | CUST:PMCall | Operational | DECAL Service Call |
| | 1932 | Notified | B001 | 07/21/1996 08:59 | CUST:MaintCall | Operational | DECAL Service Call |

Open Date: 07/20/1996

July 1996

| SUN | MON | TUES | WED | THUR | FRI | SAT |
|---|---|---|---|---|---|---|
| | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 | | | |

ATM Group

Action Log...    Detail...    ☐ Auto Watch with interval   2 Minute(s)
DECAL Call...   Calls...      Location View...

Click on down arrow button to access the
drop down list. Click on selection from the
list and the drop down list will close.
Or click on field, and type your selection.

Trouble Ticket History

Enter Selection Critera

☒ Canceled
☒ Closed

Location I.D. [TEST]
Terminal I.D. [ ]
Fault Code [ ]

From Date [ ]
To Date [ ]
ATM Group [ ]

| Ticket Number | Terminal I.D. | Open Date | Closed Date | Device | Fault | Status |
|---|---|---|---|---|---|---|
| 1436 | TEST | 06/06/1996 14:05 | 06/06/1996 14:50 | Consumer Printer | PRN PaperOut | Closed |

1/1

[Action Log....] [Detail...] [Calls...]

Fault Actions

| ATM Group | Controller | Location ID | Terminal ID | ATM Type | Device Type | Fault Code | Thresholds | Chk Ord | Action |
|---|---|---|---|---|---|---|---|---|---|
| Group 1 | ALL | ALL | ALL | ALL | ALL | DISP:LoBillOut | Preceded by DISP:HiPickerErr within last 30 minutes | 0 | Fault Procedure (1st Line) B |
| Group 1 | ALL | ALL | ALL | ALL | ALL | DISP:LoBillOut | Preceded by DISP:HiBillFit within last 30 minutes | 1 | Fault Procedure (1st Line) B |
| Group 1 | ALL | ALL | ALL | ALL | ALL | DISP:LoBillOut | Preceded by: DISP:HiBillOut within last 30 minutes | 2 | Fault Procedure (1st Line) B |
| Group 1 | ALL | ALL | ALL | ALL | ALL | DISP:LoBillOut | At least 1 occurrence | 3 | Fault Procedure (1st Line) A |
| Group 1 | ALL | ALL | ALL | ALL | ALL | DEP:CusTimeOut | At least 1 occurrence | 0 | Fault Procedure (1st Line) A |
| Group 1 | ALL | ALL | ALL | ALL | ALL | CARD:CaptFailed | At least 2 occurrences in the last 30 minutes | 0 | Fault Procedure (1st Line) A |
| Group 1 | ALL | ALL | ALL | ALL | ALL | DISP:LoBillFit | Preceded by: DISP:HiPickErr within last 30 minutes | 0 | Fault Procedure (1st Line) B |
| Group 1 | ALL | ALL | ALL | ALL | ALL | DISP:LoBillFit | At least 1 occurrence | 1 | Fault Procedure (1st Line) A |

FIG. 29

Thresholds

| Current Fault Number | Occurrences | Minutes | Fault Code 1 | Fault Code 2 | Prior Fault Occurrences Fault Code 3 | Fault Code 4 | Minutes |
|---|---|---|---|---|---|---|---|
| 1 | 1 |  | At least 1 occurrence |  |  |  |  |
| 2 |  | 30 | At least 2 occurrences in 30 minutes |  |  |  |  |
| 3 |  | 30 | At least 3 occurrences in 30 minutes |  |  |  |  |
| 4 |  | 30 | At least 4 occurrences in 30 minutes |  |  |  |  |
| 1 |  | 30 | DISP:HiBillFit Preceded by DISP:HiBillFit within last 30 minutes |  |  |  | 30 |
| 1 |  | 30 | DISP:HiBillOut Preceded by DISP:HiBillOut within last 30 minutes |  |  |  | 30 |
| 1 |  | 30 | DISP:HiPickErr Preceded by DISP:HiPickErr within last 30 minutes |  |  |  | 30 |
| 1 |  | 30 | DISP:LoPickErr Preceded by DISP:LoPickErr within last 30 minutes |  |  |  | 30 |
| 1 |  | 2 | MAINT: AttnMsg Preceded by: MAINT:AttnMsg within last 2 minutes |  |  |  | 2 |

Action Procedures

| ACTION | ACTION CATEGORY | DESCRIPTION |
|---|---|---|
| (None) | Miscellaneous | A service vendor is not notified and no action is carried out by EMS. |
| Close Trouble Ticket after Attention Msg/Logon sequence | Miscellaneous | The trouble ticket status will change to closed when this sequence of messages is received from the ATM. For the service vendor resolving the trouble ticket, the Allow Attn Msg to close trouble ticket field in the Vendor window must be set to 'Yes'. If the field is set to 'No' EMS will not change the trouble ticket status. |
| Create/open Trouble Ticket | Miscellaneous | EMS will open a trouble ticket only. A service vendor will not be notified. |
| Dispatch 1st Line Diebold | Notification Procedure | Send a message to Diebold thru the DECAL PC. No escalation procedures are associated with this action. |
| Dispatch 1st Vendor By Fax | Notification Procedure | Send a Fax to the 1st. Line Vendor. No escalation procedures are associated with this action. |
| Dispatch 1st Line Vendor By Page | Notification Procedure | Send a message by pager to the 1st. Line Vendor. No escalation procedures are associated with this action. |
| Dispatch 1st Line Vendor By Voice | Notification Procedure | Call the 1st. Line Vendor by phone. No escalation procedures are associated with this action. |
| Dispatch 2nd Line Diebold | Notification Procedure | Send a message to Diebold through the DECAL PC. No escalation procedures are associated with this action. |
| Dispatch 2nd Line Vendor By Fax | Notification Procedure | Send a Fax to the 2nd. Line Vendor. No escalation procedures are associated with this action. |
| Dispatch 2nd Line Vendor By Page | Notification Procedure | Send a message by pager to the 2nd. Line Vendor. No escalation procedures are associated with this action. |
| Dispatch 2nd Line Vendor By voice | Notification Procedure | Call the 2nd. Line Vendor by phone. No escalation procedures are associated with this action. |
| Enter Maintenance Mode | Miscellaneous | If there is a current trouble ticket associated with an ATM that sends this logon message, EMS will change the status of the trouble ticket to onsite. If there is no trouble ticket EMS logs the message and does not execute an action. |
| Enter Supply Mode | Miscellaneous | If there is a current trouble ticket associated with an ATM that sends this logon message, EMS will change the status of the trouble ticket to onsite. If there is no trouble ticket EMS logs the message and does not execute an action. |
| Fault Procedure (1st Line) - A | fault Procedure | Refer to Table for specific information on these procedures. |
| Fault Procedure (1st Line) - B | Fault Procedure | Refer to Table for specific information on these procedures. |

FIG. 31

| ACTION NAME | ACTION CATEGORY | DESCRIPTION |
|---|---|---|
| Fault Procedure (1st Line) C | Fault Procedure | Refer to Table for specific information on these procedures. |
| Fault Procedure (2nd Line) A | Fault Procedure | Refer to Table for specific information on these procedures. |
| Fault Procedure (2nd Line) B | Fault Procedure | Refer to Table for specific information on these procedures. |
| Notify Administrator By Fax (Dbms/Internal Error) | Notification Procedure | Send a Fax to the Administrator. No escalation procedures are associated with this action. |
| Notify Branch By Fax | Notification Procedure | Send a Fax to the branch. No escalation procedures are associated with this action. |
| Notify Branch By Page | Notification Procedure | Send a message by pager to the branch. No escalation procedures are associated with this action. |
| Notify Branch By Voice | Notification Procedure | Call the branch by phone. No escalation procedures are associated with this action. |
| Notify Diebold By Page | Notification Procedure | Send a message by pager to Diebold. No escalation procedures are associated with this action. |
| Notify Diebold By Page: PC Down | Notification Procedure | Send a message by pager to Diebold. No escalation procedures are associated with this action. |
| Notify Diebold By Voice | Notification Procedure | Call Diebold by phone. No escalation procedures are associated with this action. |
| Notify Operations By Fax | Notification Procedure | Send a Fax to the operations department. No escalation procedures are associated with this action. |
| Notify Operations By Voice | Notification Procedure | Call the operations department by phone. No escalation procedures are associated with this action. |
| Notify Operations By Voice: Outserve ATM | Notification Procedure | Call the operations department by phone to request that an ATM be placed out of service. No escalation procedures are associated with this action. |
| Notify Operator By Page | Notification Procedure | Send a message by pager to the operations department. No escalation procedures are associated with this action. |
| Notify Site Manager By Voice | Notification Procedure | Call the Site Manager by phone. No escalation procedures are associated with this action. |
| Out-of Maintenance/Supply Mode | Miscellaneous | If there is a current trouble ticket associated with an ATM that sends this logoff message, EMS will change the status of the trouble ticket to pending close. If there is no trouble ticket EMS logs the message and does not execute an action. |
| Out-of-Supply Mode | Miscellaneous | If there is a current trouble ticket associated with an ATM that sends this logoff message, EMS will change the status of the trouble ticket to pending close. If there is no trouble ticket EMS logs the message and does not execute an action. |
| Place ATM Out Of Service | Miscellaneous | Reserved for future use. |

Scheduler

| Scheduled At | Action | Action's Details | Trouble Ticket Number | Schedule Used | Canceled ? | Done ? |
|---|---|---|---|---|---|---|
| 09/17/1996 11:42:53 | Execute State (if notification) failed) | Notify Branch By Voice | 134 | After 10 minutes | ☐ | ☒ |
| 09/17/1996 11:42:55 | Execute State (if problem is not acknowledged) | Notify Branch By Fax | 134 | After 10 minutes | ☐ | ☒ |
| 09/17/1996 11:44:13 | Execute State (if problem is not acknowledged) | Notify Branch By Voice | 133 | After 15 minutes | ☐ | ☒ |
| 09/17/1996 11:47:55 | Execute State (if problem is not acknowledged) | Notify Branch By Voice | 134 | After 15 minutes | ☐ | ☒ |
| 09/17/1996 11:49:14 | Execute State (if problem is not acknowledged) | Notify Branch By Voice | 133 | After 20 minutes | ☐ | ☒ |
| 09/17/1996 11:52:56 | Execute State (if problem is not acknowledged) | Notify Branch By Voice | 134 | After 20 minutes | ☐ | ☒ |
| 09/17/1996 12:00:45 | Execute State (if problem is not responded to) | Notify Operations By Voice | 129 | After 2 hours | ☐ | ☒ |
| 09/17/1996 12:21:40 | Execute State (if problem is not responded to) | Notify Operations By Voice | 128 | After 3 hours | ☐ | ☐ |

Call Details

| Field | Value | | Field | Value |
|---|---|---|---|---|
| Call Numbers | 1 | | Call Type | First Line |
| Vendor | Diebold | | | |
| Vendor Call Number | 343658000 | | Call Date | 07/21/96 09:03 |
| P.O. Number | | | Effective Date | 07/21/96 09:03 |
| Priority | Critical | | Notify Date | 07/21/96 09:03 |
| Service Code | First Line Service | | Acknowledge Date | 07/21/96 09:04 |
| Contact Name | DECAL_PC | | Commit Date | 07/21/96 10:00 |
| | | Call Status | Closed | ETA Date | 07/21/96 10:05 |
| | | Incomplete Code | | Arrive Date | 07/21/96 10:15 |
| | | | | Complete Date | 07/21/96 10:30 |

Update Comment:
Comments to vendor:

Vendor Log:
Call "Notified" through DECAL-PC
Call "Acknowledged" through DECAL-PC
CALL NUMBER 34365800   FLA-SERIES 1073 LIMITED ON-S NM 04/95 CURRENCY IS NOT BEING DISPENSED FROM THE HI SIDE CASSETTE DEVICE STATUS :28 018000000000000200 CUST PROD=B060 SITE=MAIN PRB.#= 1286 STAT=DG PRTY=A CUSTOMER ORGINALLY REQUESTED Buttons: Update, Insert, First, Previous, Next, Last, Close DECAL Update

ATM Summary Report

Enter Selection Criteria

- ● Year  Date: 04/28/1996
- ○ Month
- ○ Day

Location ID: [    ]   Terminal ID: [    ]

Report Period: Year 04/28/1996

Report Date: 04/28/1996 3:51:42PM
Page 1 of 2

ATM Summary Report

| ATM | | Number of Incidents | Average Response Time (1hours) | Degrade Time (1hours) | DownTime (1hours) | Availability |
|---|---|---|---|---|---|---|
| Fourth Financial Main Branch | B013 | 10 | 0.33 | 93.22 | 15.65 | 97.36% |
| Branch Totals: | | | | | | |
| Fourth Financial First Avenue Branch | B016 | 3 | 0.40 | 15.20 | 2.50 | 98.45% |
| Branch Totals: | | | | | | |
| Fourth Financial Second Avenue Branch | B007 | 6 | 0.45 | 18.26 | 1.50 | 99.80% |
| Branch Totals: | | | | | | |
| Fourth Financial Third Avenue Branch | B004 | 4 | 0.20 | 5.10 | 0.95 | 99.26% |
| Branch Totals: | | | | | | |

ATM Availability Report

Enter Selection Criteria

- ○ Year
- ○ Month
- ● Day

Date: 09/17/1996    Location ID: [ ]    Terminal ID: B001

Report Period:
Year
09/17/1996

Report Date: 9/18/1996 11:44:36 AM
Page 1 of 1

ATM Availability Report

Fourth Financial

ATM B001

| Category | Degrade Hours | Down Time Hours | Availability |
|---|---|---|---|
| Depositor Down | 0.95 | 0.25 | 99.21% |
| Hard Fault | 0.10 | 0.00 | 100.00% |
| Jam or Obstruction | 0.17 | 0.10 | 98.03% |
| Statement Printer Down | 0.03 | 0.00 | 100.00% |
| Supplies Out | 1.35 | 0.00 | 100.00% |
| ATMS Total: | 2.60 | 0.35 | 100.00% |
| Location Totals: | 2.60 | | 100.00% |
| Grand Totals | 2.60 | 0.35 | 99.76% |

System Availability Report

Enter Selection Criteria

- ⦿ Year  Date: 12/31/1996   Location ID: [ ]   Terminal ID: [ ]
- ○ Month
- ○ Day Report Period:
Year
12/31/1996

Report Date: 12/31/1996 11:54:36 AM
Page 1 of 1

| Category | Degraded Hours | Down Time Hours | Percentage |
|---|---|---|---|
| ALL | 1568.34 | 948.63 | 7.71% |
| Card Retained | 88.54 | 0.00 | 0.00% |
| Container full | 526.78 | 356.14 | 2.08% |
| Hard Fault | 2835.12 | 1862.25 | 15.13% |
| INTERNAL | 178.96 | 49.56 | 0.40% |
| Jam or Obstruction | 3126.39 | 1236.04 | 10.04% |
| Left Open or Unlocked | 66.81 | 325.19 | 2.64% |
| Supplies Low | 258.39 | 0.00 | 0.00% |
| Supplies Out | 3926.13 | 7529.27 | 62.00% |
| Time Out | 15.63 | 0.00 | 0.00% |
| Grand Totals: | 17126.89 | 12307.08 | |

Full Capacity (ATM Hours): 657000.00    System Availability: 98.13%

NODE (76)

| NODE | | |
|---|---|---|
| NODE_SID | <pk> | INTEGER | not null |
| NODE_NUM | | VARCHAR(15) | not null |
| NODE_TYPE_SID | | SMALLINT | not null |
| LOCN_SID | | INTEGER | null |
| PARENT_NODE_SID | | INTEGER | not null |
| MAX_CHILD_NODES | | SMALLINT | null |
| IN_MSG_FMT_SID | | SMALLINT | null |
| OUT_MSG_FMT_SID | | SMALLINT | null |
| CURRENCY_CODE | | CHAR(3) | null |
| PHYSICAL_ADDR | | CHAR(20) | null |
| PHYSICAL_ADDR_LEN | | SMALLINT | null |
| MSG_PRIORITY | | SMALLINT | null |
| SHUTDOWN_STATUS | | SMALLINT | null |
| SESS_STATUS | | SMALLINT | not null |
| SESS_STATUS_DATE | | TIMESTAMP | null |
| STATUS | | CHAR(3) | null |
| REASON_MASK | | CHAR(10) | null |
| STATUS_DATE | | TIMESTAMP | null |
| DESCRIPTION | | VARCHAR(30) | null |
| ACTIVITY_COUNT | | INTEGER | null |
| LAST_ACTIVITY_DATE | | TIMESTAMP | null |
| BATCH_ID | | INTEGER | null |
| CLERK_SID | | INTEGER | null |
| CLERK_NUM | | VARCHAR(15) | null |
| ROLE_SID | | SMALLINT | null |
| LAST_CLERK_FN | | SMALLINT | null |
| LAST_CLERK_FN_DATE | | TIMESTAMP | null |
| LAST_TRACE | | INTEGER | null |
| PENDING_REQ_SID | | INTEGER | null |
| PEK_SID | | INTEGER | null |
| KEK_SID | | INTEGER | null |
| DEK_SID | | INTEGER | null |
| AEK_SID | | INTEGER | null |
| PIN_ENCR_KEY_NEW | | CHAR(16) | null |
| PIN_ENCR_DATE | | TIMESTAMP | null |
| PIN_ENCR_KEY | | CHAR(16) | null |
| PIN_ENCR_TYPE | | CHAR(1) | null |
| LAST_REQ_SID | | INTEGER | null |
| LAST_IN_MSG_SID | | SMALLINT | null |
| LAST_IN_MSG_DATE | | TIMESTAMP | null |
| LAST_OUT_MSG_SID | | SMALLINT | null |
| LAST_OUT_MSG_DATE | | TIMESTAMP | null |
| APPLICATION_SID | | SMALLINT | null |
| IPC_TYPE_SID | | SMALLINT | null |

NODE_TYPE_LINE (78)

| NODE_TYPE_LINE | | |
|---|---|---|
| NODE_SID | <pk> | INTEGER | not null |
| LINE_TYPE_SID | | SMALLINT | not null |
| LINE_GRP_NODE_SID | | INTEGER | null |
| DRIVER_NAME | | VARCHAR(30) | null |
| PROCESS_PRIORITY | | SMALLINT | not null |
| PORT_DEVICE_NAME | | VARCHAR(30) | null |
| PORT_NUMBER | | SMALLINT | null |
| CCT_ID | | CHAR(16) | null |
| COMM_CONNECTION | | CHAR(1) | null |
| COMM_TIMING | | CHAR(2) | null |
| COMM_NETWORK | | CHAR(3) | null |
| COMM_PROTOCOL | | CHAR(1) | null |
| REMOTE_END_TYPE | | CHAR(2) | null |
| LINK_ROLE | | VARCHAR(8) | not null |
| POLL_ADDR | | SMALLINT | null |
| LU_NAME | | SMALLINT | null |
| LU_CNT | | SMALLINT | null |
| MAX_RETRY | | INTEGER | null |
| TIME_OUT_RETRY | | INTEGER | null |
| MODEM_SID | | SMALLINT | null |
| SPEED | | CHAR(1) | null |
| PARITY | | SMALLINT | null |
| DATA_BITS | | SMALLINT | null |
| STOP_BITS | | CHAR(1) | null |
| PACING | | SMALLINT | null |
| FLOW | | VARCHAR(60) | null |
| FILE_PROC_JOB_SID | | | |
| FILE_UPLOAD_DIR | | | |

LINE_TYPE

| LINE_TYPE | | |
|---|---|---|
| LINE_TYPE_SID | <pk> | SMALLINT | not null |
| DESCRIPTION | | VARCHAR(30) | not null |
| DISPLAY_IND | | CHAR(1) | not null |

MODEM

| MODEM | | |
|---|---|---|
| MODEM_SID | <pk> | SMALLINT | not null |
| MODEM_NUM | | VARCHAR(15) | not null |
| MODEL | | VARCHAR(30) | not null |
| CONNECT_MSG_LEN | | SMALLINT | null |
| CONNECT_MSG | | VARCHAR(99) | null |
| INIT_MSG_LEN | | SMALLINT | null |
| INIT_MSG | | VARCHAR(99) | null |
| DISCONNECT_MSG_LEN | | SMALLINT | not null |
| DISCONNECT_MSG | | VARCHAR(30) | null |
| HANGUP_MSG_LEN | | SMALLINT | null |
| HANGUP_MSG | | VARCHAR(30) | null |
| END_MSG_TOKEN | | SMALLINT | not null |
| DESCRIPTION | | VARCHAR(30) | null |

NODE_TYPE_PROCESS (80)

| NODE_TYPE_PROCESS | | |
|---|---|---|
| NODE_SID | <pk> | INTEGER | not null |
| PROCESS_TYPE_SID | | SMALLINT | not null |
| SERVER_TYPE_SID | | SMALLINT | null |
| IP_PORT_ID | | SMALLINT | null |
| MIN_THREAD | | SMALLINT | not null |
| MAX_THREAD | | SMALLINT | null |
| PROCESS_PRIORITY | | SMALLINT | null |
| EPP_PRIORITY | | SMALLINT | null |
| DEVICE_TYPE | | CHAR(3) | null |
| DRIVER_NAME | | VARCHAR(30) | null |
| SENDER_NAME | | VARCHAR(30) | null |
| LISTENER_NAME | | VARCHAR(30) | null |
| CONTEXT_TABLE_NAME | | VARCHAR(20) | null |
| SHMEM_NODE_SID | | INTEGER | null |
| CTRL_NAME | | VARCHAR(30) | null |

SERVER (82)

| SERVER | | |
|---|---|---|
| SERVER_SID | <pk> | SMALLINT | not null |
| NAME | | VARCHAR(20) | not null |
| IP_ADDR | | VARCHAR(20) | not null |

PROCESS_TYPE

| PROCESS_TYPE | | |
|---|---|---|
| PROCESS_TYPE_SID | <pk> | SMALLINT | not null |
| DESCRIPTION | | VARCHAR(30) | not null |
| DISPLAY_IND | | CHAR(1) | not null |

NODE_TYPE

| NODE_TYPE | | |
|---|---|---|
| NODE_TYPE_SID | <pk> | SMALLINT | not null |
| DESCRIPTION | | VARCHAR(30) | not null |
| DISPLAY_IND | | CHAR(1) | not null |

MSG_FIELD (88)

| | | |
|---|---|---|
| INT_MSG_SID | <pk> INTEGER | not null |
| MSG_VER | <pk> SMALLINT | not null |
| FIELD_SWITCH_IND | SMALLINT | not null |
| FIELD_MAP_IND | SMALLINT | not null |
| FIELD_NUM | <pk> SMALLINT | not null |
| FIELD_LEN | SMALLINT | not null |
| FIELD_LEN_MIN | SMALLINT | not null |
| VAR_LEN_SID | SMALLINT | not null |
| VAR_LEN_CNT_SID | SMALLINT | not null |
| DATA_LEN_ENCODE_SID | SMALLINT | not null |
| DATA_ENCOD_SID | SMALLINT | not null |
| DATA_FMT_SID | SMALLINT | not null |
| ISO_BIT_SID | SMALLINT | not null |
| ISO_MSG_TYPE | SMALLINT | not null |
| SUBFIELD_SID | SMALLINT | not null |
| FIELD_SWITCH_DATA | VARCHAR(16) | not null |
| FIELD_DLMT | CHAR | not null |

FIELD_MAP (90)

| | | |
|---|---|---|
| INT_MSG_SID | INTEGER | not null |
| ORG_MSG_VER | SMALLINT | not null |
| ORG_FIELD_NUM | SMALLINT | not null |
| ORG_FIELD_DATA | VARCHAR(32) | null |
| ORG_FIELD_LEN | SMALLINT | not null |
| FIELD_LEN | SMALLINT | not null |
| FIELD_LEN_MIN | SMALLINT | not null |
| VAR_LEN_SID | SMALLINT | not null |
| VAR_LEN_CNT_SID | SMALLINT | not null |
| DATA_LEN_ENCOD_SID | SMALLINT | not null |
| DATA_ENCODE_SID | SMALLINT | not null |
| DATA_FMT_SID | SMALLINT | not null |
| FIELD_MAP_DATA | VARCHAR(32) | null |
| FIELD_DLMT | CHAR | null |

MSG_FMT (84)

| | | |
|---|---|---|
| FMT_SID | <pk> INTEGER | not null |
| DESCRIPTION | VARCHAR(30) | not null |
| LAYOUT_SID | SMALLINT | not null |
| DELIMETER | CHAR(1) | null |
| MSG_TYPE_OFFSET | SMALLINT | not null |
| MSG_TYPE_LENGTH | SMALLINT | not null |

MSG_MAP (86)

| | | |
|---|---|---|
| FMT_SID | <pk> INTEGER | not null |
| MSG_TYPE | <pk> VARCHAR(10) | not null |
| INT_MSG_SID | INTEGER | not null |

SHMEM TABLES

| | | |
|---|---|---|
| APPL_SID | <pk> INTEGER | not null |
| TAB_ID | <pk> SMALLINT | not null |
| TAB_NAME | VARCHAR(30) | not null |
| KEY_COLUMN | VARCHAR(30) | null |
| ORDER_BY | VARCHAR(120) | null |
| ROW_MIN | INTEGER | not null |
| ROW_MAX | INTEGER | not null |
| ROW_PERCENTAGE | SMALLINT | not null |
| LOAD_IT | CHAR(1) | null |
| M_OR_O | CHAR(1) | not null |

S_FAULT_RESPONSE

| | | |
|---|---|---|
| DAY | INTEGER | null |
| MONTH | SMALLINT | null |
| YEAR | SMALLINT | null |
| SITE_SID | INTEGER | null |
| ATM_SID | INTEGER | null |
| ACTION_CLASS_SID | SMALLINT | null |
| SITE_CNT | INTEGER | not null |
| ATM_CNT | INTEGER | not null |
| AVG_TIME_ACK | INTEGER | not null |
| AVG_TIME_NOT | INTEGER | not null |
| AVG_TIME_APR | INTEGER | not null |
| AVG_TIME_CLO | INTEGER | not null |
| TRBL_TCKTS_ACK | INTEGER | not null |
| TRBL_TCKTS_NOT | INTEGER | not null |
| TRBL_TCKTS_APR | INTEGER | not null |
| TRBL_TCKTS_CLO | INTEGER | not null |
| DEGRADED_TIME | INTEGER | not null |
| DOWN_TIME | INTEGER | not null |
| TOTAL_TIME | INTEGER | not null |

S_FAULT_OCCURANCE

| | | |
|---|---|---|
| DAY | SMALLINT | null |
| MONTH | SMALLINT | null |
| YEAR | SMALLINT | null |
| SITE_SID | INTEGER | null |
| ATM_SID | INTEGER | null |
| DEVICE_SID | SMALLINT | null |
| FAULT_SID | INTEGER | null |
| OCCURANCES | INTEGER | not null |

S_AVAILBYCLASS

| | | |
|---|---|---|
| DAY | SMALLINT | null |
| MONTH | SMALLINT | null |
| YEAR | SMALLINT | null |
| ATM_SID | INTEGER | not null |
| SITE_SID | INTEGER | not null |
| FAULT_CLASS_SID | SMALLINT | not null |
| DEGRADED_TIME | INTEGER | not null |
| DOWN_TIME | INTEGER | not null |
| TOTAL_TIME | INTEGER | not null |

P_SCHEDULES

| | | | |
|---|---|---|---|
| SCHEDULE_SID | <pk> | INTEGER | not null |
| SCHEDULE_NAME | <pk> | VARCHAR(40) | not null |
| NEXT_BUS_DAY_IND | | CHAR | not null |
| WHEN_BRANCH_OPENS | | CHAR | not null |
| AFTER_X_MINUTES | | SMALLINT | null |
| AT_TIME | | TIME | null |
| EVERY_X_SECONDS | | INTEGER | null |
| MAX_NUM_TIMES | | INTEGER | null |
| MON | | CHAR | not null |
| TUE | | CHAR | not null |
| WED | | CHAR | not null |
| THU | | CHAR | not null |
| FRI | | CHAR | not null |
| SAT | | CHAR | not null |
| DESCRIPTION | | VARCHAR(120) | not null |

P_EXEC_SQL

| | | | |
|---|---|---|---|
| PARM_SID | <pk> | INTEGER | not null |
| SQL_COMMAND | | VARCHAR(1024) | not null |
| COLUMN_SEPARATORS | | CHAR(8) | null |
| ROW_SEPARATORS | | CHAR(4) | null |
| DESCRIPTION | | VARCHAR(120) | not null |

P_SCHEDULE_ACTION

| | | | |
|---|---|---|---|
| PARM_SID | <pk> | INTEGER | not null |
| MMR_ACTION_SID | | INTEGER | not null |
| P_SCHEDULE_SID | | INTEGER | not null |
| DESCRIPTION | | VARCHAR(256) | not null |

SCHEDULER

| | | |
|---|---|---|
| TXN_SID | INTEGER | not null |
| NEXT_ACTION_TIME | TIMESTAMP | not null |
| SCHEDULE_SID | INTEGER | null |
| FUNC_SID | SMALLINT | not null |
| PARM_SID | INTEGER | null |
| REQUESTOR_NODE_SID | INTEGER | not null |
| REQUESTOR_WAIT_PRI | SMALLINT | null |
| CANCELLED_IND | CHAR | null |
| DONE_IND | CHAR | null |
| DATA | INTEGER | null |

ARC_STATUS_MSG_LOG

| Column | Key | Type | Null |
|---|---|---|---|
| STATUS_DATE | <pk> | TIMESTAMP | not null |
| NETWORK_SID | <fk> | INTEGER | null |
| SITE_SID | | INTEGER | null |
| ATM_SID | <fk> | INTEGER | null |
| FAULT_SID | <fk> | INTEGER | null |
| PROBLEM_SID | | INTEGER | null |
| DEVICE_STATUS | | VARCHAR(116) | null |
| STATUS_MSG | | VARCHAR(256) | null |
| DEVICE_STATUS_SID | | INTEGER | null |
| MSG_DATE | | DATE | null |
| MSG_TIME | | TIME | null |
| MSG_TYPE | | CHAR | null |
| STATUS_ID | | CHAR | null |
| LUNO | | VARCHAR(9) | null |

ARC_PROBLEMS

| Column | Key | Type | Null |
|---|---|---|---|
| PROBLEM_SID | <pk,fk> | INTEGER | not null |
| PROBLEM_SOURCE | | CHAR(1) | not null |
| ACTION_CLASS_SID | | SMALLINT | not null |
| OPEN_DATE | | DATE | not null |
| OPEN_TIME | | TIME | not null |
| EFF_DATE | | DATE | null |
| EFF_TIME | | TIME | null |
| SITE_SID | <fk> | INTEGER | not null |
| ATM_SID | <fk> | INTEGER | not null |
| NETWORK_SID | <fk> | INTEGER | not null |
| FAULT_SID | <fk> | INTEGER | not null |
| FAULT_CLASS_SID | | SMALLINT | not null |
| DEVICE_SID | <fk> | SMALLINT | not null |
| DEVICE_STATUS_SID | | INTEGER | null |
| MULT_OCCUR_CNT | | SMALLINT | null |
| ESCALATION_COUNT | | SMALLINT | not null |
| CONSUMER_STATUS | <fk> | CHAR(2) | not null |
| STATUS | | CHAR(3) | not null |
| NOTIFY_DATE | | DATE | null |
| NOTIFY_TIME | | TIME | null |
| ACK_DATE | | DATE | null |
| ACK_TIME | | TIME | null |
| ONSITE_DATE | | DATE | null |
| ONSITE_TIME | | TIME | null |
| OFFSITE_DATE | | DATE | null |
| OFFSITE_TIME | | TIME | null |
| COMPLETE_DATE | | DATE | null |
| COMPLETE_TIME | | TIME | null |
| LAST_DECAL_CMD | <fk> | CHAR(2) | null |
| LAST_DECAL_REQUEST | | TIMESTAMP | null |
| LAST_DECAL_UPDATE | | TIMESTAMP | null |
| LAST_DECAL_RESP | | TIMESTAMP | null |
| LAST_DECAL | <fk> | CHAR(2) | null |
| DECAL_ERROR_CODE | <fk> | CHAR(2) | null |
| LAST_MODIFIED | | TIMESTAMP | null |
| DEVICE_STATUS | | VARCHAR(116) | null |
| PROB_DESCRIPTION | | VARCHAR(500) | not null |
| PARTS_LIST | | VARCHAR(539) | null |
| RESOLUTION_TEXT | | VARCHAR(2000) | null |

FIG. 58

DECAL

| Column | Type | Null |
|---|---|---|
| SEND_PATH | VARCHAR(80) | not null |
| RECV_PATH | VARCHAR(80) | not null |
| SCAN_INTERVAL | TIME | not null |
| ACCEPT_PARTS | CHAR | not null |
| ACCEPT_OPEN_TEXT | CHAR | not null |
| ACCEPT_CLOS_TEXT | CHAR | not null |
| ACCEPT_PRODUCTS | CHAR | not null |
| ACCEPT_SITES | CHAR | not null |
| ACCEPT_MESSAGES | CHAR | not null |
| ACCEPT_CALLS | CHAR | not null |
| SERV_START | TIME | not null |
| SERV_END | TIME | not null |
| DEF_ATM_TYPE_SID | INTEGER | not null |
| DEF_ATM_MODE_SID | INTEGER | not null |
| DEF_NETWORK_SID | INTEGER | not null |
| DEF_SVC_GRP_SID | INTEGER | not null |
| DEF_VENDOR_SID | INTEGER | not null |
| DEF_FAULT_SID | INTEGER | not null |
| DEF_ACTN_CLASS_SID | INTEGER | not null |
| DEF_CONT_NAME | VARCHAR(20) | null |
| DEF_CONT_PHONE | VARCHAR(16) | null |
| LAST_SENT_MSG | VARCHAR(300) | null |
| LAST_SENT_DATE | TIMESTAMP | null |
| LAST_RCVD_MSG | VARCHAR(600) | null |
| LAST_RCVD_DATE | TIMESTAMP | null |

DECAL_LOG

| Column | Key | Type | Null |
|---|---|---|---|
| LOG_DATE | <pk> | TIMESTAMP | not null |
| LOG_ID | | CHAR(2) | null |
| PROBLEM_SID | | INTEGER | null |
| DECAL_PROD_KEY | | VARCHAR(25) | null |
| DECAL_SITE_ID | | VARCHAR(9) | null |
| ERROR_CODE | | CHAR(2) | null |
| STATUS | | CHAR(3) | not null |
| STATUS_DESCRIPTION | | VARCHAR(80) | null |

DECAL_MESSAGE

| Column | Type | Null |
|---|---|---|
| MESSAGE_DATE | TIMESTAMP | null |
| MESSAGE_TEXT | VARCHAR(560) | null |

DECAL_TEXT

| Column | Key | Type | Null |
|---|---|---|---|
| PROBLEM_SID | <pk> | INTEGER | not null |
| CALL_NUM | <pk> | INTEGER | not null |
| TEXT_SEQ_NUM | <pk> | SMALLINT | not null |
| CLOSED_PROBLEM_IND | | CHAR | not null |
| DECAL_TEXT | | VARCHAR(77) | not null |

DECAL_PARTS

| Column | Key | Type | Null |
|---|---|---|---|
| PROBLEM_SID | <pk> | INTEGER | not null |
| CALL_NUM | <pk> | INTEGER | not null |
| PART_SEQ_NUM | <pk> | SMALLINT | not null |
| PART_QUANTITY | | CHAR(3) | not null |
| PART_DESCRIPTION | | CHAR(25) | not null |

| ARC_PROBLEM_ACTIONS | | | |
|---|---|---|---|
| PROBLEM_SID | <pk,fk> | INTEGER | not null |
| ACTION_SEQ | <pk> | INTEGER | not null |
| MMR_ACTION_SID | | INTEGER | not null |
| ACTION_TEXT | | VARCHAR(80) | not null |
| ACTION_RESP | | VARCHAR(40) | null |
| ACTION_TIME | | TIMESTAMP | null |

| ARC_CALLS | | | |
|---|---|---|---|
| PROBLEM_SID | <pk> | INTEGER | not null |
| CALL_NUM | <pk> | INTEGER | not null |
| VENDOR_SID | | INTEGER | not null |
| VENDOR_CALL_NUM | | CHAR(10) | null |
| PO_NUMBER | | VARCHAR(20) | null |
| PRIORITY | | CHAR | not null |
| CALL_STATUS | | CHAR(2) | not null |
| CALL_TYPE | | CHAR | null |
| SERVICE_CODE | | CHAR(2) | null |
| INCOMPLETE_CODE | | CHAR | null |
| RESOLUTION_CODE | | CHAR(6) | null |
| CALL_DATE | | TIMESTAMP | null |
| NOTIFY_DATE | | TIMESTAMP | null |
| ACK_DATE | | TIMESTAMP | null |
| EFF_DATE | | TIMESTAMP | null |
| COMM_DATE | | TIMESTAMP | null |
| ETA_DATE | | TIMESTAMP | null |
| ARRIVE_DATE | | TIMESTAMP | null |
| COMPLETE_DATE | | TIMESTAMP | null |
| CONTACT_DATE | | INTEGER | null |
| UPD_COMMENT | | VARCHAR(77) | null |
| PREV_UPD_COMMENTS | | VARCHAR(770) | null |
| CALL_COMMENTS | | VARCHAR(2000) | null |

FIG. 59

FAULT MONITORING AND NOTIFICATION SYSTEM FOR AUTOMATED BANKING MACHINES

CROSS REFERENCE TO RELATED APPLICATIONS

This application is a divisional of U.S. patent application Ser. No. 10/896,209 filed Jul. 7, 2004, which is a divisional application of U.S. patent application Ser. No. 09/411,013 filed Oct. 1, 1999 (now U.S. Pat. No. 6,768,975) which is a divisional application of U.S. patent application Ser. No. 08/813,511 filed Mar. 7, 1997 (now U.S. Pat. No. 5,984,178) which claims benefit pursuant to 35 U.S.C. § 119(e) of 60/032,160 filed Nov. 29, 1996.

TECHNICAL FIELD

Embodiments relate to automated banking machines that include card readers that operate in response to data read from user cards by the card readers. Specifically, embodiments relate to a system for monitoring fault conditions at automated banking machines and for automatically notifying a servicer or other entity of fault conditions requiring attention.

BACKGROUND ART

Automated banking machines have been developed which perform functions such as dispensing cash, receiving deposits, checking the status of accounts and other functions. Automated banking machines used by consumers are referred to as automated teller machines or "ATMs." There are several manufacturers of automated teller machines.

Many types of automated banking machines include internal systems which monitor their operation. These internal systems often operate to check the available quantities of items which are required for proper operation of the machine. This may include the amount of cash available in the machine for dispensing to customers or an operator. Other systems may monitor the availability of supplies such as blank receipt forms or deposit envelopes. Such systems operate to provide a signal when the quantities of such items reach levels indicative of a need for replenishment. It is also common to provide further signals when such items are depleted. The signals generated by the machine are indicative of the condition which has occurred.

Automated banking machines often include systems for providing signals indicative of malfunctions or the existence of other conditions which impede the operation of the machine. For example, machines which accept deposits may reach a condition where the depository is filled and cannot accept further deposits. When this occurs the machine loses all or a portion of its functional capabilities.

Other malfunctions may include failures of currency dispensing mechanisms, customer card readers, receipt printers, journal printers or other components of the machine. In each case, upon sensing a failure condition, the machine is operative to generate signals indicative of the condition.

Different types of automated banking machines generate different types of fault signals. One reason for this is that machines often include different components. For example, certain machines may function only to dispense cash, in which case no fault signals related to a depository are generated by such a machine. In addition, different manufacturers use different types of fault signals for indicating conditions which exist in their machines.

In the operation of a network of automated banking machines the operation of the machines is controlled by a host computer. Condition signals have been generally transmitted to the host computer. These condition signals from the machines are often referred to as status messages. The status messages may be of either the "solicited" or "unsolicited" types.

An example of a solicited status message may include a message that a machine sends back to a host computer after it has been instructed through a prior message from the host computer to carry out a function. Such a solicited response message may indicate that the machine successfully carried out the requested function or alternatively that the machine was unable to carry out the requested function. The message that the machine was unable to do what it was requested to do is an example of a fault message that was solicited. An example of an unsolicited fault message would be a signal from a seismic detector in the machine indicating that it is undergoing excessive movement. This may be indicative if the machine is subject to attack by a burglar. The message is sent to the host computer when the condition is sensed without the host computer specifically requesting the message. Automated banking machines typically have the capability of sending numerous types of solicited and unsolicited status messages indicative of conditions that exist at the machine.

In the past, operators of ATM networks have programmed their host computers to identify status messages that indicate a problem or fault and to'present them to a system operator. Often this is done by printing the fault conditions at a printer operatively connected to the host computer. An operator, upon receiving the fault message, is required to determine from the content of the message the machine originating the message and the nature of the problem. Generally, automated teller machine networks have assigned numeric identification data to each machine for purposes of transmitting and receiving transaction messages. Such data is often printed in connection with the fault message. The host computer may also be programmed to print some information along with the raw fault message data to assist the system operator in identifying the problem which has occurred.

Upon receiving the fault condition message the system operator then must contact the entity which can correct the condition causing the message to be generated. If the banking machine is located in a bank branch, personnel working in the branch may in some instances be able to correct the condition. It may be appropriate to contact branch personnel when the condition indicated is the depletion of currency, receipt forms, printer ribbons or other consumable items. Such normal replacement and replenishment activities are often referred to as "first line" maintenance, and can often be done by individuals not having a great deal of technical knowledge concerning the operation of automated banking machines. Activities associated with repairing problems with automated banking machines other than the usual replenishment of consumable items is often referred to as "second line" maintenance. Branch personnel may also be contacted during business hours if the machine sends signals which suggest that a person is attempting to improperly gain access.

However, even if the problem is one that could normally be corrected by personnel working in a bank branch where the machine is located, if the problem occurs during times when the branch is closed then the system operator may need to contact a different entity to correct the condition. Such other entities may include servicers such as personnel who work for the manufacturer of the banking machine, or a third party service company. The personnel of the system operator are required to make a decision on whom to contact based on the nature of the problem and the service available in the geographic area where the machine is located.

Other conditions indicated by status messages at an ATM or other banking machine may be indicative of problems that require skilled repair personnel. Such problems may include the repair of currency dispensing mechanisms, card readers, receipt printers and other devices within the machine. In such cases, the operator of the system needs to determine what manufacturer or third party servicer to contact who can make the necessary repairs. Often the decision as to whom to contact requires consideration of the type of machine, the geographic area where the machine is located, as well as whether the condition has arisen during business hours or during off hours or holidays when different servicing entities have responsibility for making repairs. The decision as to whom to contact may also involve whether the servicing entity will have access to cash or other valuables in the machine. In such cases, appropriate bank personnel may also need to be contacted to witness activities by the servicer.

The operator of a system of automated banking machines, upon receiving a status message from a machine, also often needs to follow up with the entity responsible for correcting the condition to find out when the condition has been corrected. This is particularly important where the operator of the ATM network, in response to receiving the fault condition message, takes the machine out of service on the network so that messages are no longer being sent to or received from the machine. If the problem has been corrected but the machine remains out of service, customers are being unnecessarily inconvenienced. Thus, it is important for the system operator to know as soon as possible that the problem has been corrected.

It is also important for system operators to know that a servicer who has been called is responding. If a message is dispatched to a servicing entity by E-mail or fax, the system operator has no way of knowing that the message has been received. Return phone calls may be made by the servicer to acknowledge message receipt and to get the information from the system operator concerning the nature of the condition indicated. However, when systems with many automated banking machines are involved it is often difficult to keep track of which messages have been acknowledged and which ones have not.

Operators of automated banking machine networks also often have a desire to evaluate the performance of the machines in their system as well as the individuals servicing them. However, there is no conveniently available way to analyze the problems that may be occurring at particular machines, or to evaluate whether particular servicers are correcting problems in a manner that has a lasting effect. Further, operators of automated banking machine systems often have a desire to evaluate the responsiveness of their servicers and other entities responsible for the machines. This cannot be conveniently done with existing systems and methods.

Thus, there exists a need for a system which can automatically determine the nature of a condition at an automated banking machine and automatically notify a servicer of the existence of the condition. There further exists a need for a system that can track the process for correcting the condition to determine that the notified servicer has responded and has corrected the problem. In addition, there exists a need for a system that can track and analyze the performance of automated banking machines and servicers, and provide report data in a manner that will assist an operator of automated banking machines in evaluating the performance of their machines and servicers.

DISCLOSURE OF INVENTION

It is an object of exemplary embodiments to provide a system that receives a condition message from a banking machine, and notifies an entity having responsibility for the machine of the condition.

It is a further object of exemplary embodiments to provide a system that receives a condition message from a banking machine, and is operative to notify a servicer having responsibility for the banking machine of the condition causing the machine to generate the condition message.

It is a further object of exemplary embodiments to provide a system that receives a condition message from a banking machine, and notifies servicers selectively based on the time the condition message is generated and the hours of servicer availability.

It is a further object of exemplary embodiments to provide a system that receives a condition message from a banking machine, and notifies a servicer selectively based on the nature of the condition indicated by the condition message.

It is a further object of exemplary embodiments to provide a system that receives a condition message from a banking machine, and notifies servicers selectively through a plurality of selected message mediums of the condition.

It is a further object of exemplary embodiments to provide a system that receives a condition message from a banking machine, and notifies servicers through selected message notification formats tailored to the servicer.

It is a further object of exemplary embodiments to provide a system that receives a condition message from a banking machine, and is operative to receive a response message from the servicer indicative that the servicer has received notification of the condition at the machine.

It is a further object of exemplary embodiments to provide a system that receives a condition message from a banking machine, that is operative to receive a correction message from the servicer indicative of the condition that caused the condition message has been corrected.

It is a further object of exemplary embodiments to provide a system that receives a condition message from a banking machine, that is operative to provide a servicer with information on how to correct the condition indicated by the condition message.

It is a further object of exemplary embodiments to provide a system for receiving a condition message from a banking machine, that may be used with different types of banking machines that provide different types of condition messages and that have different condition message formats.

It is a further object of exemplary embodiments to provide a system for receiving a condition message from a banking machine, that can be selectively operated to test the response of the system to receipt of selected condition messages from selected machines.

It is a further object of exemplary embodiments to provide a system for receiving a condition message from a banking machine, that provides an archive of information concerning conditions and their resolutions.

It is a further object of exemplary embodiments to provide a system for receiving a condition message from a banking machine, that is operative to selectively analyze the performance of banking machines connected to the system and servicers servicing the machines.

Further objects of exemplary embodiments will be made apparent in the following Best Modes for Carrying Out Invention and the appended claims.

The foregoing objects are accomplished in an exemplary embodiment by a system that includes a plurality of automated banking machines. Each of the banking machines is operative to generate device status messages that are indicative of conditions such as fault conditions that occur at the banking machine.

Each of the banking machines is operatively connected to a computer which receives the condition messages from the banking machines. The computer is also in connection with a data store. The data store includes data representative of condition messages as well as servicers and other entities to be contacted when particular machines generate particular condition messages. The data in the data store also preferably includes data representative of message mediums to be used in contacting the servicers. This preferably includes, for example, fax numbers, pager numbers, telephone numbers, E-mail addresses and other contact information on how a particular servicer is to be contacted concerning a type of fault condition.

The system further includes a servicer interface device in operative connection with the computer. The interface device includes a message dispatching portion which is operative to dispatch messages to servicers. The servicer interface device further preferably includes a message receiving portion for receiving messages from servicers.

The computer is operative responsive to receiving a condition message from an automated banking machine to resolve the identity of a servicer or other entity to be contacted concerning the condition. The computer is further operative to resolve the manner in which the servicer is to be contacted and to operate the servicer interface device to dispatch a message to the servicer to notify them of the condition.

In an embodiment the servicer is enabled to input messages to the message receiving portion of the servicer interface device. The servicer is enabled to acknowledge that the message dispatched by the system has been received. In addition, the servicer is preferably enabled to input messages indicative that corrective action has been started and eventually completed to correct the condition that caused the generation of the condition message.

An embodiment includes a scheduler. The scheduler establishes a sequence of activities which are to happen with regard to notifying the responsible servicer or other personnel of a condition, and correcting the condition. The scheduler also sends messages at the appropriate times which cause activities to be carried out if specified conditions which eliminate the need for the activities have not already occurred. For example, the scheduler may send additional notification messages to the servicer (or to another servicer) if the servicer has not acknowledged a notification message within a selected time period.

In an embodiment the servicer is further enabled to obtain through the servicer interface device information concerning how to correct the condition which has caused the generation of the condition message. The preferred embodiment of the system is further operative to provide report data concerning the performance of the banking machines connected to the system and the servicers who respond to messages from the system.

BRIEF DESCRIPTION OF DRAWINGS

FIG. 11 is an ATM window generated by the software of an exemplary embodiment of the system.

FIG. 13 is a locations window generated by the software of an exemplary embodiment of the system.

FIG. 14 is a vendor window generated by the software of an exemplary embodiment of the system.

FIG. 15 is a holidays window generated by the software of an exemplary embodiment of the system.

FIG. 16 is a message recipients window generated by the software of an exemplary embodiment of the system.

FIG. 17 is a table of variables representative of information that may be included in messages generated by an exemplary embodiment of the system.

FIG. 23 is a trouble ticket monitor window generated by the software of an exemplary embodiment wherein a system operator is enabled to review the status of conditions at automated banking machines and further showing the calendar selection tool of the system of the exemplary embodiment.

FIG. 24 is a further view of the trouble ticket monitor window shown in FIG. 23 showing the drop down list feature of the exemplary embodiment of the software used in the system of the exemplary embodiment.

FIG. 25 is a trouble ticket history window generated by the software of an exemplary embodiment.

FIG. 26 is a call details window generated by the software of an exemplary embodiment of the system responsive to selection of the call icons shown in FIG. 24 in the trouble ticket monitor window.

FIG. 29 is a fault actions window similar to that shown schematically in FIG. 10 generated by the software of an exemplary embodiment of the system.

FIG. 30 is a thresholds window generated by the software of an exemplary embodiment of the system.

FIGS. 31 and 32 are a listing of action procedures used in connection with the fault actions window of the system of an exemplary embodiment.

FIG. 33 is a device fault simulation tool window generated by the software of an exemplary embodiment of the system used in connection with testing of the system.

FIG. 34 is a scheduler window generated by the software of an exemplary embodiment of the system.

FIG. 36 is a call details window similar to that shown in FIG. 26 generated by the software of an exemplary embodiment of the system.

FIGS. 37 through 45 are report data windows generated by the software of an exemplary embodiment of the system used for analyzing performance of the machines connected to the system and the servicers responsible for servicing such machines.

FIGS. 46 through 59 are a database schema representative of table records stored in the data store used in connection with the software of the system of an exemplary embodiment, with FIG. 46 being representative of a node type table record associated with system nodes.

FIG. 47 is a portion of the database schema used in connection with the message gateway router portion of the software of an exemplary embodiment of the system.

FIG. 48 is a schematic of the database schema portion associated with the device status processing program of the exemplary system showing the relationships between the table records for purposes of resolving data indicative of an action instruction message to be sent to a multimedia reporter portion of the system, wherein FIGS. 49 through 51 show the table records referenced schematically in FIG. 48.

FIGS. 52 through 59 show a portion of the database schema including the database table records used in connection with the multimedia reporter, and the reporting, scheduling, status tracking, archiving and testing functions of the software of an exemplary embodiment.

BEST MODES FOR CARRYING OUT INVENTION

Figure 1:
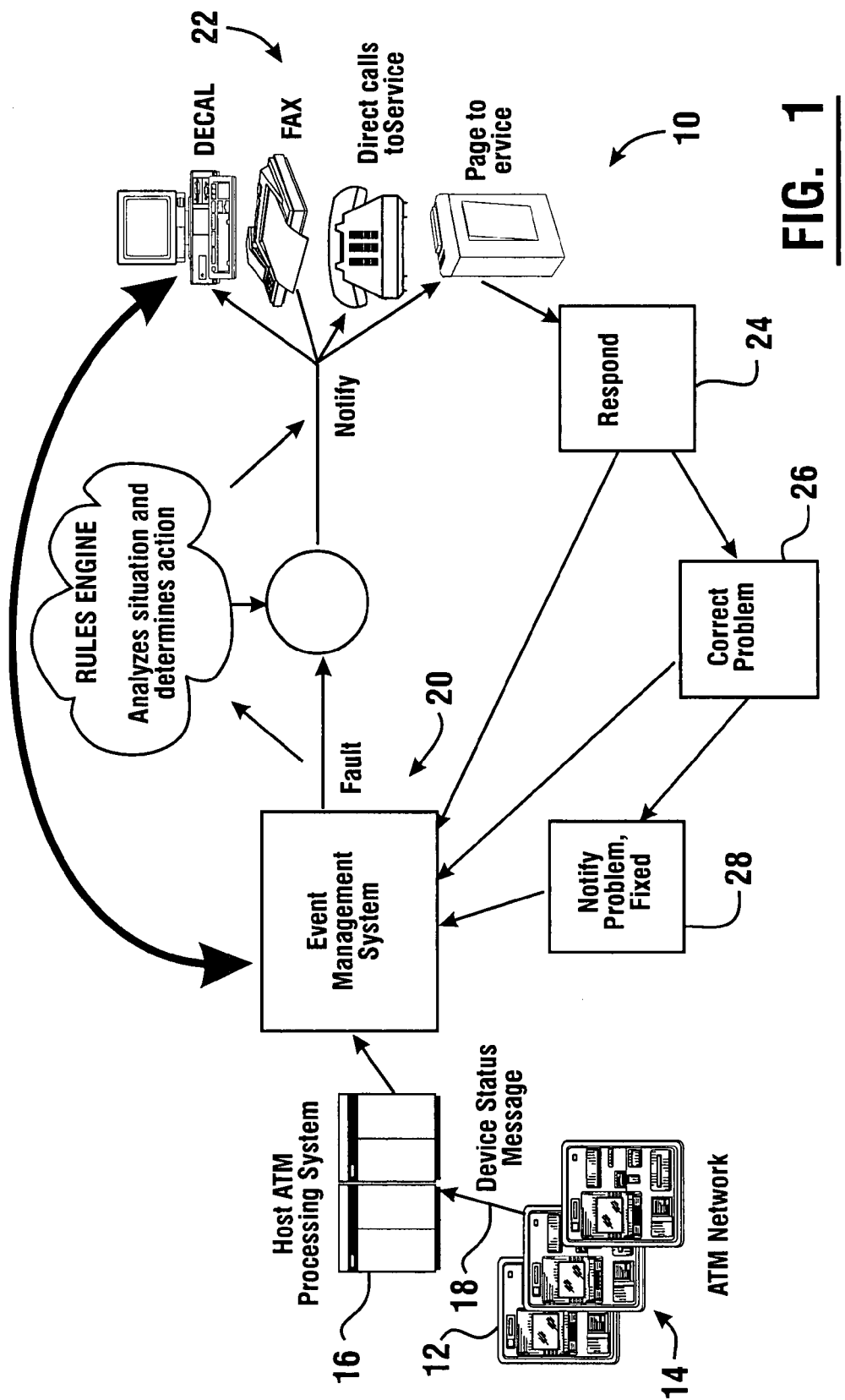
FIG. 1 is a schematic view of a process for correcting fault conditions at automated banking machines carried out using the exemplary embodiment of the system.

Referring now to the drawings and particularly to FIG. 1 there is shown therein a schematic view of a process carried out in connection with a preferred exemplary embodiment of the system, which process is generally indicated 10. In the process carried out in connection with the exemplary embodiment, automated banking machines which in the preferred embodiment are ATMs 12, are operated together as part of an ATM network generally indicated 14. The ATMs in the network communicate with an ATM host 16. The host is operated by a bank or other entity responsible for the processing of transactions, tracking the status of customer accounts and the other activities necessary for the operation of the ATMs 12 which make up the network 14.

The ATM host 16 passes transaction messages back and forth between the ATMs in the network to cause the ATMs to carry out banking transactions with users. These transactions may involve different activities depending on the nature of the ATMs used in the network. For example, such transactions may relate to reading a customer's card, receiving and checking a customer's personal identification number (PIN), receiving deposits from a customer, dispensing cash to a customer, debiting or crediting customer accounts, checking account balances and other transaction activities.

In addition to exchanging transaction messages with the ATMs in the network, the host 16 also receives device status messages schematically indicated 18 from the ATMs 12. The status messages are indicative of conditions which exist at a particular ATM. Generally, device status messages are related to a fault or problem condition which has occurred at the machine. However, device status messages may also be indicative of the proper operation of a particular device or component which makes up the ATM.

The nature of the device status messages 18 which are transmitted to the host 16 depends on the type and character of the ATMs 12 which are sending the message. Different banking machines have different capabilities, and therefore send different types of status messages. In addition, different manufacturers build their machines to generate different signals responsive to conditions. Thus, device status messages which are indicative of a particular problem at one type of machine may be different in both content and format than a message indicative of an identical problem existing at a different brand or type machine.

Device status messages sent to the host 16 may include data indicative of the ATM sending the message and a particular device or component within the ATM that is responsible for sending the message. The device status messages generally fall into two categories. These categories are "solicited" and "unsolicited." A solicited message is one that is transmitted back to the host by an ATM in response to a message or instruction to the ATM from the host. A solicited message may be indicative that a function that a device in the ATM has been requested to perform has been satisfactorily carried out by the ATM, for example, the dispense of a certain amount of cash to the customer. The ATM may respond to such a message from the host with the response message that the command has been successfully carried out. Alternatively, if the ATM was unsuccessful in carrying out the request, a status message indicative that the ATM was not able to carry out the requested function will be sent. Such a solicited fault or condition message generally indicates that there is a problem of a particular type at the ATM which requires corrective action.

Unsolicited condition or fault messages from an ATM are those messages that are generated by the ATM that are not responsive to a message sent by the host. An example of these messages may be alarm conditions indicative of tampering or other improper activities. Examples may include the detection of activities by persons attempting to compromise the security of the ATM. Unusual movement may be detected by a seismic detector within the ATM chest. Other sensors may sense opening of the door of the ATM chest. Signals are generated in response to the detection of such conditions and an unsolicited message is sent to the host indicative thereof.

In a form of the process associated with the system of the exemplary embodiment, the status messages indicative of conditions at the ATM along with identifying data associated with the particular ATM generating the message, are delivered to an event management system generally indicated 20. The event management system includes computer hardware and software later discussed in detail which is operative to analyze the condition message received from the ATM and to reformat the message into a format which is suitable for use by the event management system. This reformatting is accomplished based on information stored in a data store concerning the particular formats used by the ATM generating the condition message.

The event management system is further operative after having converted the condition message to a useable format, to determine the nature of the condition which is being reported by the ATM. Thereafter the system is operative based on information stored in its data store, current time information and other information to determine what entities should be notified of the condition at the ATM and the manner in which to contact such entities. The manner of contacting the entities is shown schematically in FIG. 1 by message mediums 22. These message mediums include the sending of a message through a pager, by fax or by telephone. Message mediums may also include E-mail or other type of electronic message link. The sending of messages may be done electronically to a service provider such as to a DECAL® system operated by Diebold, Incorporated, the Assignee of the present invention.

In a preferred embodiment, the event management system 20 is operative to contact entities including servicers through a servicer interface device which is a communication device capable of dispatching messages in the various message mediums 22. Further, the servicer interface device is preferably operable to receive input messages from servicers. Such input messages may include, for example, that the servicer has properly received notification of the problem, has arrived on site to correct the problem and has resolved the condition which caused the status message to be generated.

The preferred embodiment includes an interactive voice/response module which enables the receipt of input messages from a servicer or other entity during the steps which occur during the problem correction process. These steps as indicated in FIG. 1 include acknowledgment by a servicer or other entity that they have received notice of the existence of a problem as indicated by step 24. The servicer may further indicate that they have arrived on site to begin correcting the problem as indicated at step 26. Once the problem has been corrected the servicer may notify the system that the problem has been corrected as indicated by step 28. This enables the system to analyze and report the status of problem correction activities at all times.

Figure 2:
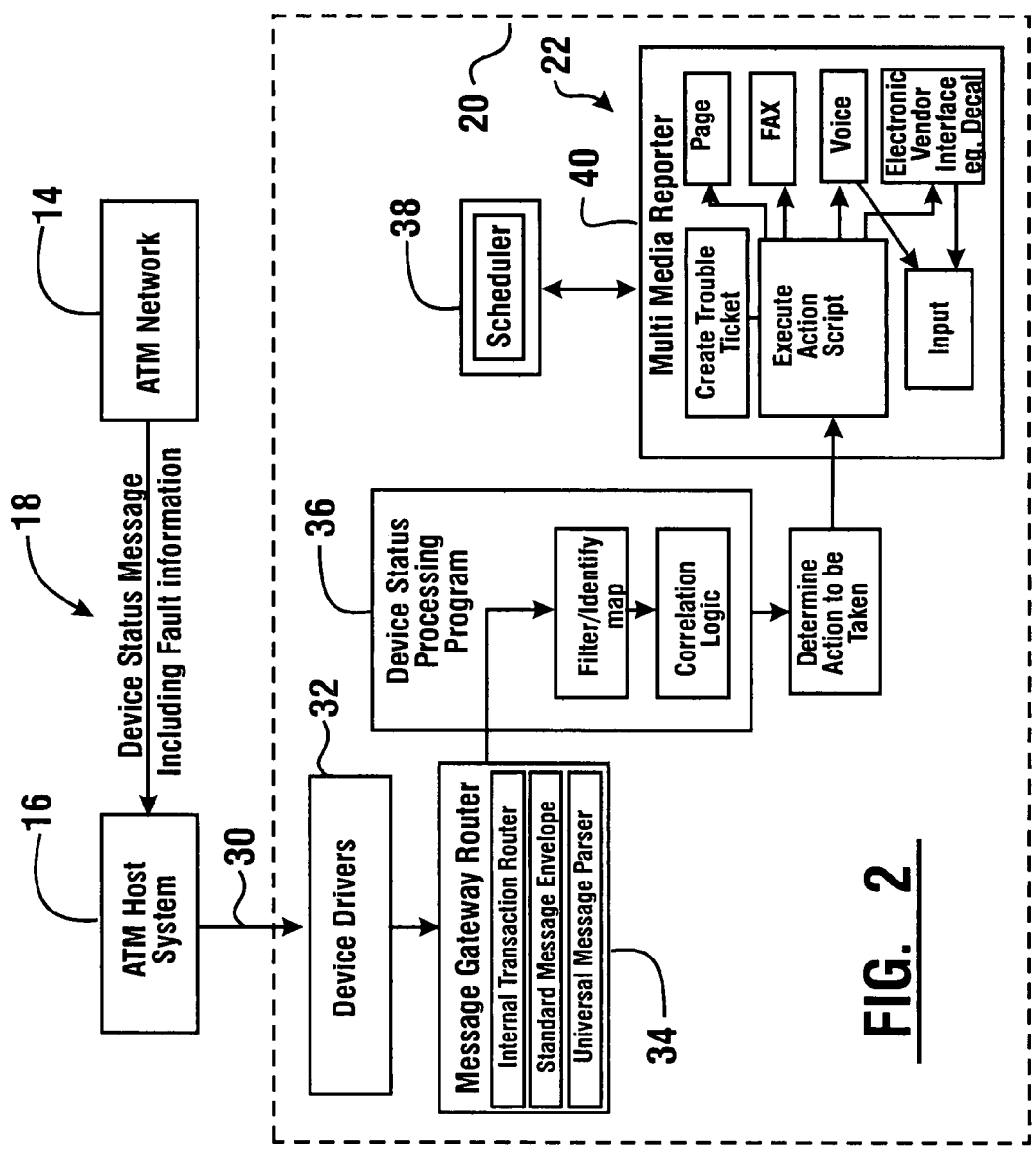
FIG. 2 is a schematic view of the components which comprise the system of the exemplary embodiment.

The components of the event management system 20 of an exemplary embodiment of the system are shown in greater detail in FIG. 2. The ATM host 16 is operative to receive the device status messages 18 from the ATMs in the network and to transmit host messages generally indicated 30, to the event management system 20. In the exemplary embodiment the ATM host system includes software which generates the host messages in a format which will be later described in detail. This software is preferably loaded into the host from a computer readable media, such as diskettes, a tape, a hard drive or similar software bearing media.

The event management system is operative in one or more computers and receives the host messages at a driver 32. The driver is operative to place the ATM host message 30 into a standard message envelope or SME which is used within the event management system 20. The device driver 32 is only operative to place the host message in the standard message envelope, but does not reformat the host message.

From the device driver 32 the message is transmitted to a message gateway router (MGR) 34. MGR 34 is operative to determine the type and format of the message received from the host based on information stored in table records in the data store. The message gateway router 34 is then operative to parse and reformat the message into a form that is useable within the event management system 20. The message gateway router fills out the fields in the standard message envelope and resolves the system address of the next component within the event management system which will receive the message. The next address for the message to be sent within the system is resolved based on the message type of the original message. It should be understood that while the exemplary embodiment will be discussed in connection with a fault or problem condition message, the system of the exemplary embodiment is capable of handling other types of messages which are routed to other systems, locations and processes.

After the message gateway router 34 reformats or otherwise transforms the message into the standard message envelope and resolves the next system address, the new message is sent through a send message function operative within the system to forward a fault or problem condition message to a device status processing program (DSPP) 36. The device status processing program (DSPP) 36 is operative based on information stored in the data store, to identify the nature of the fault condition represented by the message, including the device within the machine that is causing the fault signal to be generated. The device status processing program is further operative to determine data representative of the identity of the machine generating the message, including its physical location. The device status processing program 36 is further operative based on information in the data store to determine data representative of entities to be notified of the condition existing at the ATM and to determine what action is to be taken in response to the message. As discussed in detail later, such actions may take into consideration condition messages received from the particular ATM prior to the current message. Further, the actions taken may include or be correlated with data representative of steps to be taken at times after the condition is first reported to insure that the fault condition is promptly and properly corrected.

After determining the action to be taken in the device status processing program, an action message is sent to a multimedia reporter component 40. The multimedia reporter (MMR) is operative based on information stored in the data store to execute particular action steps in response to the action message resolved by the device status processing program. The multimedia reporter 40 is operative to resolve the entities to be contacted in response to the particular action message and to send messages from a message dispatching portion through the message mediums 22. The message mediums include the various forms of communication that may be established for entities to be contacted such as by telephone, fax, pager, E-mail or other electronic data link. The preferred embodiment includes an interactive voice/response module (IVR) which is operative to provide the messages to each entity in the format established for the entity. These formats preferably include customized message formats for voice and fax messages that are tailored to the particular entity based on configuration information stored in the data store.

Based on the action resolved by the device status processing program, the MMR resolves a schedule for future actions. This schedule is established in a scheduler component 38. The scheduler is operative to send messages to the MMR at the times in the schedule for taking future action steps. If certain responsive activities are not reported to the MMR as having been taken prior to the receipt of the messages, the MMR operates to execute the action steps responsive to the messages received. If the MMR has received input messages which avoid the need for taking action in response to a message from the scheduler, the scheduler message is disregarded.

The MMR 40 is further operative to cause a "trouble ticket" to be stored in the data store. This trouble ticket or trouble record is a record of information concerning the condition in the ATM and the course of activities taken to resolve the condition reflected by the ticket. The trouble record information is generated and stored in the data store associated with the computers in which the event management system is operated.

In the exemplary embodiment the multimedia reporter includes a message receiving portion which enables an entity notified of a condition at an ATM to respond to the system. Such responses may include input messages, including messages that the entity acknowledges receipt of the message. Other input messages may include a message that an entity has arrived on site and has begun correcting the problem. Further input messages may indicate that the problem which caused the status message to be generated has been corrected. Other input messages may be accepted based on the requirements of the system.

In an exemplary embodiment, the data store in connection with the computers in which the event management system 20 operates, includes information on steps to be taken to correct fault conditions which are generated at the ATMs. The multimedia reporter 40 is preferably programmed in response to receiving an input message from a servicer requesting such information, to provide a message including the correction steps to the servicer. This enables the servicer to have information on the steps which will be necessary to correct the problem indicated by the ATM message. In addition, the exemplary embodiment also enables a servicer who has been notified by a message such as through a pager, to obtain details of the fault condition which has caused the message at the ATM to be generated as well as identifying information for the ATM where service is required. Such information may include the location, contact and other information associated with the particular machine where the condition message was generated. The information parameters provided to the servicer or other person notified may be varied to suit the needs of the entity being notified.

In an exemplary embodiment the multimedia reporter 40 is operative to send additional messages to servicers. These messages are dispatched to servicers in response to messages from the scheduler 38 to the MMR if certain responses are not received from a servicer prior to scheduled times. The scheduled times are established by the MMR in response to the action message received from the DSPP. For example, if an entity notified of a fault condition is required to respond but has not done so within a time period established in accordance with the action resolved by the device status processing program, and as recorded by the MMR in the scheduler, then the scheduler may cause the MMR to give a further notice to the same entity or to a different entity. In addition, the fact of giving the additional notification or taking other action is recorded in the trouble ticket associated with the particular fault condition and stored in the data store. A record is also made in the data store of calls or other notifications given to servicers or other entities.

The exemplary embodiment is operative to enable the processing of administrative requests received at the multimedia reporter. Such administrative requests may include information concerning the status of banking machines connected to the system. The information responsive to administrative requests is resolved from the trouble ticket and other records in the data store and output through the multimedia reporter to appropriate personnel.

The event management system of the exemplary embodiment is further operative to analyze information stored in the data store of the system concerning ATM conditions and corrective actions that were taken. This analysis includes producing various reports hereinafter described in detail, which show the performance of the machines in connection with the system and the fault conditions which have arisen with respect to the machines. In addition, the system enables analysis of network and servicer performance in terms of both availability of machines as well as the responsiveness and effectiveness of servicers in resolving problem conditions which occur at machines connected to the system.

The exemplary embodiment of the system further includes a device fault simulation function which enables a user of the system to test the operation of the system, either with regard to fault conditions at actual machines connected to the system or conditions at phantom machines which exist only as information representative of machines in a data store. The user is enabled through an input device in connection with the computer which operates the system to generate signals indicative of a fault condition at an ATM and to observe the operation of the system in response thereto. In this manner a system operator is enabled to verify that the system is working as anticipated in response to the generation of a fault condition at a particular machine.

Figure 3:
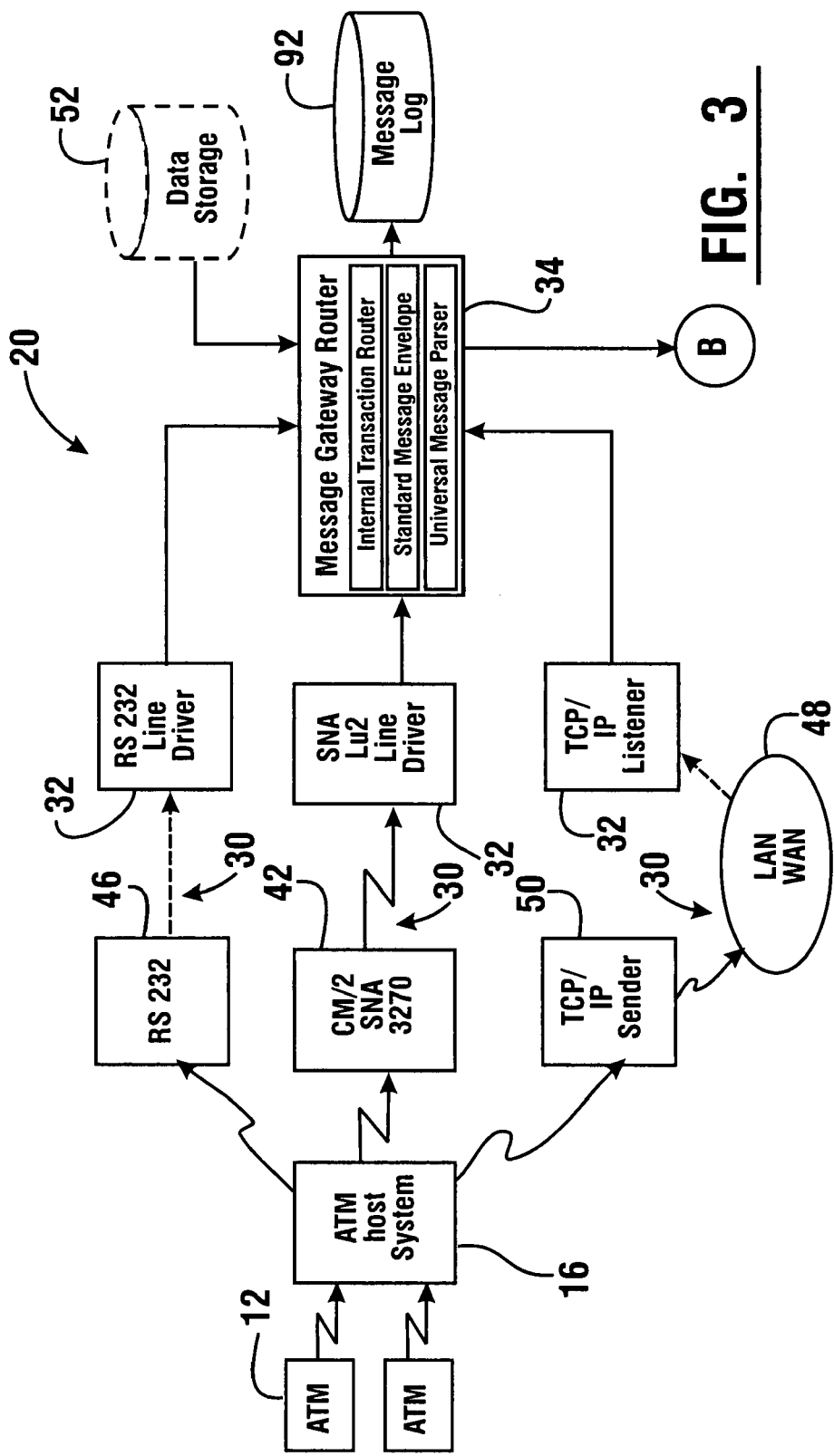
FIG. 3 is a schematic view of the message flow through a first portion of the system from the automated banking machines through the message gateway router.

The operation of the exemplary embodiment of the system is now described in detail. FIG. 3 shows ATM machines 12 connected to ATM host 16 in a manner previously discussed. The ATM host comprises a computer which in the exemplary embodiment is operative to receive the status messages from the ATM. The host 16 is preferably programmed with software to generate host status messages 30 to the event management system 20. This may be done in a number of ways as graphically indicated in FIG. 3.

The host 16 is programmed so that it responds to receiving a status message by generating a host message to the event management system. In an exemplary embodiment the host message includes a header added to the status message sent by the ATM. In an exemplary embodiment the host message has the following header fields:

| Field Number | Name of Field | Length | Format | Description |
|---|---|---|---|---|
| 1 | Terminal ID | 15 | ASCII | The ATM identification number used in the system |
| 2 | Host ID | 15 | ASCII | The internal system ID for the ATM host or controller sending the message |
| 3 | Date | 8 | YYYYMMDD | Date of event or status message from ATM |
| 4 | Time | 6 | hhmmss | Time of event or status message from ATM |
| 5 | Status length | 4 | numeric 0000-9999 | Total length of fields in status message |
|  | Status message from ATM | variable | variable | Status message sent by ATM to host |

It should be understood that the exemplary embodiment is operative with a number of different types of banking machines which have different message formats for status condition messages, as well as different types of status condition messages. The event management system 20 of the exemplary embodiment is operative to handle condition messages of various types for which information has been stored in its data store. This enables the system to work with ATM networks in which numerous types and varieties of banking machines are used.

The fault or condition status messages may vary between machine types and manufacturers. A typical example of a status message which would be included as part of the host message to the event management system, would be a status message generated by an automated teller machine manufactured by Diebold, Incorporated, the assignee of the present invention. In this case the host messages sent to the event management system may include data in many separate fields in the status message portion of the host message. In addition to header fields 1 through 5 previously discussed, the status message portion may have the following fields.

| Field Number | Name of Field | Length | Format | Description |
|---|---|---|---|---|
| 6 | Solicited/ Unsolicited ID | 1 | "1" or "2" | 1 Unsolicited; 2 Solicited |
| 7 | Message ID | 1 | "2" | Indicates purpose and format of message; "2" indicates a device status message |
| 8 | Field separator | 1 | 0 x 1C | Field separator |
| 9 | LUNO | var. 3-9 | numeric 000000000-999999999 | ATM logical unit number. May be zero filled |
| 10 | Field separator | 1 | 0 x 1C | Field separator |
| 11 | Field separator | 1 | 0 x 1C | Field separator |
| 12 | Status descriptor* | 1 | ASCII | Reason why message was sent; "8" indicates device fault |
| 13 | Field separator* | 1 | 0 x 1C | Field separator |
| 14 | Device identifier | 1 | ASCII | An indicator of the device in the ATM reporting this status |
| 15 | Device/ application status | var. 42 | ASCII | Alpha numeric descriptor of status |
| 16 | Field separator** | 1 | 0 x 1C | Field separator |
| 17 | MDS status** | var. 116 | ASCII | MDS type status |
| 18 | End of text | 1 | 0 x 03 | End of message indicator |

*These fields are not present if message is an unsolicited message.
**These fields are not present if MDS status is not selected. MDS represents a particular type of Diebold ® ATM.

It should be understood that while the above message format indicates a message format used in an exemplary embodiment for host messages, in other embodiments other formats may be used.

As shown in FIG. 3, the ATM host 16 may send host messages to the computer or computers operating the event management system through various types of drivers. By way of example, an SNA3270 driver 42 is shown as sending the message. However, the embodiment is also operable to send host messages through an RS232 type communicators driver 46. In addition, the event management system 20 may receive messages through a network 48, which may be a local area network (LAN) or a wide area network (WAN). Network 48 may be a network that communicates TCP/IP messages, in which case the ATM host may send a message to the event management system through the network 48 using a TCP/IP sender 50.

As previously discussed, the message gateway router 34 of the event management system 20 is in operative connection with a data store which is schematically indicated 52. Data store 52 preferably includes one or more relational databases that include data representative of numerous types of information used by various system components in performing their functions. The data store may reside on the same computer or server as the other functional software components of the event management system. Alternatively, the data store may reside on other operatively connected computers.

Figure 6:
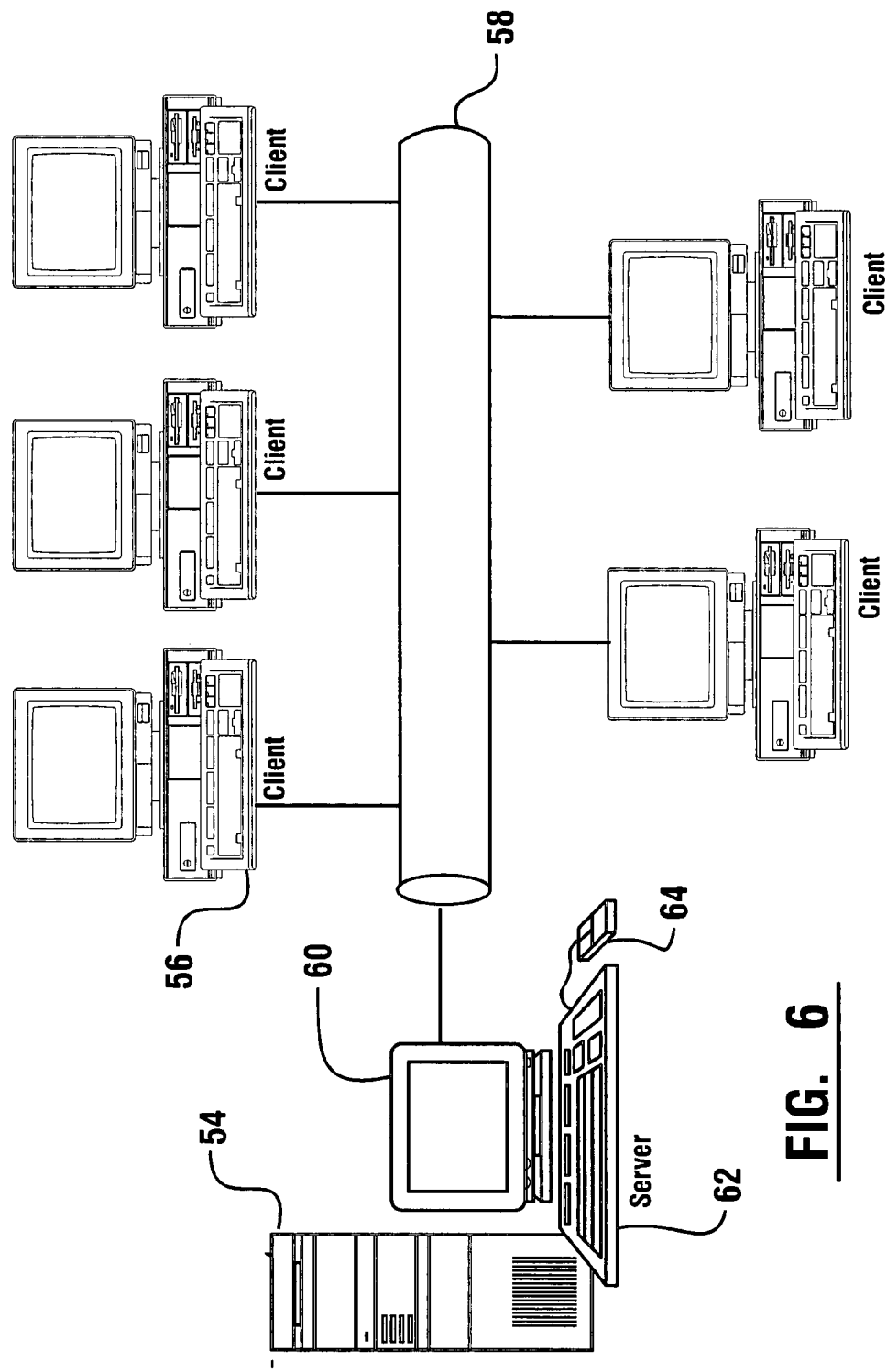
FIG. 6 is a schematic view of a client-server hardware configuration in which embodiments of the software used in the exemplary system are operated.

The event management system preferably operates in computers having a client/server configuration shown in FIG. 6, which includes at least one computer 54 which acts as a server and which has the data store 52 thereon. The server 54 is connected to a number of computers 56 which are connected through a local or wide area network 58. Each of the computers 56 is enabled to access the software programs of the event management system and the database which operate in the server computer 54. The computer software of the event management system is installed on the computers from computer readable media bearing the software. Such computer readable media may include diskettes, a tape, a disk drive or other media from which software may be read.

Each of the computers 54 and 56 is in operative connection with a display device 60 which includes a screen for displaying instructions or outputting other information to the user. Each of the computers 54, 56 is also preferably in operative connection with input devices. Such input devices may include for example, a keyboard schematically indicated 62 or a mouse 64. In other embodiments other input devices may be used including electronic links or other connections or ways in which a user may provide inputs to the computers. It should be further understood that the network 58 may also be in connection with multiple servers and that the event management system 20 may have portions operating on multiple servers, or may have the data store residing in databases on multiple servers.

Figure 9:
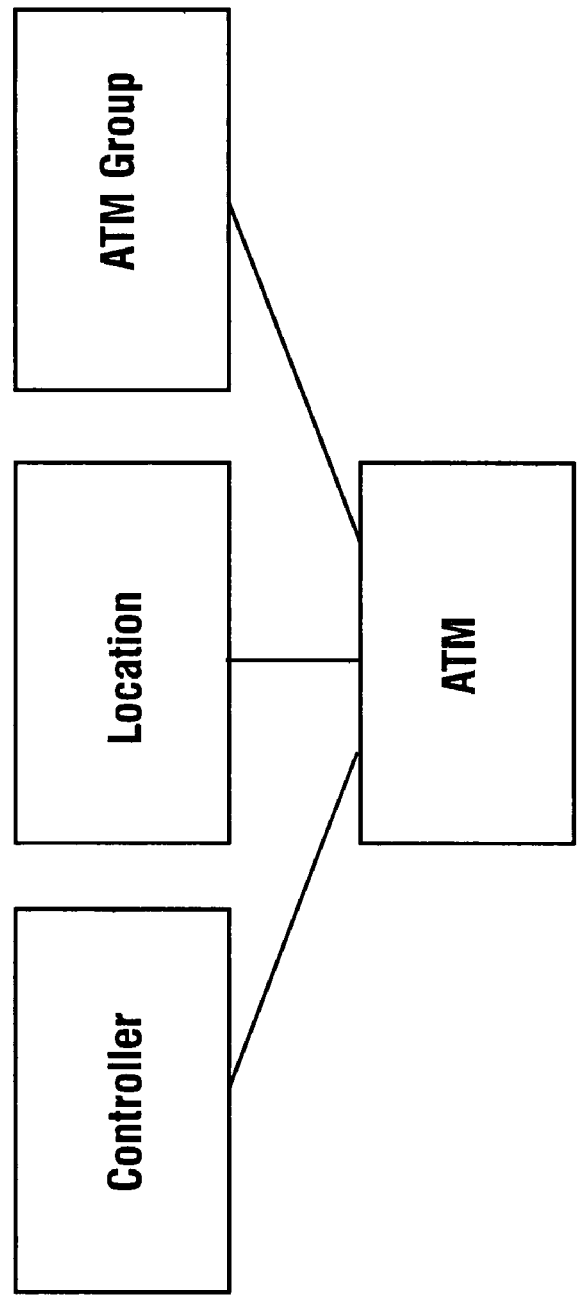
FIG. 9 is a schematic view showing the logical relationship between an automated banking machine and controller, location and group information associated with the automated banking machine.

For the event management system of the preferred embodiment to operate, information must first be input into the data store 52 concerning the ATMs connected to the system as well as the locations in which they operate. Information is also preferably input concerning the host computer or controller to which the ATMs are connected, as well as the ATM "groups" in which a particular ATM may be included. This relationship is schematically represented in FIG. 9 which shows that there is a logical relationship for each ATM between a host or controller, a physical location for the particular ATM and a particular group in which the ATM is included. Information representative of these aspects of ATMs, controllers, locations and ATM groups is stored in correlated relation in the data store 52. In the exemplary embodiment the data is stored in a plurality of database records.

Figure 8:
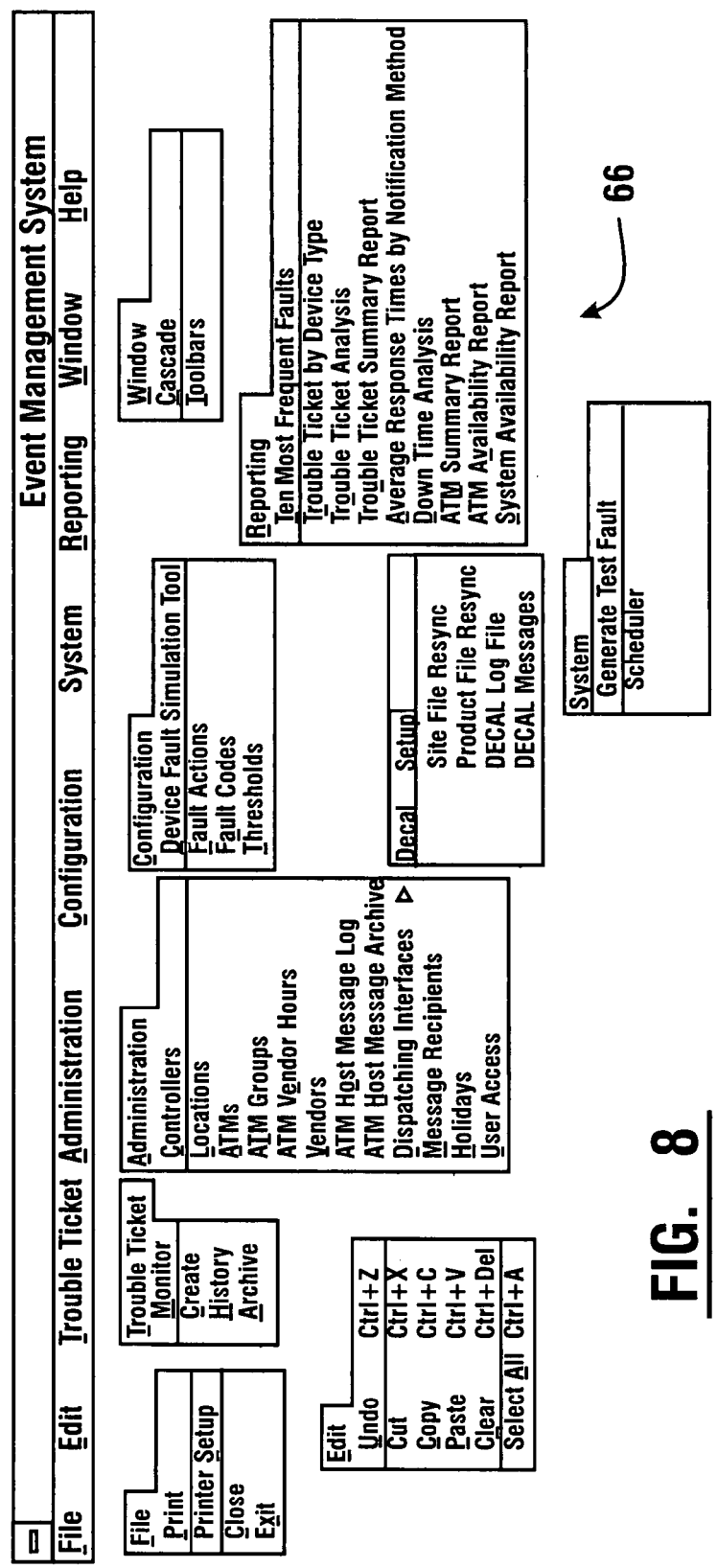
FIG. 8 is a view of the main menu window generated by the software of an exemplary embodiment of the system.

To provide this information to the event management system, the computer 54 is appropriately programmed with event management application software which facilitates the inputting of the required information. A main menu window 66 shown in FIG. 8 is generated by the event management system software at the display devices associated with computers having access to the system. The event management system is preferably configured to operate in a Windows® operating environment to facilitate operation of the system by a user.

Figure 10:
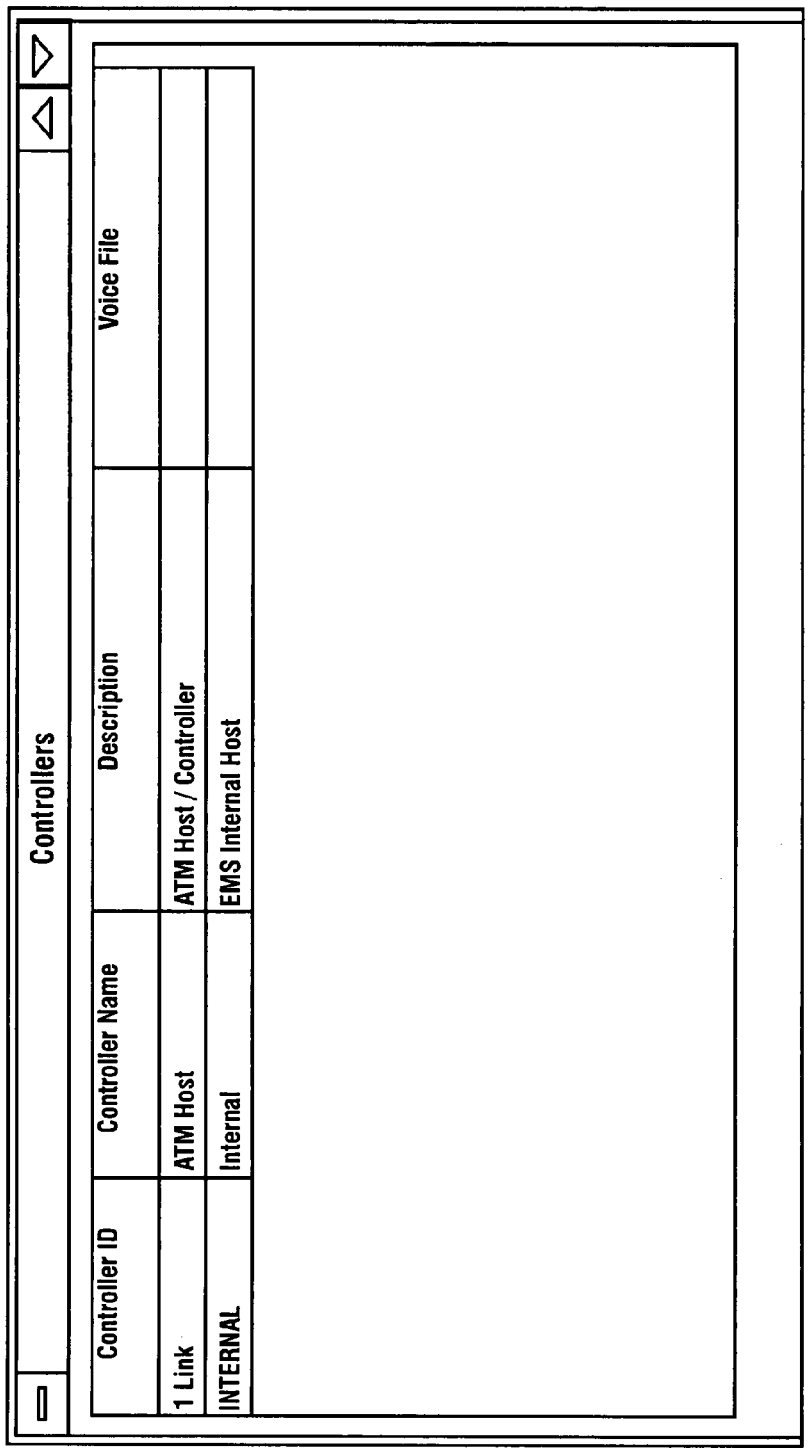
FIG. 10 is an exemplary controller window generated by the software of the system of an exemplary embodiment of the system.

As shown in FIG. 8 under the column in the main menu entitled "Administration," certain windows or screens associated with ATMs may be selected for purposes of display and input. For example, selecting the "controllers" entry under the heading "Administration" causes the controllers window 68 shown in FIG. 10 to be displayed. The controllers window 68 enables a user to establish the controller identification information associated with host computers which send the information to the event management system. It should be noted that the controllers window 68 enables the establishment of a controller ID and name for each host, as well as the designation of particular voice files which are used by the MMR for purposes of reporting information concerning the host through the IVR. It should also be noted with regard to FIG. 10 that host computers can be designated as "internal" to the EMS system. This is done for purposes of phantom or test ATMs which are used in a manner later discussed to test the operation of the system. An example of a layout for a database table record in which information on controllers is stored is the "networks" table record shown in FIG. 50. It should be understood that the windows displayed by the user interface may include information from many types of table records. However, the logical foundation of the system will sometimes result in much of the displayed information being stored together in a record in the data store.

Selecting the entry "ATMs" under the "Administration" in the main menu 66 shown in FIG. 8 causes an ATM window 70 shown in FIG. 11 to be displayed. A user is enabled to input through the input devices such as the keyboard, a terminal ID) number associated with a particular ATM as well as the controller or host ID number previously discussed. A user is also enabled to enter information about groups to which the ATM belongs as well as a location ID number which is associated with the location where the ATM is located.

Figure 50:
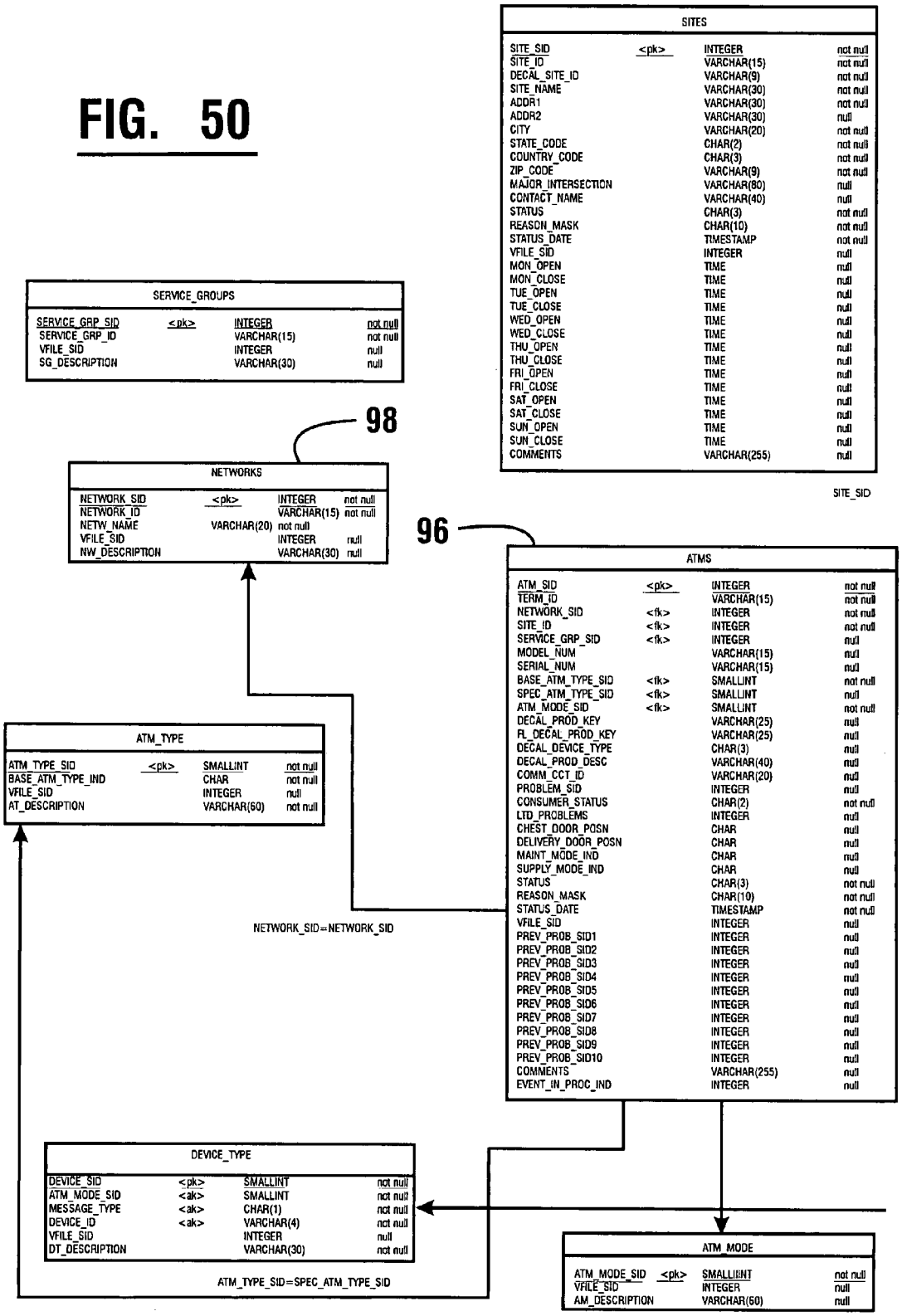

Other information may also be entered by a user in the ATM window 70. This information includes the model number and serial number associated with a particular ATM. It also includes information related to service vendor information such as a product key assigned by a service vendor such as Diebold, Incorporated, for first line and second line service. Other information included in the ATM window may include ATM types and the "mode" which is an indication of the format in which the ATM communicates messages. Database table record layouts for information related to ATMs and ATM modes are shown in FIG. 50.

During operation of the system as shown in FIG. 11, selection of the ATM window is also operative to provide status information and statistical information concerning the particular ATM selected.

Figure 12:
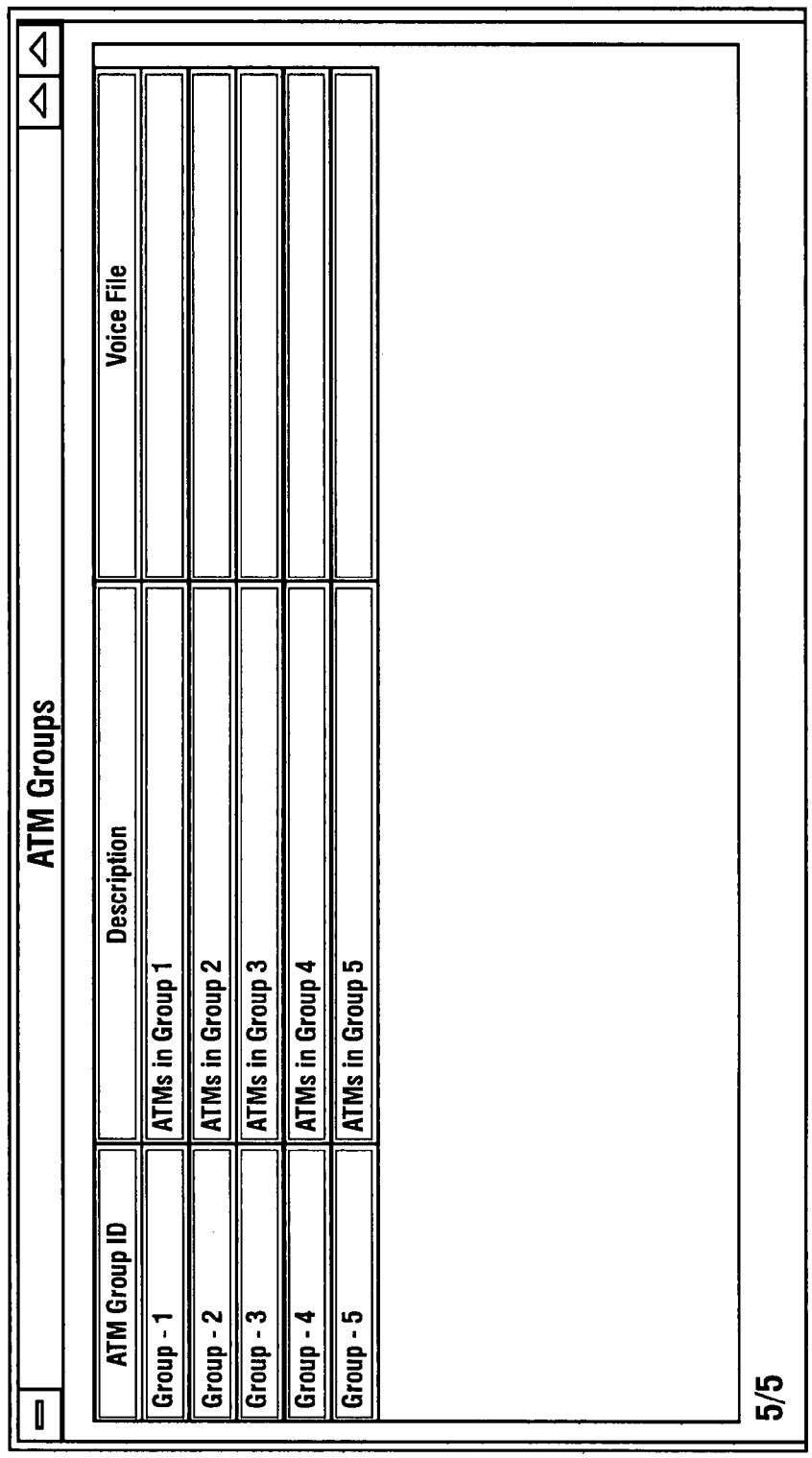
FIG. 12 is an ATM groups window generated by the software of an exemplary embodiment of the system.

From the main menu 66 shown in FIG. 8, selecting the entry "ATM groups" under "Administration" causes the ATM groups window 72 shown in FIG. 12 to be displayed on the display device. A user is enabled to input information in the ATM groups window which identifies a particular group and includes certain ATMs by terminal ID in this group. Groups may be used for purposes of treating particular ATMs in a similar manner for purposes of administration by the system operator. Database table record layouts for data concerning service groups is shown in FIG. 50.

The selection of the "locations" entry under "Administration" in the main menu window 66 of the event management system causes a locations window 74 shown in FIG. 13 to be displayed. The locations window is configured to include a location ID associated with a particular ATM. The locations window also includes address information as well as a contact name at the location. In addition, the locations window may include designations of voice files to be used when transmitting to this particular location as well as vendor information, such as a vendor site number which is shown in FIG. 13 as a Diebold site number.

As shown in FIG. 13 locations window 74 is also used when the location is a facility which is staffed by personnel during certain business hours. This information is used by the system to determine whether to contact someone at the location to give notice of status conditions. If the ATM associated with the location is not at a facility that is staffed with personnel, there are no business hours and this portion of the locations window is left blank. If a locations window is accessed during operation of the system the locations window is operative to provide status information on machines at the particular location. An example of a database record layout for data associated with ATM sites is shown in FIG. 50.

The information provided through the ATMs, controller, ATM groups and locations windows is used by the system to establish the database records in the data store 52. These database records are used by the computer(s) operating the event management system 20 in a manner later discussed to resolve the information necessary to accomplish its functions.

Returning now to the operation of the system as explained with regard to FIG. 3, ATM host messages 30 are received at the corresponding line driver 32 associated with the event management system 20. The event management system 20 includes for each functional component in the software a node table record having the layout shown in FIG. 46. The node table records include for each node, node table record data shown in a portion 76 of the node table layout shown in FIG. 46. In addition, if a particular node corresponds to a line type node, a node table portion 78 is included as part of the node table record layout. If a node corresponds to a process, a table record portion 80 is included as part of the node table record layout along with portion 76. The node table records associated with each functional component in the software system provides characteristic data concerning the software process represented by the node table record which enables communication with the software component represented by the node as well as enables the operation thereof as part of the system.

When the line driver 32 receives a host message it is operative in the exemplary embodiment to place the host message within a standard message envelope (SME) format used by the MGR 34 within the event management system. In the exemplary embodiment, the standard message envelope is as follows:

| Field Number | Field Designator | Description | Length |
|---|---|---|---|
| 1 | HEADER SID | SME message layout version | 1 |
| 2 | SOURCE NODE SID | System node originating message | 6 |
| 3 | MESSAGE RECEIVE SYSTEM TIME | The time the event management system receives the message in the format YYYYMMDDHHMMSSmmm | 17 |
| 4 | INTERNAL MESSAGE SID | The system ID of the message | 4 |
| 5 | | Not used | 4 |
| 6 | TARGET NODE SID | The system ID of the node to which a message is being sent | 6 |
| 7 | DATA FORMAT INDICATOR | Indicator that the particular source of the message is either internal or external | 1 |
| 8 | MESSAGE DIRECTION | A designator of the direction of a message either into or out of the system | 1 |

-continued

| Field Number | Field Designator | Description | Length |
|---|---|---|---|
| 9 | | Not used | 5 |
| 10 | PROCESSING NODE SID | Last processing node system ID | 6 |
| 11 | | Not used | 6 |
| 12 | THE MESSAGE TEXT | A particular message being sent to the function represented by the TARGET NODE SID | variable |

It should be understood that in other embodiments other standard message envelope formats may be used.

Upon receipt of the host message 30 by line driver 32 the line driver is operative to establish the contents of the fields in the SME format as follows:

In Field 1 the HEADER SID is set to "1" as this represents one layout for Fields 1 through 11 in the SME header. Other message forms in the system use other designators which represent different SME layouts.

In Field 2 of the header the line driver 32 is operative to insert its own NODE SID as the SOURCE NODE SID of the message within the system.

In Field 3 the line driver inserts the time at which the event management system 20 receives the message. This is done based on a clock routine which serves as a clock device operating in the computer in which the event management system is operating.

The line driver 32 resolves the INTERNAL MESSAGE SID data in Field 4 from the data from its own node table record. This is done by determining the IN_MSG_FMT_SID value from its own node table record and inserting it in Field 4 in the message. Field 5 is not used and is set to null values.

The line driver resolves the information for Field 6 from its own node table record. The node table record includes information about its "parent" node which in this case is the node identification value for the message gateway router 34 to which the line driver will send its message. This designator is indicated PARENT_NODE_SID in the node table record associated with the line driver. The line driver is operative to include this designator in Field 6.

The line driver is further operative to include in Field 7 a "zero" value which is indicative that the message is coming from an external data source. This will always be true for messages from the line driver.

The line driver is further operative to set the MESSAGE DIRECTION in Field 8 to a value which is indicative that the line driver is receiving an inbound message.

The line driver is further operative to place its own NODE SID value in Field 10 of the message, and sets the values in Field 9 and 11 of the message which are not used to null values.

The line driver is further operative to place the host message in the format received in Field 12 of the message.

Having built a message in this SME format, the line driver is now operative to send the message to the message gateway router 34. This is done using the TARGET NODE SID value for the message gateway router which is included in Field 6 of the message. A "send message" routine of the preferred embodiment is operative to send the message. This routine first determines if the target node for the message resides on the same computer or on a different computer from the system component that is sending the message, in this case the line driver. This is accomplished by the send message routine reviewing the node table record associated with the target node.

In the present example the message gateway router is a node type process which includes the table portion 80 shown in FIG. 46. This portion of the node table record associated with MGR includes a SERVER_SID value. The send message routine is operative to determine if the SERVER_SID value associated with the TARGET NODE SID in the data store is the same as that for the SOURCE NODE SID, which in this case is the line driver that is sending the message. If the SERVER_SID for both the source node and the target node are the same, then both processes reside on the same computer (server). In response the send message routine operates to send the message through the interprocess communication system (IPC) of the one computer. However, if the target node resides on a different computer, the send message routine is operative to look up the system IP address on other computer to which to send the message. This is accomplished by taking the SERVER_SID value and looking up in the data store a server table record. Server table records have a layout 82 shown in FIG. 46. The server table record includes an IP address value associated with the SERVER_SID value.

It should be noted that the node table record layout as shown in table portion 76 includes an entry indicative of the particular interprocess communication type through which the software component to which the node table corresponds, receives its messages through the interprocess communication system. This designator is indicated IPC_TYPE_SID in the node table record layout. This designator can be indicative of a message queue, or a named pipe or a TCP/IP manner of communication.

In response to determining that the target node of the message is on the same server, the send message routine is operative to call a "make interprocess communication key function" which is operative to send the message to the appropriate designation within the operating system from which it will be retrieved by the functional component which corresponds to the target node. The software function is operative to send the message based on the data stored in the node table record corresponding to the target node value (NODE_SID) in Field 6 of the message. The parameters used in the preferred embodiment include the values APPLICATION_SID, IPC_TYPE_SID, NODE_TYPE_SID and MSG_PRIORITY. Of course the approach taken in other embodiments depends on the nature of the computer hardware and software being used.

In the alternative, if the send message function determines that the target node for a message is located on a different computer, it retrieves the IP address for the target node from the server table record 82 and the IP_PORT_ID from the node type process portion of the corresponding table record for the target node as shown in table portion 80. This provides the TCP/IP address information necessary to send the message to the target software component on the other server. In some situations the other server may involve a different hardware architecture which requires certain portions of the message to be changed. If such a modification in the message is indicated in the server table record, the message is changed in this manner by the send message function before being sent.

In the exemplary embodiment, if the send message function determines that the TARGET_NODE_SID for the message is on a different computer, it resolves an address for a listener based on the IP address associated with the computer on which the software which corresponds to the target node is operating. The listener receives the message and then sends the message to the particular target node based on the TAR- GET NODE SID value in Field 6 of the message header. This approach enables the message from the line driver to be sent to the message gateway router 34 regardless of where the message gateway router function resides in the computer system.

The message gateway router 34 is operative to receive the message from the line driver and place it in a suitable message format for use by other components of the system. The message gateway router is first operative to determine the format of the message it has received from the host, which is contained in Field 12 of the standard message envelope format transmitted by the line driver. This is determined from the INTERNAL_MSG_SID value (internal message ID) which the line driver placed in Field 4 of the message. Using this FMT_SID value (format ID) the message gateway router operates to find a message format table record which includes this value. Message format table records are represented by the message format table layout 84 shown in FIG. 47. Upon finding the message format table record corresponding to the value set forth in Field 4 of the header, the message gateway router operates to recover values from the table record representative of an "offset" and "length" which correspond to the location in the message where a value representative of the particular message "type" is found. The offset and length values are designated in table record layout 84 by the MSG_TYPE_OFFSET and MSG_TYPE_LENGTH values.

In response to finding these values the message gateway router 34 operates to step through the data characters in Field 12 of the standard message envelope a number of characters equal to the message type offset. The message gateway router then copies the number of characters following the offset equal to the message type length. These characters are a value indicative of the type of message that has been received by the message gateway router.

Having resolved the message type from the message format table record information, the message gateway router 34 is then operative based on the IN_MSG_FMT_SID value from Field 4 of the header (indicative of the format of messages the line driver receives) and the resolved message type information, to find a message map table record that corresponds to these two values. A message map table record is represented by the message map table record layout 86 in FIG. 47. By finding a message map table record which includes the FMT_SID in the message from the line driver and the resolved MSG_TYPE value, the message gateway router is enabled to resolve an internal message ID value designated INT_MSG_SID.

The message gateway router is then operative to reformat or otherwise transform the message text in Field 12 into a format suitable for use by the next functional component within the event management system. The message gateway router in doing this first sets a field number designated FEILD_NUM value to "1", and using a message version or MSG_VER value of "1" from Field 1, the MGR proceeds to find a message field table record in the data store which corresponds to the resolved INT_MSG_SID value, message version value and field number value.

The message field table records are represented by message field table record layout 88 shown in FIG. 47. The message gateway router locates in the data store the message field table record that corresponds to the INT_MSG_SID resolved from the message map table record and which corresponds to the MSG_VER value of "1" and the FIELD_NUM value of "1". Upon finding this message field table record the MGR is enabled to resolve data from the table record which indicates the field length of a particular field which is indicated by the FIELD_LEN value. This is representative of the length of the data which represents the first field in the raw message.

The message gateway router 34 is further operative to place the first field from the raw message data into an internal array in the MGR. This is done in accordance with field map data which is resolved by the message gateway router from a field map table record. A field map table record layout is indicated 90 in FIG. 47. The message gateway router is operative to find the field map table record that includes the resolved INT_MSG_SID value and the original message version, original field number and original field data values resolved from the message field table record and the header of the message. Upon finding the message map table record in the data store including this data, the message gateway router is enabled to resolve field map data designated FIELD_MAP_DATA which is a value indicative how the data for the first field number is to be placed into the cell array in the MGR.

Having placed the data from the first field in the raw message, which was in Field 12 of the SME message sent by the line driver, in the appropriate position in the MGR cell array, the MGR then moves on to the next field. It does this by incrementing the field number (FIELD_NUM) counter to "2". The MGR then repeats the process finding a message field table record corresponding to the INT_MSG_SID value and the new field number. Upon having resolved the length of the next message field the MGR then finds a field map table record that corresponds to this next field number which provides the field map data to place the second field from the raw message into the MGR cell array. The field number is again incremented. This process is repeated until all of the fields in the raw message have been placed in the cell array of the MGR. In this manner the original raw message is mapped into the cell array of the MGR and is transformed to a new format based on its message format and type, which new format is suitable for use by the component of the event management system which can handle that type message.

As shown in FIG. 3, the message gateway router 34 is further operative to generate a record in a message log schematically indicated 92. This message log is comprised of records stored in the data store 52. An example of the fields held in a message log record of an exemplary embodiment is schematically indicated by status message log table record 94 shown in FIG. 51. The MGR is operative to insert these values from its cell array based on where they are mapped into their designated positions within the cell array.

As can be appreciated from the sample description of the host message, many of the values in the status message log table record are present in the host message or are determined by the MGR during its operation. The MGR is also operative to resolve an ATM_SID value. This value is resolved as shown in FIG. 50 from ATMs table records which have ATMs table record layout 96. The values necessary to resolve the ATM_SID value includes the NETWORK_SID value which may be derived from network table records which are schematically shown as record layout 98 in FIG. 51. As shown from table record layout 98 the NETWORK_SID value can be resolved from the network ID value which is included in Field 2 of the host message. From the NETWORK_SID value and the terminal ID value (Field 1 of the host message) an ATM table record can be resolved which provides the ATM_SID value.

Other values for the status log table record, including the FAULT_SID, PROBLEM_SID, DEVICE_STATUS_SID values are not resolved at this point but are left for resolution at a later stage by operation of the device status processing program.

Having reformatted the raw message from the host into a form suitable for use by the next component within the system, the MGR is next operative to construct a message from its cell array directed to the next component of the system. In the case of an ATM status condition message, the next component will be the device status processing program 36 (DSPP). To send the message from the MGR to the device status processing program the MGR constructs a new SME format message. This new message has a different HEADER SID value in Field 1 of the message which is indicative that this message will have a different format which is suitable for processing by the DSPP.

The message from the MGR to the DSPP is a union of structures as are all internal system messages with the exception of messages from the line driver to the MGR. The message includes structures which will eventually be required in a message from the DSPP to the multimedia reporter. Additional structures required for the MMR to perform its functions will be resolved by the DSPP.

As reconstituted by the MGR from its cell array, the message to the DSPP in the preferred embodiment includes the following structures.

It should be noted that while the foregoing description of the structures indicates the origins of the data from the exemplary ATM status message previously described, a different ATM status message format could have been used as the source for the data. The MGR functions to reformat such other format host messages so a message having this group of structures will be produced by the MGR when the message is of a type to be handled by the DSPP.

The MGR resolves a TARGET NODE SID value for sending the message to the DSPP by reviewing the node table record for the MGR. As can be seen with reference to the node table record layout 76 in FIG. 46, the node table record includes a designator for a parent node of the particular node (PARENT_NODE_SID). In the case of the MGR, the NODE_SID of the device status processing program is the "parent node" of the MGR. The MGR is operative to resolve this NODE_SID value for purposes of sending the message to the DSPP.

After constructing a new message the MGR is operative to call the send message routine. The send message routine works in the manner previously described to determine if the TARGET NODE SID to which it is sending the message is

| Structure No. | Name | Description |
| --- | --- | --- |
| 1 | SME_MSG_TYPE | This corresponds to the message version value for this message structure |
| 2 | DATE | This is the date of the fault message from Field 3 of the host message |
| 3 | TIME | This is the date of the fault message from Field 3 of the host message |
| 4 | ATM_SID | This is the ATM_SID value resolved by the MGR which corresponds to a table record for the ATM that generated the fault message |
| 5 | FAULT_SID | Null at this time |
| 6 | MMR_ACTION_SID | Null at this time |
| 7 | UNUSED | Null at this time |
| 8 | MSG_TYPE | This value is indicative of the solicited/unsolicited character of the message and is based on the data in Field 6 of the original host message |
| 9 | MSG_ID | This value is indicative of the device status message indicator and is based on the data in Field 7 of the original host message |
| 10 | LUNO | This value is indicative of the logical unit number and is based on data in Field 9 of the original host message |
| 11 | STATUS_ID | Null at this time |
| 12 | DEVICE_ID | This value is indicative of the device identifier and is based on the data in Field 12 of the host message |
| 13 | DEVICE_SID | Null at this time |
| 14 | STATUS_BYTES_LEN | This value is indicative of the length of the status message in the STATUS_BYTES portion of this message |
| 15 | STATUS_BYTES | This is the status information which is based on the data in either Field 15 or 17 of the original host message based on the type of ATM generating the message |
| 16 | STATUS_MSG_LOG | Null at this time |
| 17 | STATUS_MSG_LENGTH | Null at this time |
| 18 | STATUS_MSG | This is a reproduction of the original status message sent by the ATM in its entirety |
| 19 | ATM_MODE_SID | Null at this time |
| 20 | DEVICE_STATUS_SID | Null at this time |
| 21 | STATUS_BITMAP_LEN | Null at this time |
| 22 | STATUS_BITMAP | Null at this time |
| 23 | SML_STATUS_DATE | This is the status message log status date which is the date associated with the record corresponding to the status message that has been created in the data store |
| 24 | VENDOR INTERFACE | Null at this time |
| 25 | CREATE_TROUBLE_IND | Null at this time | located on the same computer as the MGR. Upon determining whether the device status processing program 36 is located on the same computer or another computer, the send message routine is operative to deliver the message from the MGR to the device status processing program. For purposes of this example it will be presumed that the DSPP is on the same server as the MGR and the message is delivered to the DSPP through the interprocess communications function.

Figure 4:
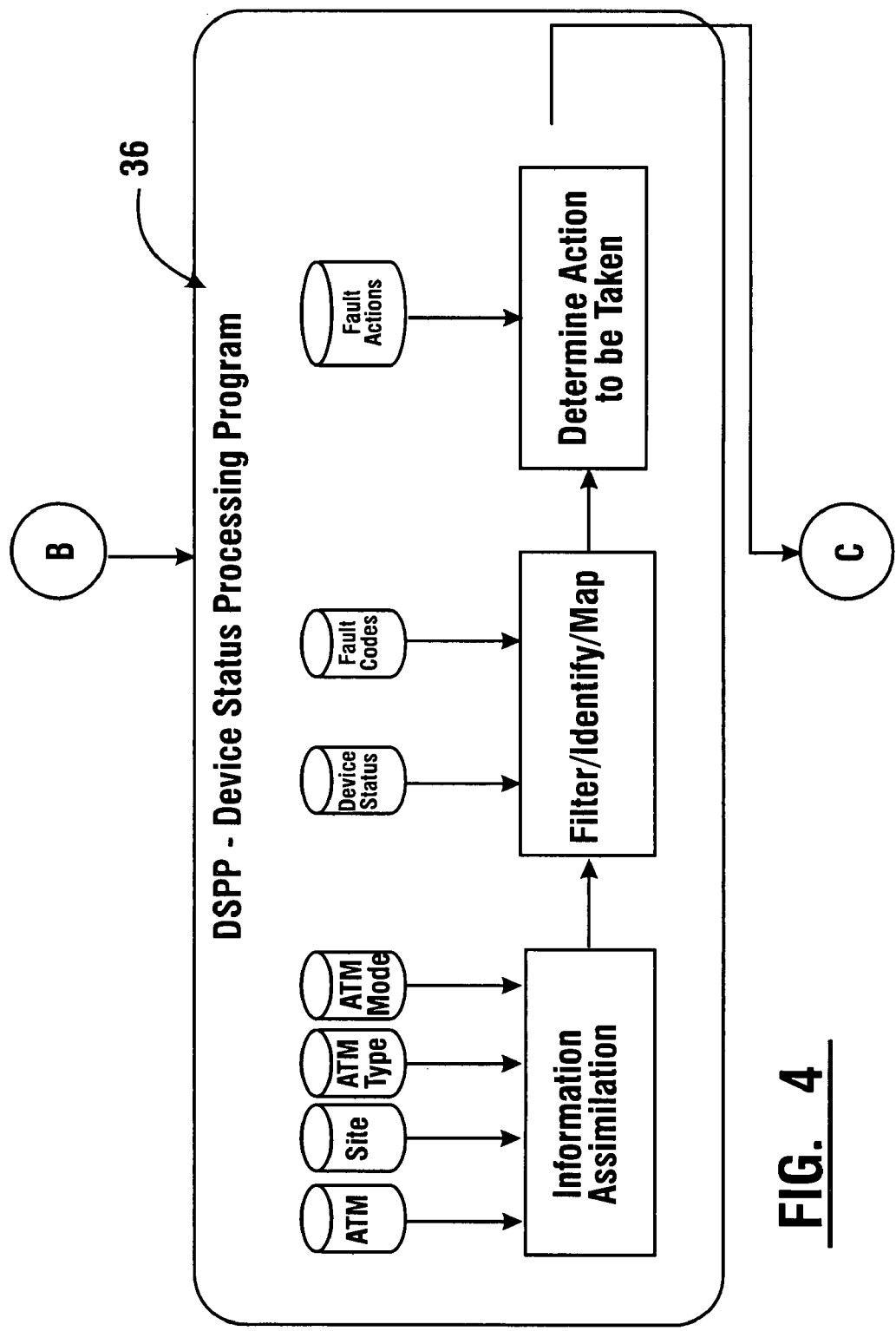
FIG. 4 is a schematic view of the message flow through a further portion of the system including a device status processing program.

Upon receiving the message from the MGR the device status processing program 36 is operative to carry out the processes which are schematically represented in FIG. 4. These processes include the assimilation of information from the message it receives and the database concerning the ATM which is sending the message and determining the particular manner in which it is operating so as to interpret its message. The device status processing program 36 then operates to determine the particular fault and device associated with the condition message sent by the ATM. This is done by the device status processing program as schematically indicated based on information stored in the data store 52. The information in the data store is representative of the various device and fault codes and the particular conditions and devices they represent. The data in the message sent by the MGR is used to resolve a particular fault condition which has been indicated.

As further schematically represented in FIG. 4, the device status processing program, after having determined the identity of the ATM exhibiting the condition and the nature of the fault condition represented by the condition message that the ATM generated, is then operative to determine a value representative of an action to be taken. This is done based on information that is stored in the database concerning actions to be taken in response to a particular fault condition in a particular device at a particular ATM.

To establish the information that is required in the data store to carry out the functions of the device status processing program, as well as the multimedia reporter, certain data is input to the data store. This is done in accordance with the categories of information shown in the main menu window 66 shown in FIG. 8. Specifically, under "Administration" a "Holidays" window 100 shown in FIG. 15 may be used to input certain days that are considered to be holidays at particular ATM locations. This information works in coordinated relation with the location data and is used by the system in situations where first line service is needed which could be done by personnel at a branch of a bank, or other persons normally present at the ATM location. However, this data enables the system to check if the condition requiring first line service has occurred during a holiday, at which time someone other than branch banking personnel will need to be contacted.

Figure 57:
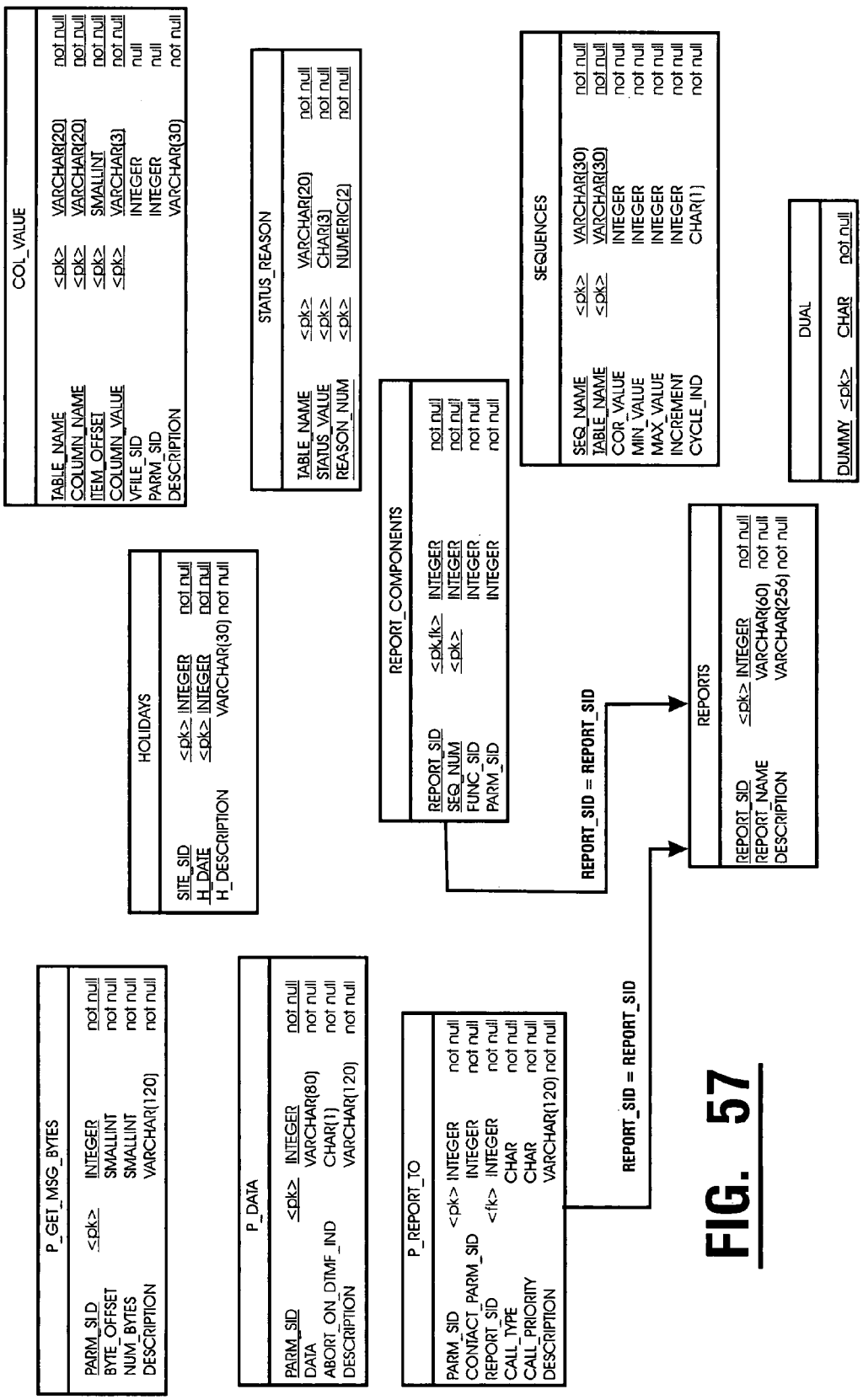

A database table record layout for "Holidays" records is shown in FIG. 57. The Holidays table record layout includes a SITE_SID value which corresponds to the location where the ATM is located.

A vendors window 102 is shown in FIG. 14. Each vendor window 102 shows the name of a particular vendor who can service banking machine conditions. The vendors window further includes contact information for persons at the vendor including phone and fax information. The information input through the vendor windows may be used to contact particular individuals at service vendors when such individuals need to be contacted for purposes of servicing conditions at ATMs. The vendors window may also contain an indication of whether the vendor will be permitted to indicate the status of calls by responding through the interface device of the multimedia reporter, or whether some other method will be used.

Figure 55:
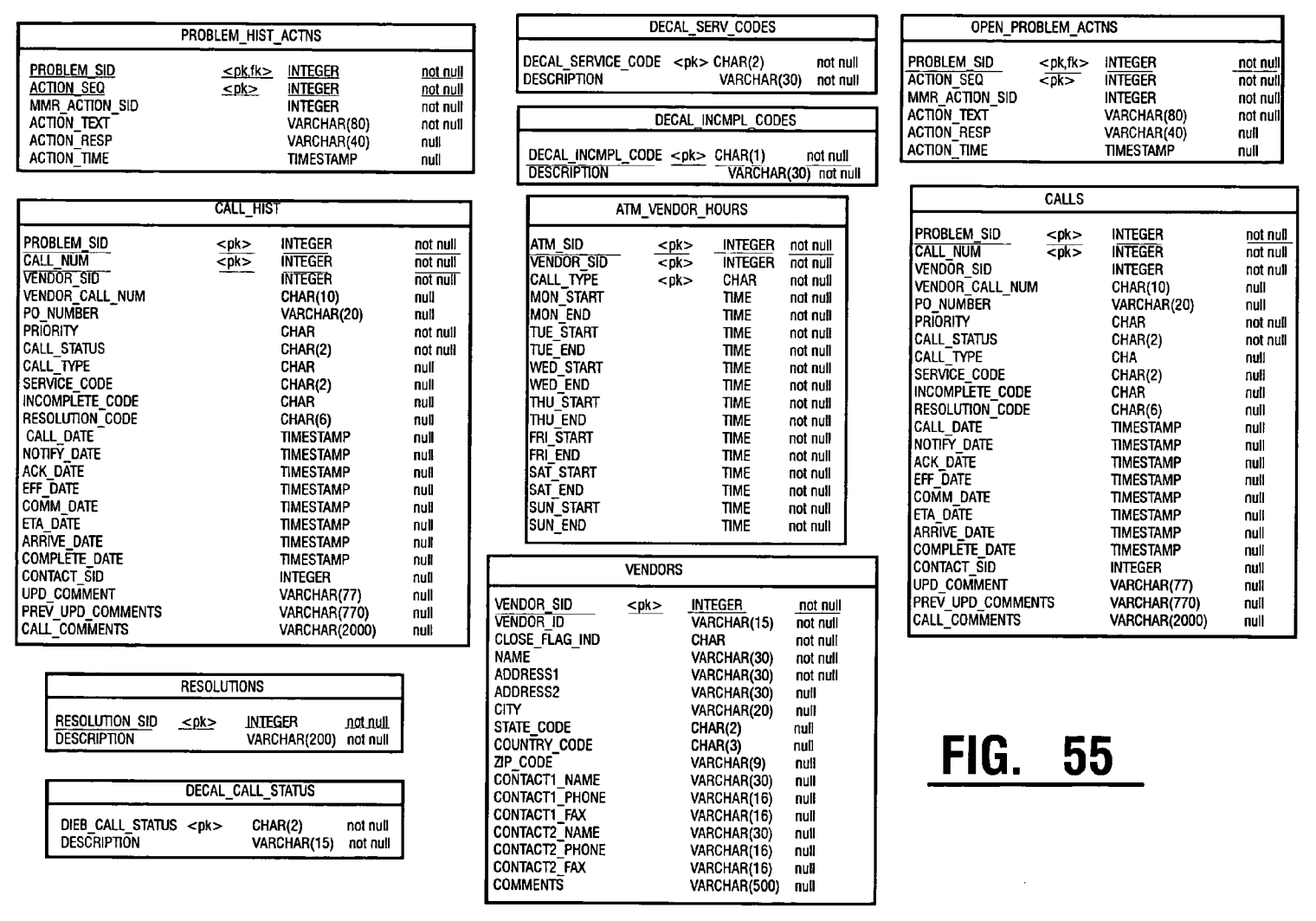

A database table record layout for "Vendors" records is shown in FIG. 55. Also shown in FIG. 55 is a layout for "ATM Vendor Hours" which contains data values representing a particular ATM and the vendor who will be contacted concerning the ATM, the hours the vendor is responsible and the method of contact or "call" to be made to the vendor.

FIG. 15 shows a message recipients window 104. The message recipients window provides contact information for various entities that may be notified of conditions at machines in the system. It should be noted that the message recipients window may contain phone, fax and pager numbers for message recipients. In addition, the message recipients window may include a mailbox number and password for each message recipient. This information may be used to provide security for the interface device so that only persons who input a proper mailbox number and password will be allowed to gain access to the interface device of the system.

Figure 54:
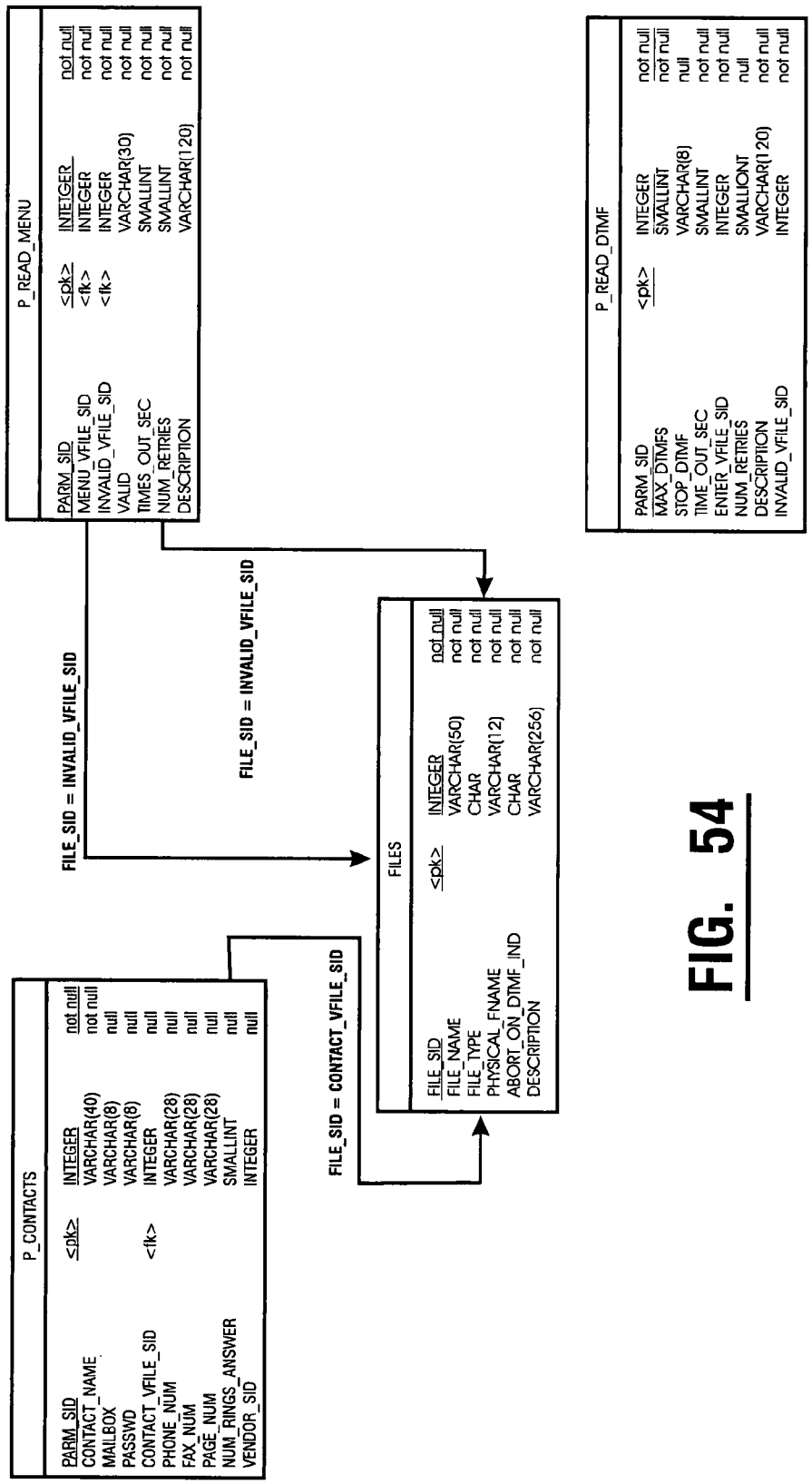

FIG. 54 shows a data base table record layout for "contacts" who are message recipients. These records contain data values representative of a system mailbox and password as well as contact number information. The records also contain values which correlate this contact with a vendor and voice files to be used for the contact.

Figure 28:
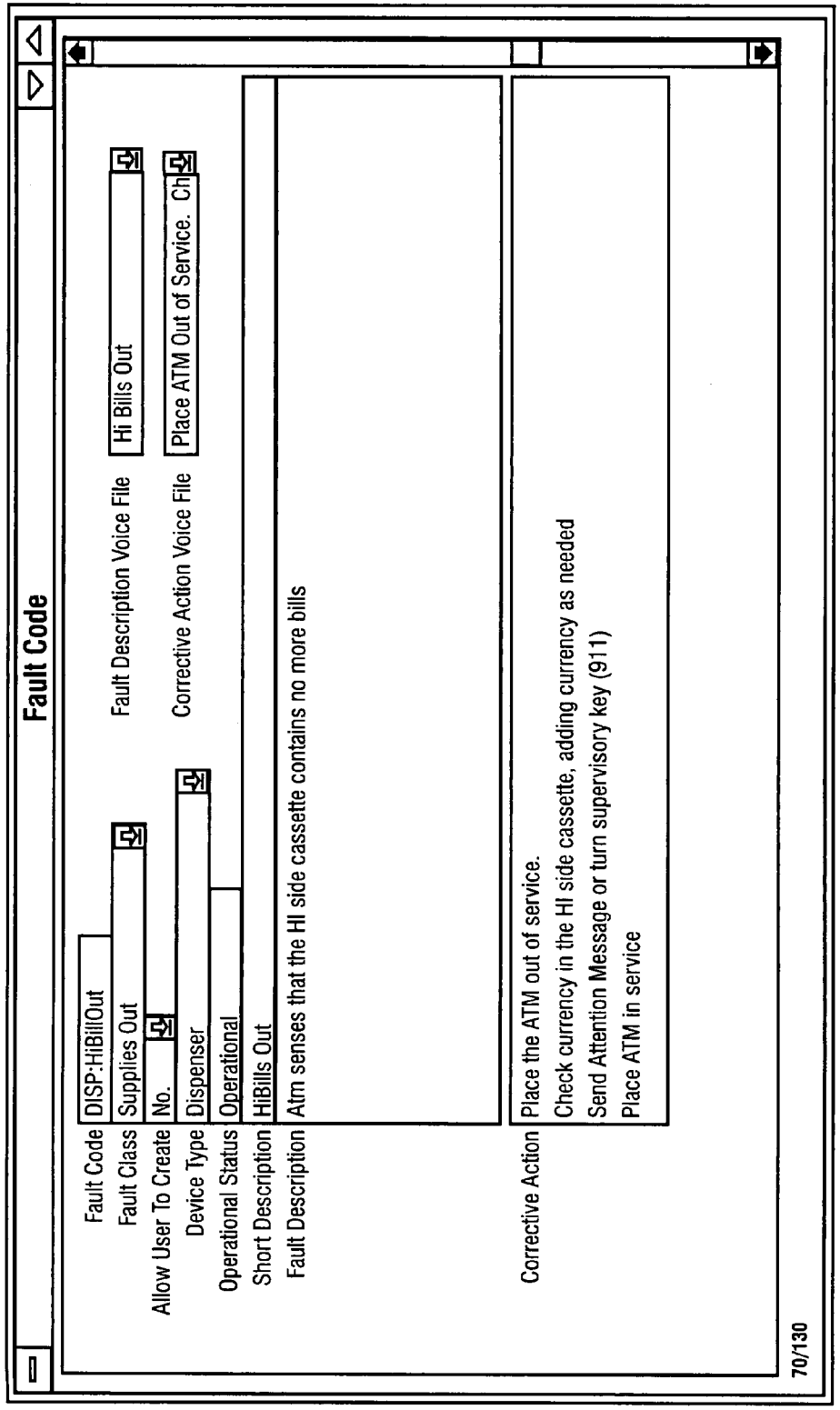
FIG. 28 is a fault codes window generated by the software of an exemplary embodiment of the system.

FIG. 28 shows a fault codes window 106. The fault codes window 106 shows the particular condition associated with a condition message which is generated by the ATM. It should be noted that the fault codes window includes information concerning the particular device type within the ATM that the particular fault code is associated with. It also indicates a particular class and operational status associated with the particular fault. For example, some faults may still allow an ATM to be operable or partially operable in a degraded mode. Such a condition may not necessitate attention as immediate as other conditions. In addition, it should be noted that the fault codes window includes information concerning corrective action that may be taken to correct the particular condition.

Figure 49:
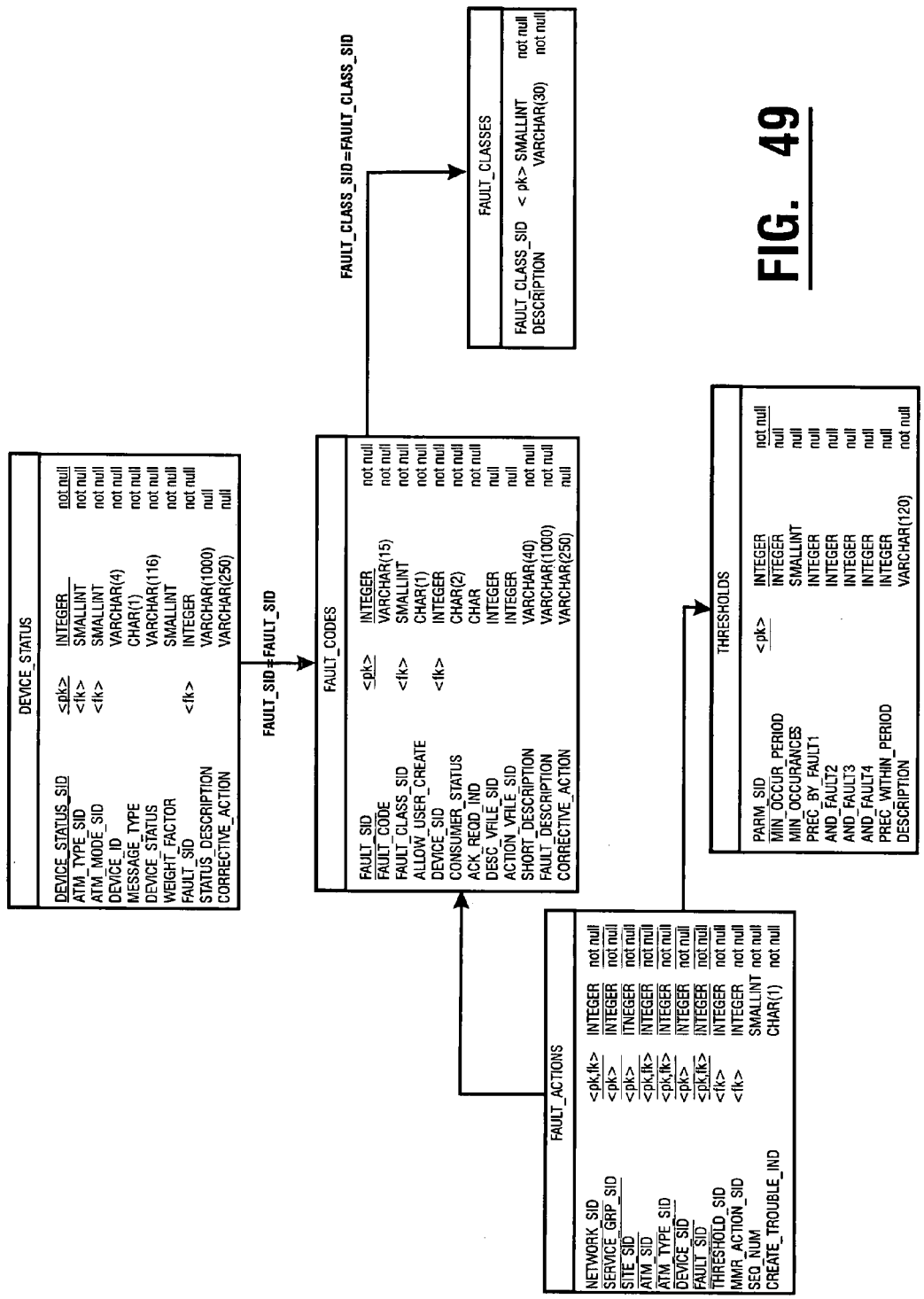

The layout of "device type" database table records is shown in FIG. 50. Values in the message which are representative of the ATM device, message type and mode enable resolution of a device id value (DEVICE_SID). FIG. 49 shows a layout for "device status" table records. The device status table records are used to resolve a value representative of the fault which has occurred (FAULT_SID) from other data values.

Figure 7:
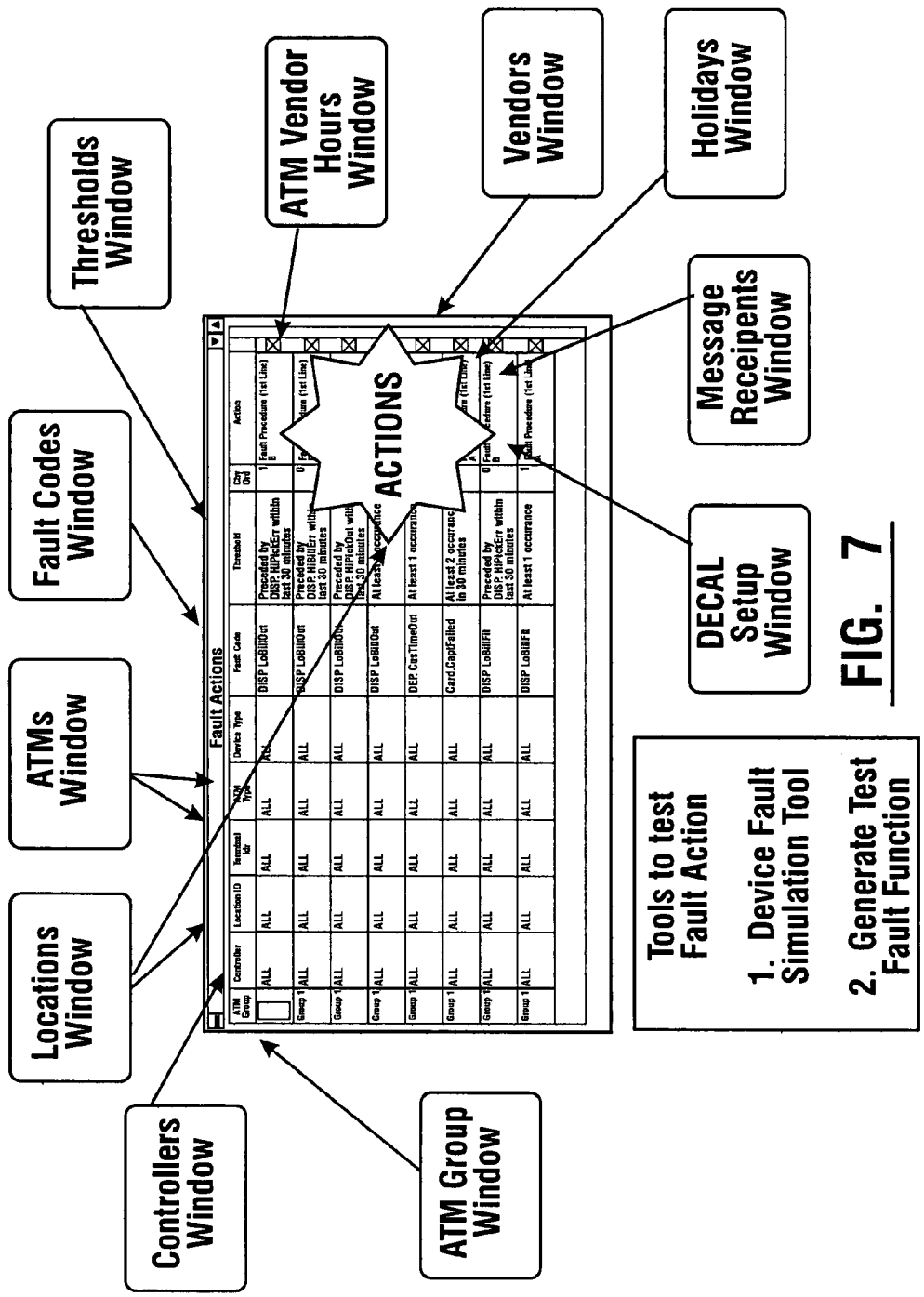
FIG. 7 is a schematic view showing a fault actions window displayed to a user by the exemplary system, including references to related windows from which the information shown in the fault actions window is derived.

A fault actions window 108 similar to that shown in FIG. 7 is shown in FIG. 29. The fault actions window is operative to lay out for each banking machine connected to the system and each type of fault condition at the machine, the particular action to be taken in response thereto. The first four columns of the table are used to specify the particular ATM for which fault actions will be taken. If the user wishes to limit particular fault actions to a particular device type they are also enabled to do that through an entry in the sixth column of the table in the fault actions window. The seventh column of the table fault actions window specifies the particular fault code that the action corresponds to. The eighth column of the table corresponds to threshold values which are specified by the user in a thresholds window 110 shown in FIG. 30. The thresholds window enables the user to include in memory certain prior conditions which, if they have been found to have occurred, dictate the action to be taken when the fault condition arises. These threshold conditions are shown in the thresholds column of the fault actions window.

The check order column represents the order or priority in which the computer is to check the various possible actions which may be taken in response to the same fault code. This is also referred to as a "sequence" value. The check order column has values which range from zero which is the first condition to be checked through sequentially increasing higher numbers which are subsequently checked.

The actions column contains the action to be taken in response to the occurrence of a fault code and prior occurrences meeting the requirements of the corresponding threshold. The actions procedures are predefined by the user. An example of predefined action procedures and the corresponding actions that will be taken by the system are shown in FIGS. 31 and 32. These actions procedures also enable a user to set up their own procedures in a tabular arrangement.

The table in the fault actions window further indicates whether or not a trouble ticket will be generated for the particular condition. Included among the actions may be the automatic notification of a service vendor through an electronic link such as Diebold, Incorporated's DECAL® system.

As represented in FIG. 7 the table in the fault actions window schematically indicates the coordination of the various types of information that are used by the device status processing program 36 in carrying out its actions. In the exemplary embodiment data that is input by the user is stored in the table records in the data store of the system and is available for being accessed by the device status processing program in carrying out their functions.

The layout of the "fault actions" database table record is shown in FIG. 49 as is the layout of the related "thresholds" records. As can be seen, a table record which includes the values corresponding to the particular network, group, site, ATM, ATM type, device, fault and threshold, corresponds to a particular MMR action value. This value determines the actions the MMR will take.

Figure 48:
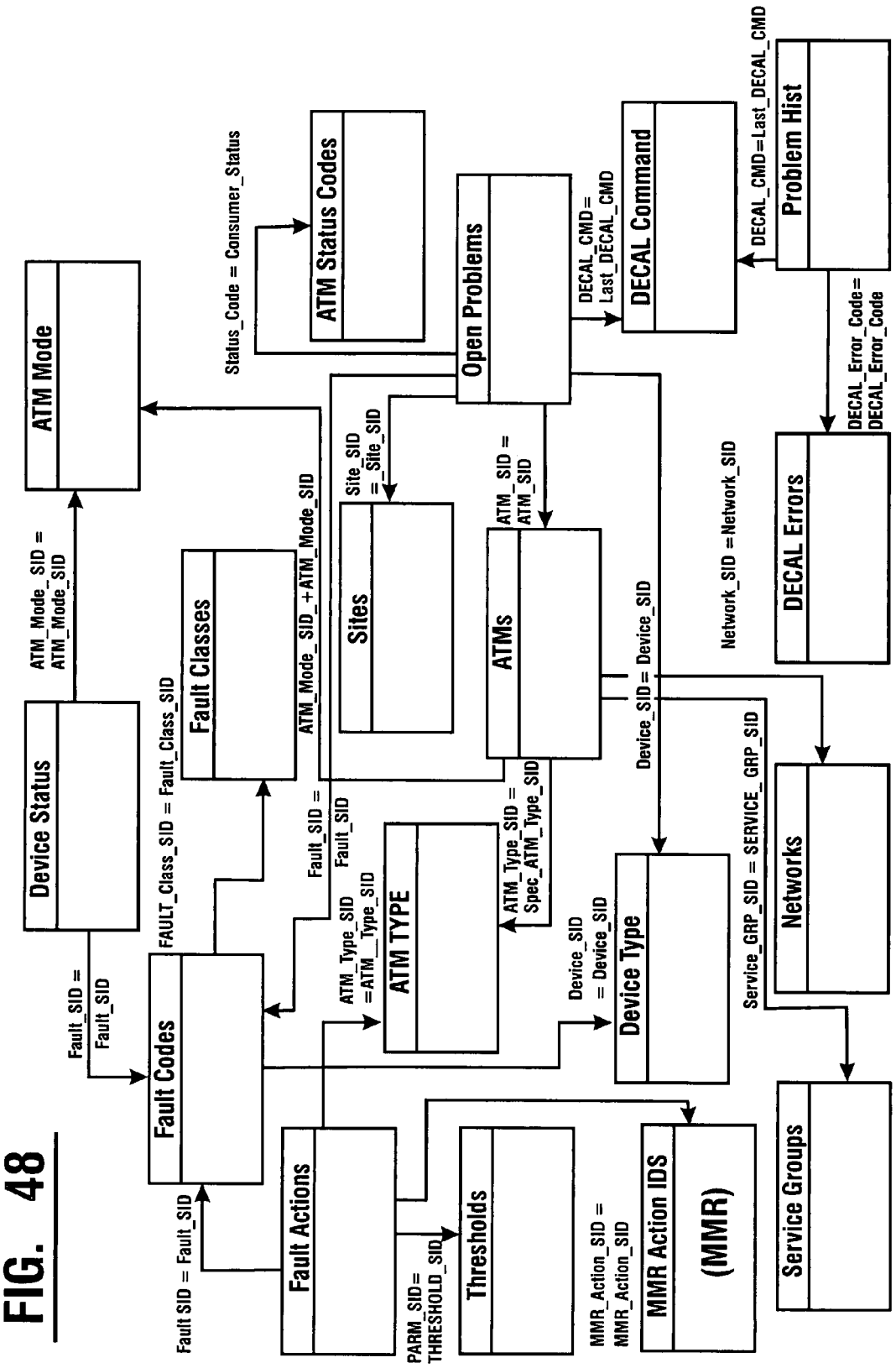

The manner in which the device status processing program resolves information which eventually produces a designation for a particular action to be taken by the multimedia reporter 40, is shown with reference to the database schema shown in FIG. 48. FIG. 48 shows the various table records and the values which are derived therefrom by the device status processing program in resolving the final value indicative of an action the MMR is to take. The layouts of the table records shown in FIGS. 49, 50 and 55 through 59 show further values which are stored and which can be resolved and recovered from the records in the data store.

The device status processing program 36 is operative to resolve a multimedia reporter action system ID designator referred to as MMR_ACTION_SID. This designator is used by the system to cause the multimedia reporter to carry out the particular actions which are resolved as the appropriate actions to be carried out in response to occurrence of a fault condition at a particular ATM. Generally these actions will include contacting a particular entity or servicer in a particular manner. The fault actions table record resolved by the device status processing program also indicates whether a trouble ticket record is to be opened in the data store in response to a particular condition message sent by the ATM. The opening of records which correspond to "trouble tickets" is carried out by the MMR in a manner later discussed.

Figure 5:
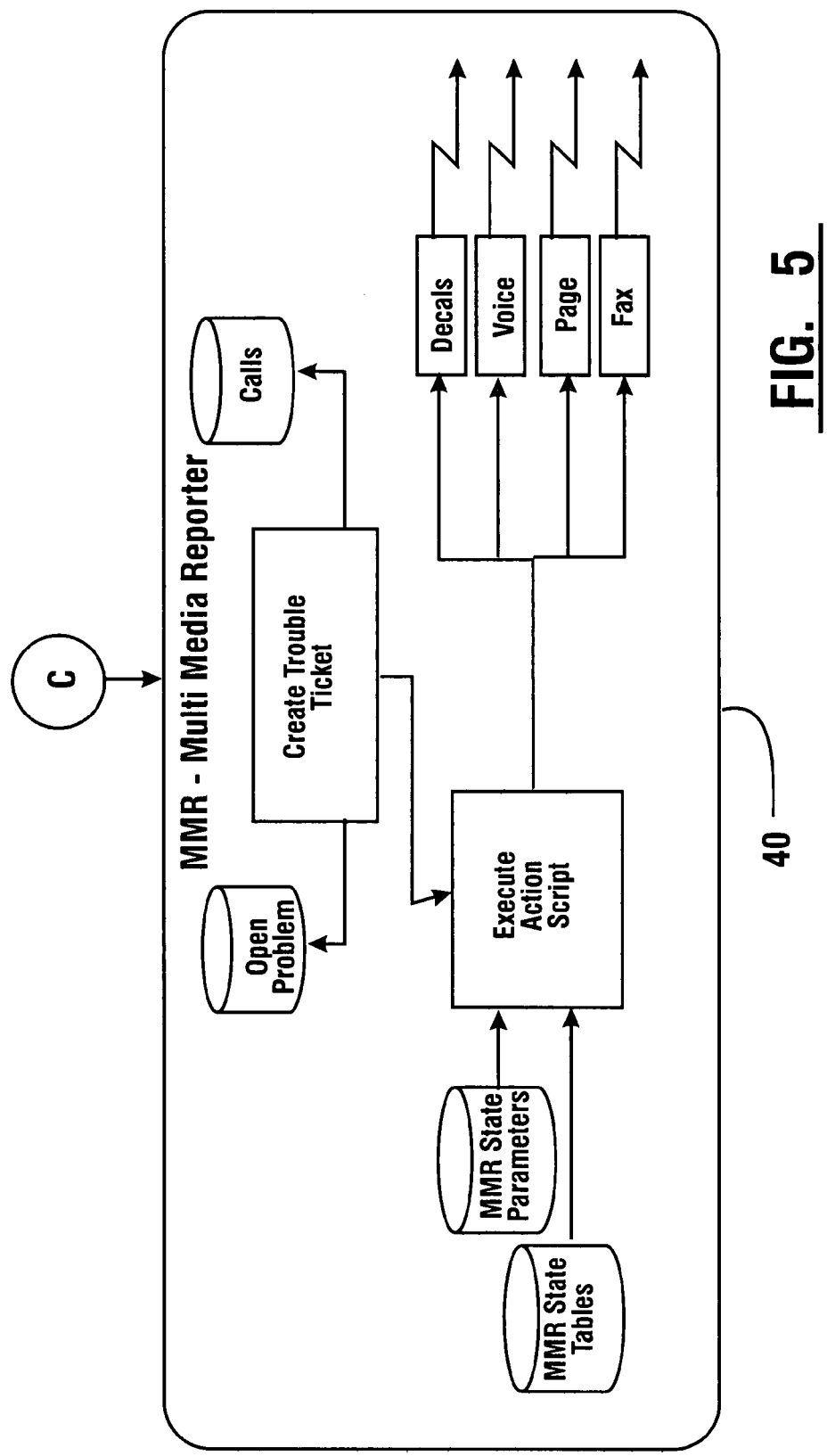
FIG. 5 is a schematic view of the message flow through a further portion of the system which includes a multimedia reporter.

The action message value is sent to the multimedia reporter 40 which is shown schematically in FIG. 5. In response to receiving the action message the multimedia reporter is operative based on data in the data store to execute particular actions that are responsive to the action message resolved by the device status processing program. The multimedia reporter is generally operative to dispatch a message to a servicer or other entity through one of the message mediums. It also establishes a schedule of future actions to be taken which is maintained in the scheduler 38. The MMR also tracks and maintains records of conditions and their resolution, and displays and analyzes the records.

After resolving the particular MMR_ACTION_SID value representative of the action to be taken by the MMR, the device status processing program is operative to build a message to be sent to the multimedia reporter. The device status processing program is operative to supplement the union of structures that was sent to the DSPP by the MGR with additional data. The data in the structures are values resolved during processing by the DSPP.

The DSPP is also operative to change the designator which leads the union of structures to indicate the structure of the new message. In the preferred embodiment the union of structures in the message from the DSPP to the MMR is as follows.

| Structure No. | Name | Description |
|---|---|---|
| 1 | SME MSG TYPE | This is a designator of a particular union of structures for this message |
| 2 | DATE* | This is the date of the fault message derived from Field 3 of the host message and is indicative of the date associated with the fault which causes the action message to be generated |
| 3 | TIME* | This is the fault message receive time |
| 4 | ATM_SID* | This is the ATM system identifier value which has been derived from the terminal ID value in the MGR message and the NETWORK SID value derived from the network ID value in the MGR message |
| 5 | FAULT_SID | This is derived by the device status processing program in the course of resolving the MMR_ACTION_SID based on the ATM_MODE_SID and the ATM_TYPE_SID from the ATM_SID table record. Further, the MGR message provides the terminal ID, terminal status and message type information used in deriving this value |
| 6 | MMR_ACTION_SID | This is the value indicative of the action that the multimedia reporter will take. It is resolved from the fault actions table record based on the NETWORK_SID, ATM_SID, ATM_TYPE_SID and FAULT_SID which are derived in the course of |

| Structure No. | Name | Description |
|---|---|---|
| | | resolving the MMR_ACTION_SID. The FAULT_SID table record provides the DEVICE_SID value, and the ATM_SID table record provides the SERVICE_GRP_SID and the SITE_SID values which are included in the message |
| 7 | UNUSED | Null at this time |
| 8 | MSG_TYPE* | This is value indicative of the solicited/unsolicited character of the message from the ATM |
| 9 | MSG_ID* | This value is indicative of the device status message indicator |
| 10 | LUNO* | This value is indicative of the logical unit number |
| 11 | STATUS_ID | This value is derived from the status descriptor information in Field 12 of the original host message |
| 12 | DEVICE_ID* | This value is indicative of the device identifier information |
| 13 | DEVICE_SID | This is previously derived by the device status processing program from the FAULT_SID table record |
| 14 | STATUS_BYTES_LEN* | This value is indicative of the length of the status message |
| 15 | STATUS_BYTES* | This data is the status information from the original message generated by the ATM |
| 16 | STATUS_MSG_LOG | This is the data in the status message log record corresponding to the status message |
| 17 | STATUS_MSG_LEN | This value corresponds to the length of the data in structure 18 |
| 18 | STATUS_MSG* | This is reproduction of the original status message from the ATM |
| 19 | ATM_MODE_SID | This value is previously derived by the device status processing program |
| 20 | DEVICE_STATUS_SID | This value was previously derived by the device status processing program |
| 21 | STATUS_BITMAP_LEN | This value indicates the length of the bitmap used to identify the fields present in the status message |
| 22 | STATUS_BITMAP | This is the bitmap which indicates the fields present in the status message |
| 23 | SML_STATUS_DATE* | This value is the status message log date corresponding to the status message log table record |
| 24 | VENDOR INTERFACE | These structures contain additional data that may be needed to be sent to a vendor's on-line fault tracking system |
| 25 | CREATE_TROUBLE_IND | This is a create trouble indicator which is an indication of a trouble ticket is to be created by the MMR. This is derived from the fault actions table in the device status processing program |

*indicates same structure and value as in MGR message to DSPP.

This message in this format provides all the information required by the multimedia reporter 40 of the preferred embodiment to begin resolving how to send the messages to the proper entities, to create a schedule of activities and to generate records pertaining to the condition which caused the message from the ATM to be sent.

The operation of the multimedia reporter is accomplished through state flow processes. The state flow processes are carried out in a manner responsive to the action message received from the device status processing program and information in the data store, to notify the appropriate personnel in accordance with parameters that have been set up by an operator of the system. These include the particular individuals and corresponding fax, phone and pager numbers for which representative data is stored in the database. This further includes providing the particular specialized voice files for which representative data is stored in the database records, to be used with the particular entities to be notified. Similarly, the multimedia reporter is operative to provide the particular configurations for fax formats and E-mail and other electronic message formats which may be necessary to notify appropriate entities or other servicers of the condition at the ATM.

The multimedia reporter operates through state flow processes to provide the appropriate message in the appropriate manner. A database schema for the resolution of information which is used to carry out state flow processes of the preferred embodiment is shown in FIGS. 52 through 59. As can be seen from these Figures the stored data is arranged in table records which are used by the multimedia reporter to resolve values associated with the particular actions to be taken and to actuate the interactive voice response device to dispatch the appropriate message in the appropriate medium. Of course, in other embodiments other approaches may be used.

The multimedia reporter is also enabled to respond to input messages provided by servicers to the message receiving portion of the interface device, and to communicate input data to the data store to indicate the content of the input messages. This includes indicating that responsive messages have been received to acknowledge and close trouble tickets. In addition, the interface device may also receive data representative of other activities by servicers or other entities, such as input messages indicative of arrival of the servicer at the location of the ATM, that the servicer or other person is currently working off site to correct the problem, that the problem is resolved and is pending closed awaiting some confirmation activity, that the problem is resolved and that the trouble ticket is closed, and that the trouble ticket is cancelled. Of course the system may be configured to receive input messages indicative of other conditions which pertain to the status of corrective activities. The input messages are also operative to cancel actions that would otherwise be taken by the MMR in response to messages from the scheduler, if the established time had elapsed without the input message being received.

It should be understood that while the receipt of input messages through the interface device is discussed in connection with the interactive voice/response module (IVR) the interface device used with the multimedia reporter may receive input messages by E-mail data or other data link from a vendor computer system such as the DECALS system provided by Diebold, Incorporated. Further, while the system as described uses a single communications device and interface for dispatching and receiving messages, other embodiments may have multiple interfaces operate to dispatch messages, receive messages, or both. Such interfaces may comprise hardware, software and combinations thereof.

The trouble ticket records are generated by the MMR and stored in the data store responsive to the value in the union of structures sent by the DSPP which indicates whether trouble tickets are to be opened. The trouble record which shows the condition indicated at an ATM include data indicating that they have "open" status until the record is indicated as closed. The record is preferably updated with further information until information is included in the record to indicate it is closed. The record may be closed either by the servicer sending an input message through the interface device as previously discussed, or by the user who operates the system using the appropriate window and input device. In some embodiments it may be desirable for a user to input a message through an input device such as a mouse or keyboard indicating that the problem has been resolved or cancelled. The system is preferably configured to enable a servicer or user to input messages electronically either from the ATM, through the interface device or another source to update information in the trouble record and eventually to indicate that the condition which caused the signal to be generated from the ATM has been corrected.

The message sent by the DSPP to the MMR includes the value which causes the MMR to open a "trouble ticket" in the data store when it receives the message. The determination as to whether a trouble ticket is opened is based on the fault actions table record resolved by the DSPP as shown in FIG. 49. The inclusion of the value in the table record is based on the user setting the trouble ticket indicator (TT IND) in the fault actions window which details the action to be taken in response to the occurrence of the fault. The trouble ticket indicator is the final column in FIG. 29.

Figure 51:
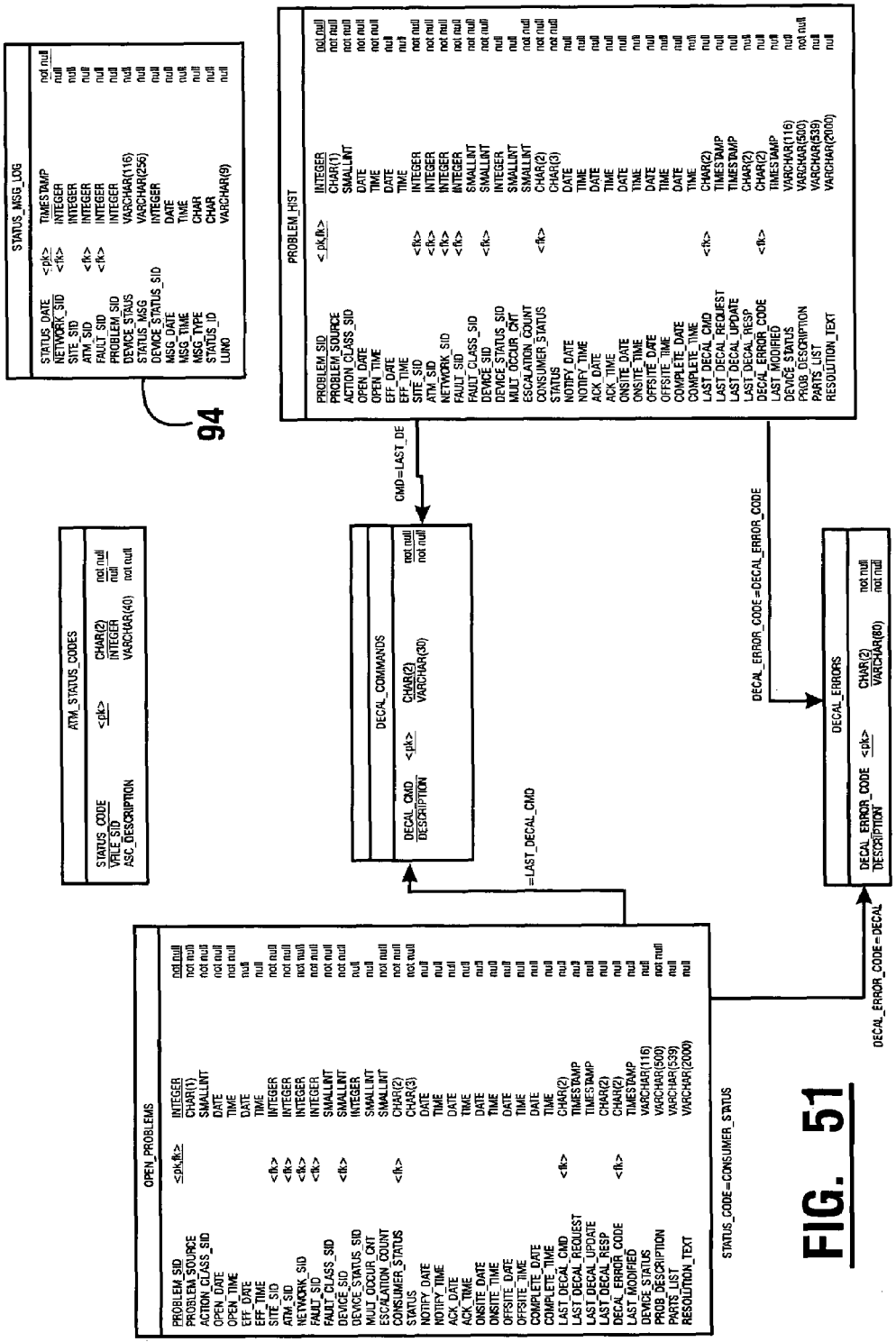

In response to receiving a message which includes an instruction to open a "trouble ticket" the MMR operates to establish an "open problems" record in the data store. The layout of the open problems table records is shown in FIG. 51. The MMR fills in as much of the data in the record as it has available when it receives the message. The MMR operates to add data to the table record as events occur until the record is "closed." The record can be closed by an input message which indicates the problem is fixed or an input that indicates that the "trouble ticket" is cancelled. Cancellation may be appropriate in circumstances where testing of the system is being conducted or where the fault condition is otherwise known to not require further action. When open problems are "closed" the records remain in the data store and can be used for analytical purposes.

"Open Problems" records which are closed are reclassified periodically and stored as "problem history" records in the data store. The layout for the problem history table records in the data store is shown in FIG. 51. The closed records will be changed to problem history records generally on a daily basis. A user may eventually move closed "problem history" table records into the archive records of the data store. This is done periodically, but generally after a longer period than the period for reclassification of "open" records to "history" records. When this is done a "problem history" record is reclassified as an "archive problems" (ARC_PROBLEMS) record. The layout of the archive problems records is shown in FIG. 58. The layouts of the problems type table records are generally the same as no additional substantive data is added to the record once it is closed.

Trouble ticket record information can be obtained by a user of the system by selecting appropriate designators on the main menu window 66 producer on a display by the event management system as shown in FIG. 8. For example, selecting the trouble ticket monitor provides a user with the trouble ticket monitor window 112 of the type shown in FIGS. 23 and 24. As shown in FIG. 23, the trouble ticket monitor window enables a user to sort through trouble ticket record information by selecting criteria concerning the status of the trouble ticket. The user is also shown the date associated with the trouble tickets by clicking on a particular date in a calendar window that is shown open in FIG. 23. In addition, the user may selectively review particular locations or terminal IDs as well as fault codes, as indicated by a fault code window in FIG. 24.

By selecting trouble ticket history data from the main menu window 66 generated on a display by the event management system, a user is enabled to call a trouble ticket history window indicated 114 in FIG. 25. The trouble ticket history window is particularly suited for reviewing trouble tickets that have been closed or cancelled, and reclassified as history records. This capability enables the user to review the details concerning recent ATM condition messages and their resolution.

Figure 27:
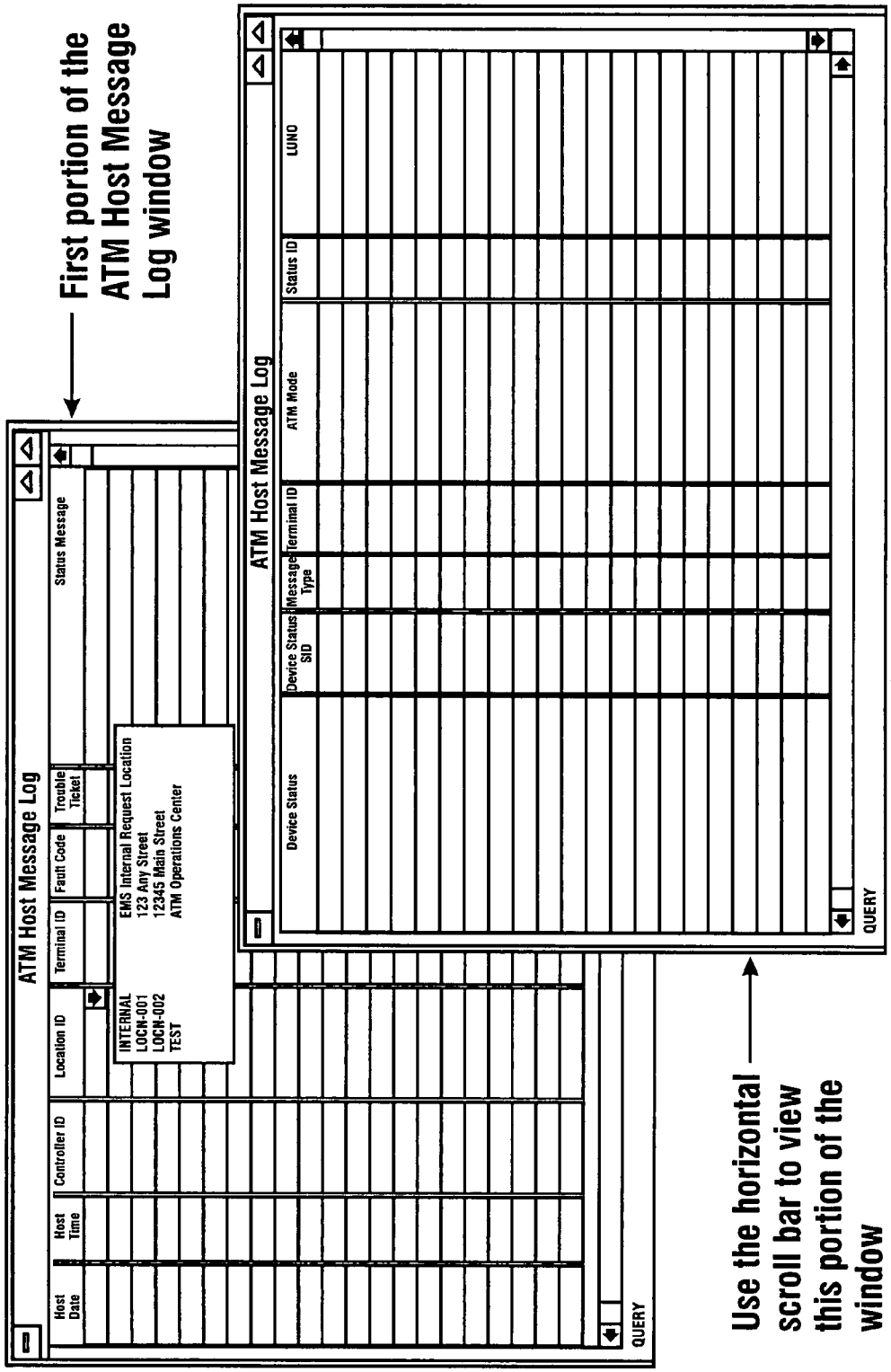
FIG. 27 is an ATM host message log window generated by the software of an exemplary embodiment of the system.

As previously discussed, the MGR 34 is operative to generate records in the data store which provide a log of status messages as reflected by table record layout 94 in FIG. 51. These records include values representative of the condition messages received from a particular ATM host. This data is resolved and displayed by the system on a display to a user in the ATM host message log window 116 shown in FIG. 27. The ATM host message log window enables a user to view particular faults or conditions which have been reported by ATMs which are operated by a particular host system. This is particularly useful for administrators who wish to obtain status information on ATMs that are operated by particular host computers in the system.

The status message log table records are reclassified periodically as archive status message log table records, the layout of which is shown in FIG. 58. The reclassification is done by the system on a periodic basis set by the user. The information in the archive status message log table records is used for analysis and reporting purposes in a manner later discussed.

The MMR acts to carry out actions in response to the fault action value included in the message to the MMR from the DSPP. Generally, the actions that are resolved to be taken by the MMR include a plurality or sequence of actions that are to be conducted in accordance with a schedule. The schedule generally includes giving a prompt notification to a servicer or other entity in a manner and format that the MMR resolves based on the records in the data store. The schedule also includes other actions which are to be taken at times after giving the initial notification, depending on conditions which exist or which have been notified to the MMR as existing at that time. If the MMR has been notified of a condition which eliminates the need for taking a later action in the schedule, the next scheduled action is not carried out.

An example would be a situation where the MMR is configured to notify a particular servicer or other entity of a condition at an ATM. The notification may include sending a notification to a servicer through a pager. The schedule associated with the actions to be taken may include paging the servicer a second time 15 minutes after the first page if the servicer has not contacted the interface device of the MMR and input a message acknowledging the call. When the servicer has not acknowledged the call within 15 minutes of the first page, the MMR sends the second page. However, if the call was acknowledged before the time to send the second page, the instruction in the schedule to send the second page is not carried out by the MMR.

The MMR is preferably configured so that every action message from the DSPP that requires corrective action at an ATM has stored in correlated relation therewith data representative of a schedule of immediate and future actions which are carried out automatically until the problem is corrected and closed, or the problem record is cancelled by the operator of the system.

The operation of the MMR includes the resolution of values representative of a schedule of actions to take in response to the DSPP message, as well as the resolution of values representative of the messages to send to carry out those actions. This includes resolving the manner of contacting the entity who is to receive the message as well as the content of the message to be sent. The MMR further operates to resolve data representative of further action messages responsive to input messages from servicers and other input messages it has previously received related to the particular condition.

Figure 52:
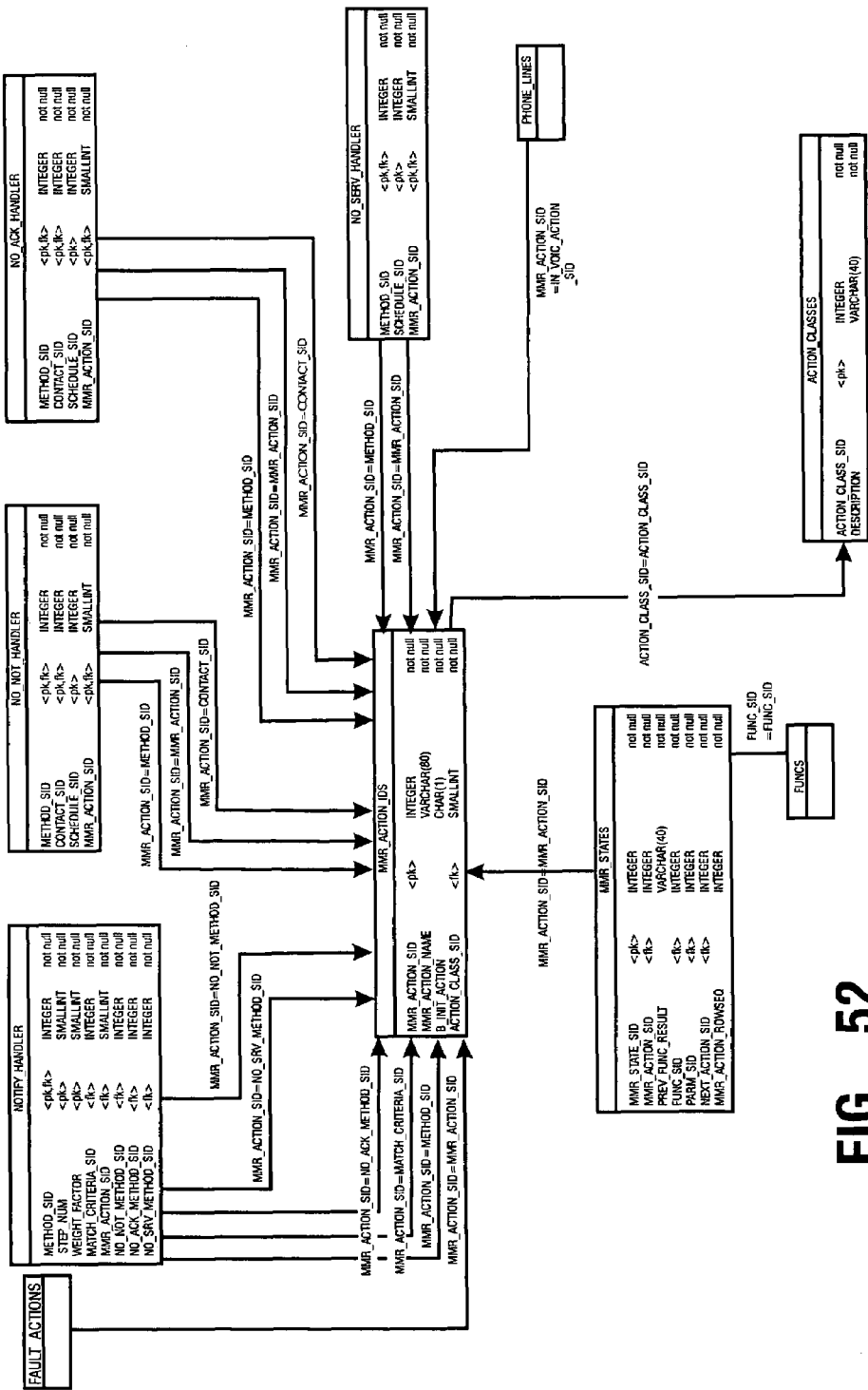

How the MMR of the exemplary embodiment accomplishes these functions can be appreciated from the database table records used by the MMR beginning with the record layouts shown in FIG. 52. The MMR STATE table records provide for each MMR_ACTION_SID value, and a "previous function result" value (PREV_FUNC_RESULT), a function id value (FUNC_SID), a parameter id value (PARM_SID) and a next action value (NEXT_ACTION_SID). A sequence value (MMR_ACTION_ROWSEQ) is also included in the MMR STATES table records. The sequence values correspond to the "check order" values shown in FIG. 29 which is a fault actions window generated on a display by the system. The sequence values are indicators of what is checked first among a plurality of similar conditions.

Figure 53:
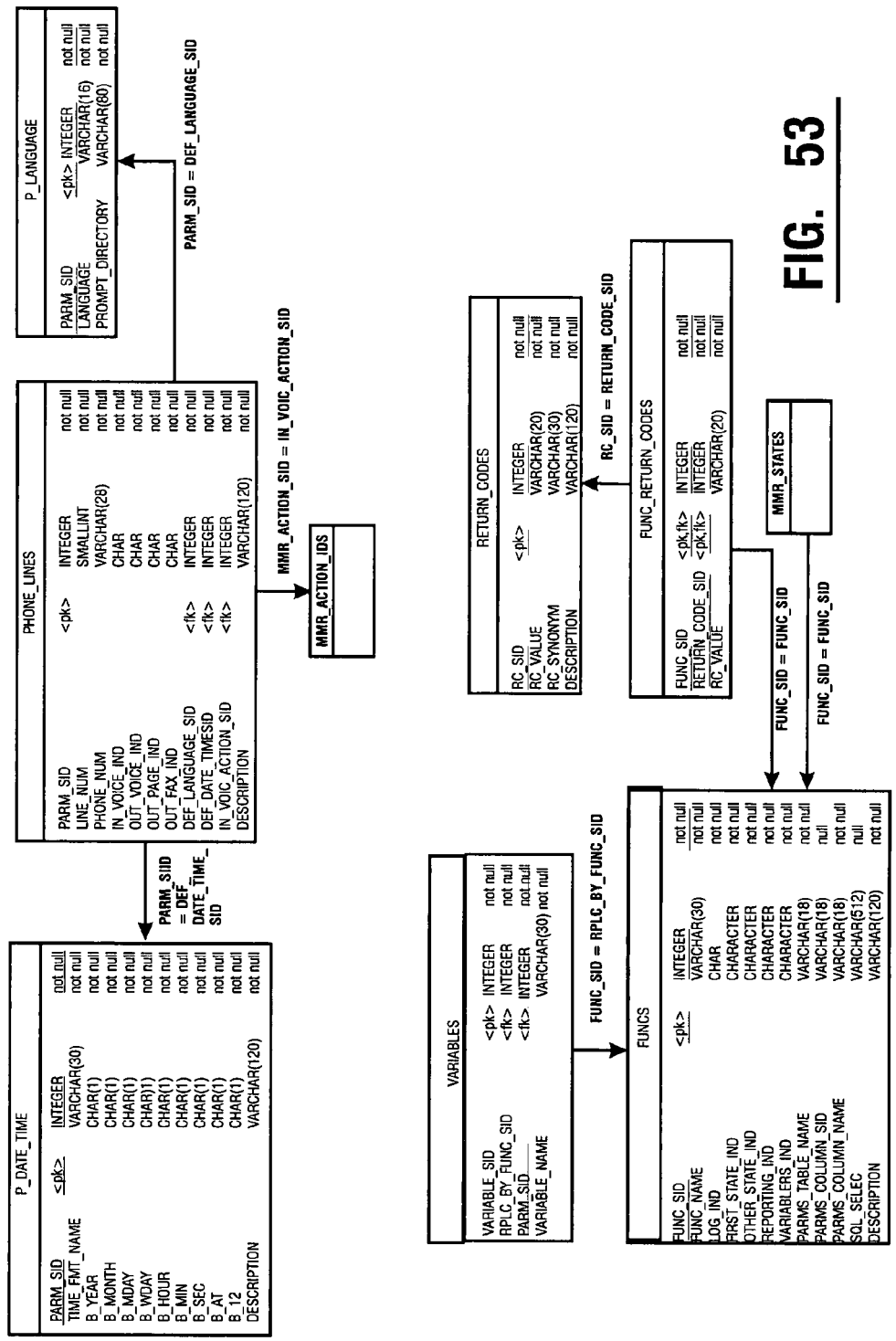

In situations where the MMR first begins resolving the actions to take there is no "previous function result" value. Therefore the MMR_ACTION_SED and the null previous function result, are used to resolve a unique record in the data store. This record provides FUNC_SID and PARM_SID values. The FUNC_SID value points to a unique table record associated with the particular function to be carried out. The PARM_SID value specifies the table record that supplies parameters to be used in carrying out the function. The layout of the function table records is shown in FIG. 53. The "parameter" tables are tables designated by the "P_" prefix. The parameter tables include values representative of information concerning contacts for messages, reading voice menus, telephone dialing (DMTF), date/time, language and schedules. The parameter values may be used to resolve other values for carrying out functions such as voice file indicator values and phone, fax, and pager numbers for servicers.

It should be noted that the exemplary embodiment preferably stores voice file instructions in more than one language. As a result, a particular servicer may receive voice files in Spanish, another servicer in English and so on. The language may be selected by input messages to the user interface. Similarly, "variables" records are maintained in the data store. Variables values can be resolved based on a parameter value which is resolved and used to execute a function. An example is sending a message comprised of selected variables, such as a text message in a different language. This enables the system to be used with ATMs in several regions or countries where different languages are spoken. In the exemplary embodiment the user interface includes a "Multi-Voice" interface produced by ITI Logiciel. Of course in other embodiments other interface devices comprised of hardware, software or both, may be used.

Often in response to messages output through the message dispatching portion of the user interface, a user will be requested to respond with an input message. This often involves selecting an appropriate button on a touch tone phone. Alternatively, the response may include sending a response message electronically from the ATM or other device. This response or "return code" determines the next function to be executed. The data values necessary for the MMR to resolve the next function to be carried out is determined from the "return codes" and "function return codes" table records, the layouts of which are represented in FIG. 53.

As represented in FIG. 56 the data store includes records which are representative of schedules of actions which are to be taken in response to a DSPP action message. The "schedule actions" records, the layout of which is shown, enable resolving schedule id values based on a parameter value and the action message value. The schedule id value (SCHEDULE_SID) enables resolving a value corresponding to "schedules" table record, the layout of which is also shown. These table records enable the MMR to resolve times for taking actions.

The data store also includes records that handle the operation of the servicer interface device of the MMR. As previously discussed the MMR STATES records are used to resolve the function and parameter values, including functions which are executed to notify servicers. The "notify handler" table records, the layout of which are shown in FIG. 52, are used to store values representative of data records that contain data for carrying out alternative actions if certain precursor steps cannot be carried out.

For example, if there is no notification made to a servicer, a "no notification method" value (NO_NOT_METHOD_SID) can be resolved by the MMR, which enables the MMR to resolve a "no notification handler" table record that provides the values that will be used to carry out a next action. Likewise, the "notify handler" table records include values which are used to resolve table records where no acknowledgement is received, as well as where a designated servicer is not reachable. Table record layouts for the records associated with handling these conditions are shown in FIG. 52. It should be noted that these record layouts include values corresponding to schedule table records, which enables the MMR to carry out the alternative actions in accordance with the stored time parameters.

Figure 26:
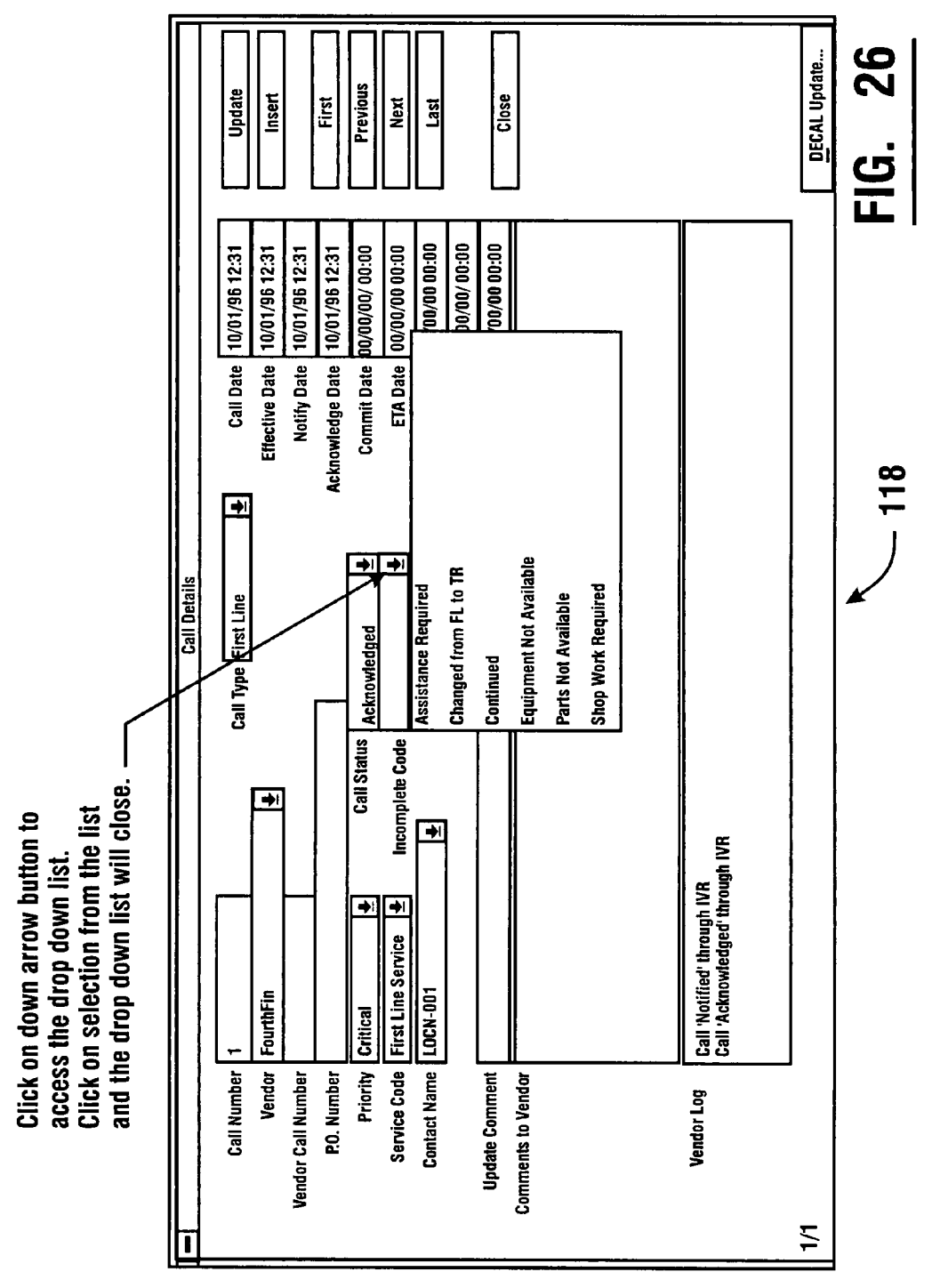

In the exemplary embodiment of the system the computer which operates the system is further operative to include in the data store records related to calls that have been made to servicers concerning particular conditions which exist at an ATM. The meaning of "calls" includes all methods of notifying servicers. FIGS. 26 and 36 show a call details window 118 generated on a display by the system, which shows the current status of the information associated with the call. For example, in FIG. 26 it can be noted that a particular service has been notified through the previously discussed interactive voice/response module (IVR) which serves as part of the servicer interface device of the system. Further, in FIG. 26 there is an indication that the call through the IVR has been acknowledged. FIG. 36 shows another example of a call details window in which a call has been made to a vendor. In this case the notification to the vendor was given through a DECAL® system operated by Diebold, Incorporated and was sent by way of an electronic message. This call details window further shows that the call has been acknowledged along with additional information that has been provided by the vendor system.

Database records concerning calls are maintained in the data store. The layout of the "calls record" tables is shown in FIG. 55. As with other historical data, records concerning closed calls are periodically reclassified as "call history" records, the layout of which is also shown in FIG. 55. Further "call history" records are later periodically reclassified as "archive call" records, the layout of which is also shown in FIG. 59.

Figure 35:
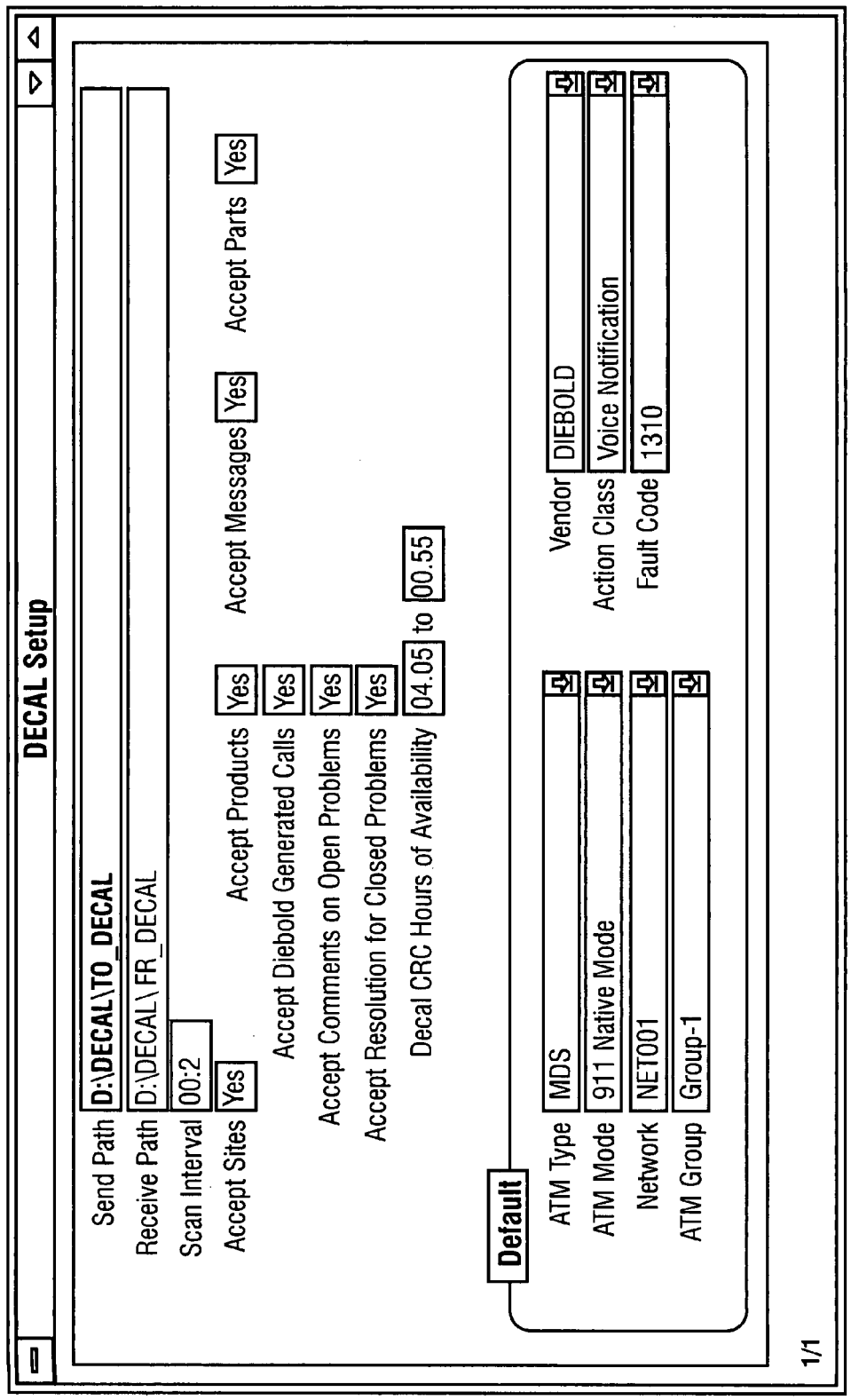
FIG. 35 is a set-up window generated by the software of an exemplary embodiment, the set-up window being used in connection with the interfacing of the system with a computer system operated by a vendor servicer.

The notification through a vendor system is also accommodated by the exemplary embodiment by enabling the user to establish in the data store particular information records required for communication with a vendor system. FIG. 35 shows a DECAL® set-up window 120 which is used in the preferred embodiment to set up communication to a system operated by Diebold, Incorporated, which tracks and provides information concerning ATM fault conditions. Of course, in other embodiments other types of systems may be similarly interfaced for purposes of communicating and receiving information concerning fault conditions at particular ATMs.

The MMR is also operative based on the configuration of the system to send and receive messages from a scheduler 38. The scheduler is a software process which receives messages from the MMR to schedule a future action. The scheduler then returns an appropriate message to the MMR at the scheduled time. If when the response message is sent by the scheduler to the MMR the conditions then notified to the MMR indicate the scheduled action is not needed, the steps associated with the action are not executed by the MMR.

The MMR resolves the schedule for future actions to be taken based on the database table records as previously discussed. The MMR is then operative to send the scheduler a message to schedule a return message based on the data resolved. This message has a different format, and is a different SME message type with a different union of structures than those messages previously discussed. The structures in the message to the scheduler contain the data that the scheduler needs to resolve the time and address to send back the responsive message to the requestor node of the MMR, as well as to resolve the content of the return message.

The message to the scheduler is sent by the MMR using the send message routine previously discussed. Likewise the send message routine is used by the scheduler to send its message to the MMR. Records are established in the data store concerning scheduled events. A layout for these records is shown in FIG. 56.

The described form of the scheduler component conducts a limited amount of activity, and functions primarily to hold and return the original message from the MMR. However, in other embodiments the scheduler may be configured to perform additional functions including activities necessary to resolve the need for the responsive message and the building of more complex message structures.

The exemplary embodiment provides the user with displays of activities which are scheduled to be performed in response to messages from the scheduler. An example of a scheduler window 122 is shown in FIG. 34. The scheduler window indicates particular actions that will be taken and the time when the actions are scheduled to be taken in response to the particular condition which has occurred at an ATM. These conditions are identified by the trouble ticket number assigned by the MMR to the ATM message. Further, as shown in FIG. 34 the scheduler window 122 provides confirmation that the action has been sent to the requester node. Of course, if the action scheduled is no longer needed the MMR will take no action in response to the message from the scheduler. A user may also selectively cancel certain actions using an input device.

A further novel aspect of the exemplary embodiment is the ability to test the operation of the system. This is accomplished through the creation of records representative of phantom ATMs in the data store. These phantom ATMs may have particular fault actions established for fault conditions. As with actual ATMs, the user is enabled by watching the displays generated by the system associated with the scheduling function or by actually allowing the system to perform, to test that the system is operating as expected. In addition, the exemplary embodiment enables a user to generate fault messages for actual ATMs within the system. The user is thereby enabled to watch how the system reacts to the particular fault messages. To prevent unnecessary responses to test inquiries a user may cancel particular actions before they occur through the scheduler or by temporarily changing the actions sequence which occurs responsive to the fault using an input device connected to the system.

Figure 33:
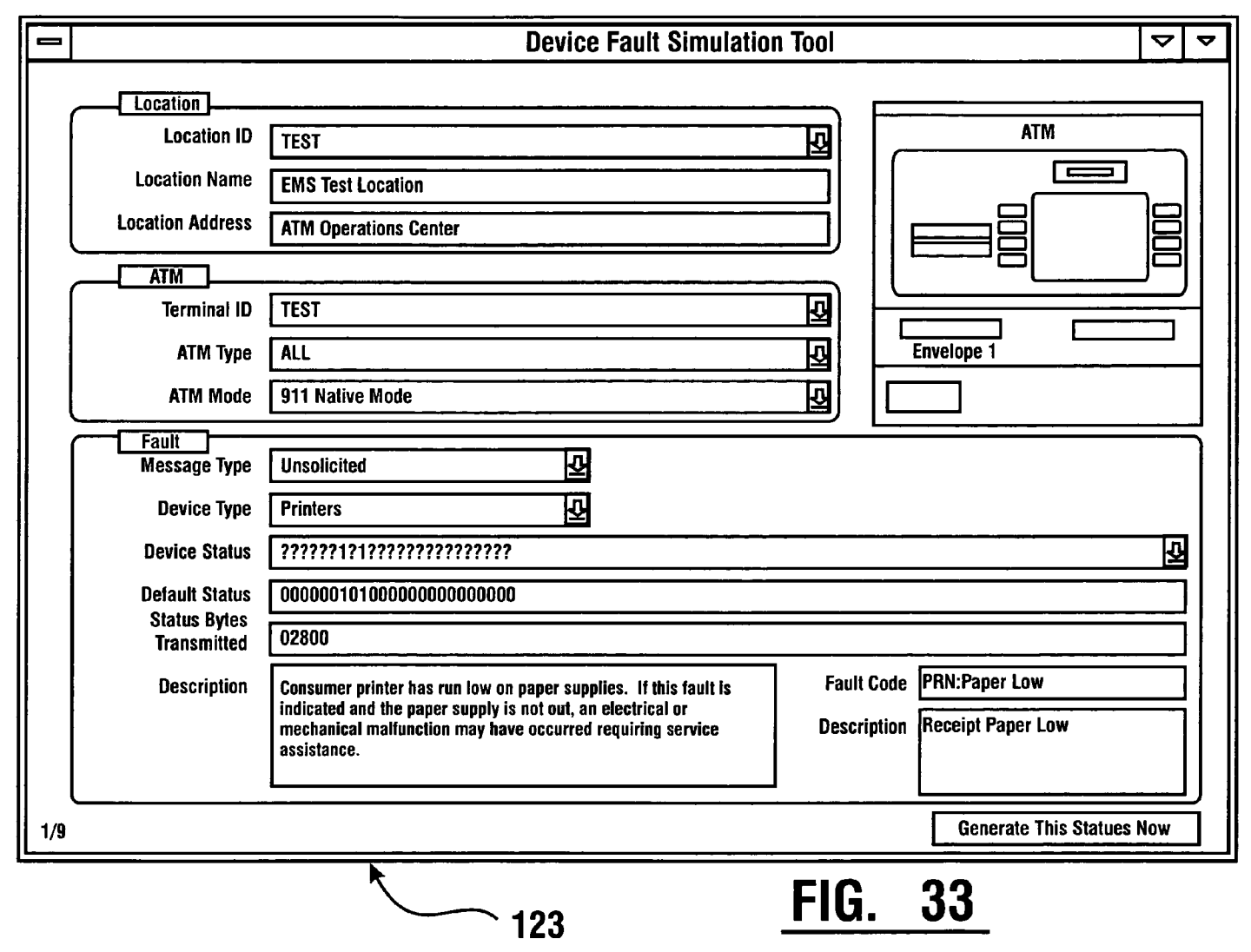

The user is enabled to generate faults from phantom ATMs or actual ATMs using a device fault simulation tool. The user operates the device fault simulation tool through a test window designated 123 in FIG. 33. The user is enabled to input values using an input device in the test window indicative of a phantom ATM. The user can further establish fault actions for this particular phantom ATM and observe that the fault actions are carried out properly. Alternatively, a user may enter information for an actual ATM within the system and enter a particular type of fault status message. By selecting the generation of this status message the user may then watch the operation of the system to verify that the action to be taken by the system in response to this message actually occurs. This feature provides a user with greater assurance that the system is operating in the manner that is intended.

The device fault simulation tool operates by producing a message responsive to the user's input that is comparable to a message produced by a line driver. This message is then transmitted to the MGR and reformatted. It is handled in the same manner as a real ATM condition message. This enables accurately testing the system.

As indicated in FIG. 5, several types of message mediums may be used to send a message to the particular entity who has responsibility for an ATM exhibiting a fault condition. This entity may be an individual in Operations at the institution operating the ATM. In addition, the message may also be sent to a servicer who has responsibility for the ATM at the time that the condition arose. This is done based on the information in the data store and the current time as determined from the clock device within the computer which operates the event management system.

In many instances it is desirable for notification to be given to persons who operate the computer system prior to giving notice to a servicer so that the Operations person may determine if the message is being generated because of activities the institution is engaged in and not a problem with the ATM. Giving such an indication first will enable a person in Operations to cancel the particular trouble ticket before a servicer is notified. This can be accomplished either by a user who has a computer with a display and an input device connected in the network with the event management system, or through an message input through the interface device associated with the multimedia reporter.

When the multimedia reporter is activated to send a message to an entity, a number of different parameters are available for inclusion in the message. FIG. 17 is an exemplary table of information variables that are available within the MMR for inclusion in messages to be sent to a particular entity that is to be notified of an ATM condition. This information may be tailored to the particular entity to be notified to provide only the information needed for their purposes. For example, the MMR may be configured to provide fax messages that contain selected ones of these variables. Other variables may also be used, including foreign language equivalents of certain fields. An embodiment uses a "multi-fax" interface from ITI Logiciel for sending fax messages. In other embodiments other communications devices comprised of hardware, software or both, may be used.

Figure 18:
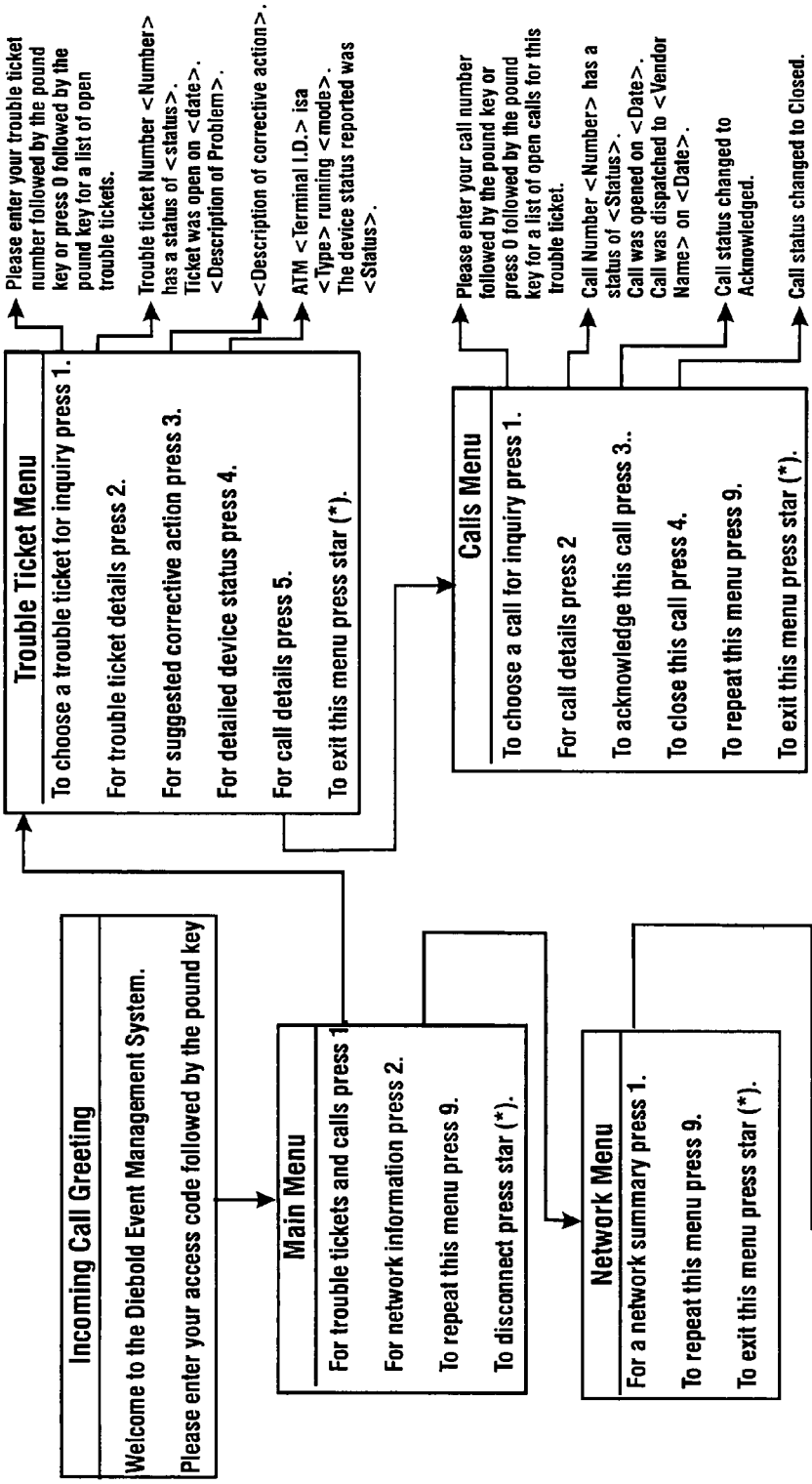
FIG. 18 is a schematic flow diagram of the processes executed by an interface device used in the system of an exemplary embodiment.

The interactive voice response module (IVR) of the MMR includes a message dispatching portion which operates to output messages to a user. The IVR is also operative in the exemplary embodiment to accept input messages from a user. An example of steps executed by the IVR in dispatching and accepting messages is represented schematically in FIG. 18. As shown in FIG. 18, a user contacting the interface device is first requested to enter an access code to insure that access is authorized. The user then inputs data through a touch tone phone to indicate whether they wish to access trouble ticket information or network information. As shown in FIG. 18, if network information is requested a summary is provided of the overall number of trouble tickets which are open. Of course, in alternative embodiments the system may be configured so as to provide information selectively by controller or area of responsibility. The variables which are included as part of the messages are also determined by the configuration of the records in the data store.

Alternatively, as shown in FIG. 18, if trouble ticket information is requested another menu is presented. This menu enables the user to obtain information about trouble tickets as well as corrective action. The user is further enabled to select call details which then outputs a calls menu. This menu enables a user to selectively obtain information about a particular service call, as well as to acknowledge the service call, to selectively change the status of the call to closed, or to indicate another status. In this way a servicer or other entity notified of a condition at an ATM may indicate that they have received the particular message. Further, if the entity notified has responsibility for correcting the condition at the automated banking machine, they may use the calls menu to input messages which indicate various stages in the course of correcting the condition.

It should be understood that in alternative embodiments additional options may be included in the menus. Such indications may include for example in the calls menu that the entity has arrived at the site and is commencing to service the machine. Alternatively, the servicer may indicate that they are waiting for bank personnel to arrive at the site, or that they are unable to perform corrective action because of a need for parts or other items. The options for input messages in response to the calls menu or trouble ticket menu can be configured in alternative embodiments to suit the needs of the particular user and operator of the system.

Figure 19:
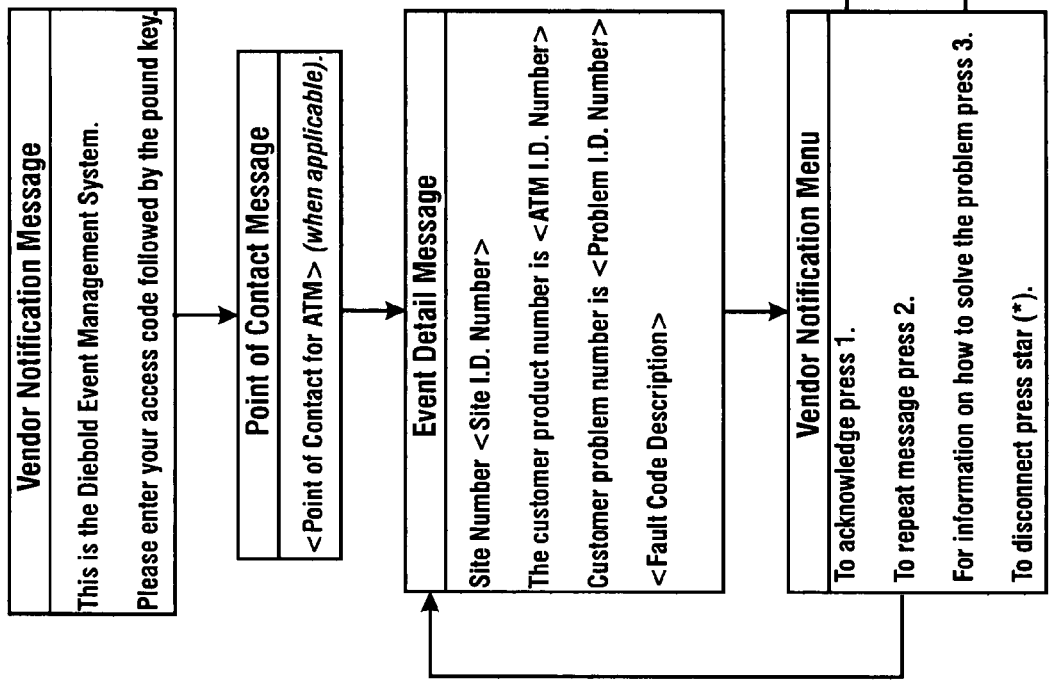
FIG. 19 is a schematic view of messages forwarded to a servicer by the interface device of an exemplary embodiment of the system to notify the servicer of a fault condition.

FIG. 19 schematically shows a sample vendor notification message as presented through the interface device of the multimedia reporter. The vendor notification message schematically shown in FIG. 19 is intended to elicit an acknowledgement of the message. The message flow schematically represented in FIG. 19 is particularly appropriate where a servicer is notified through a phone call from the multimedia reporter. In this manner a servicer is requested to acknowledge notification of the call and is provided with the information necessary to begin the corrective action.

Figure 20:
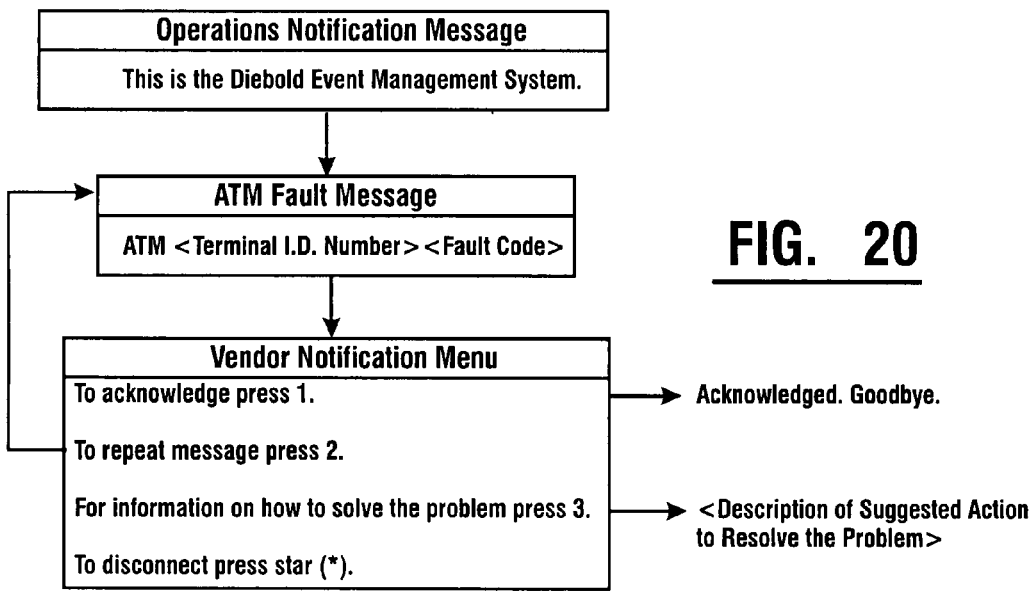
FIGS. 20 and 21 are schematic views of messages sent by the interface device of an exemplary embodiment to communicate information concerning a fault condition of a banking machine to entities responsible for operation of the banking machine exhibiting the fault condition.

FIG. 20 is a schematic view of a message flow from the interactive voice/response unit to Operations where a particular entity associated with the operation of the machine needs to be notified that a condition has occurred. Such a message may be appropriate where an in-house service performs service activities related to an ATM.

Figure 21:
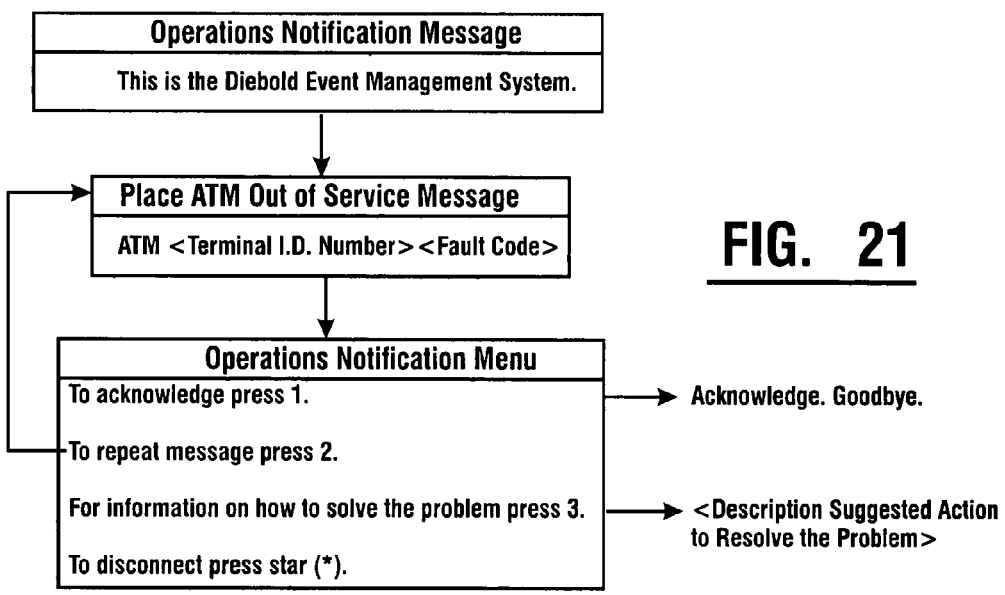

FIG. 21 is also a schematic view of a message sent by the interface device associated with the multimedia reporter to an entity associated with the operation of an ATM exhibiting a fault condition. In this case the fault condition is of the type that warrants taking the ATM out of service. Such a message may be sent to a computer center where the host is operated to affect removing the banking machine from the network.

Figure 22:
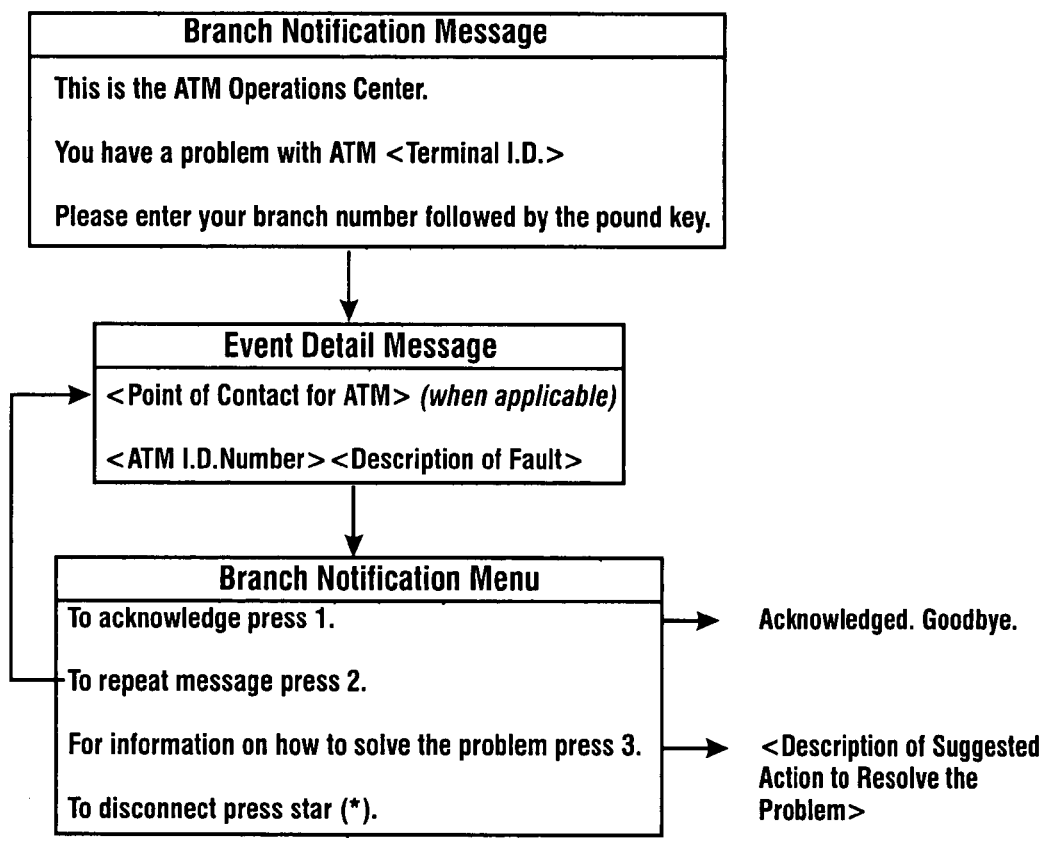
FIG. 22 is a schematic view of a branch notification message generated by the interface device of an exemplary embodiment to notify a person at a facility where a banking machine is located of a problem with a banking machine.

FIG. 22 is a further schematic representation of a message sent by the interface device which in this instance is sent to a location or branch where the ATM is located. Such a message is sent if the condition is generated during business hours of the branch as indicated by the location record in the data store corresponding to where the ATM is located. Such a message may be generated where the fault condition is of a type which branch personnel may correct. Of course it will be understood if the fault condition is of a type that is catalogued in the data store as one which requires greater skill to correct than may be provided by personnel at the branch, the event management system is operative to send a message to an appropriate ATM servicer.

The MMR is also operative to establish records in the data store related to problem actions. Such problem actions records include data values which are representative of problems of a particular character, the responsive action taken and the time of taking the responsive action. The layout of the "open problems actions" records is shown in FIG. 55.

After problems are responded to they are periodically reclassified as "problem history actions" records. The table record layout for these records is also shown in FIG. 55. Finally, problem history actions records are periodically reclassified as "archived problem actions" records. The layout of these records is shown in FIG. 59. The periodic timing of reclassifying the problem action records is determined by the user's requirements, but generally the corresponding records concerning problems, calls and actions are generally reclassified on similar schedules.

The archived problem, call and actions records remain in the data store for purposes of analysis. A further advantage of the preferred embodiment is that it enables a user to conduct analysis of the stored information for purposes of evaluating the performance of the machines connected to the system as well as the performance of servicers who service machines connected to the network. These standardized reporting features are indicated under the category "reporting" in the main menu window 66 generated on a display by the event management system.

Figure 37:
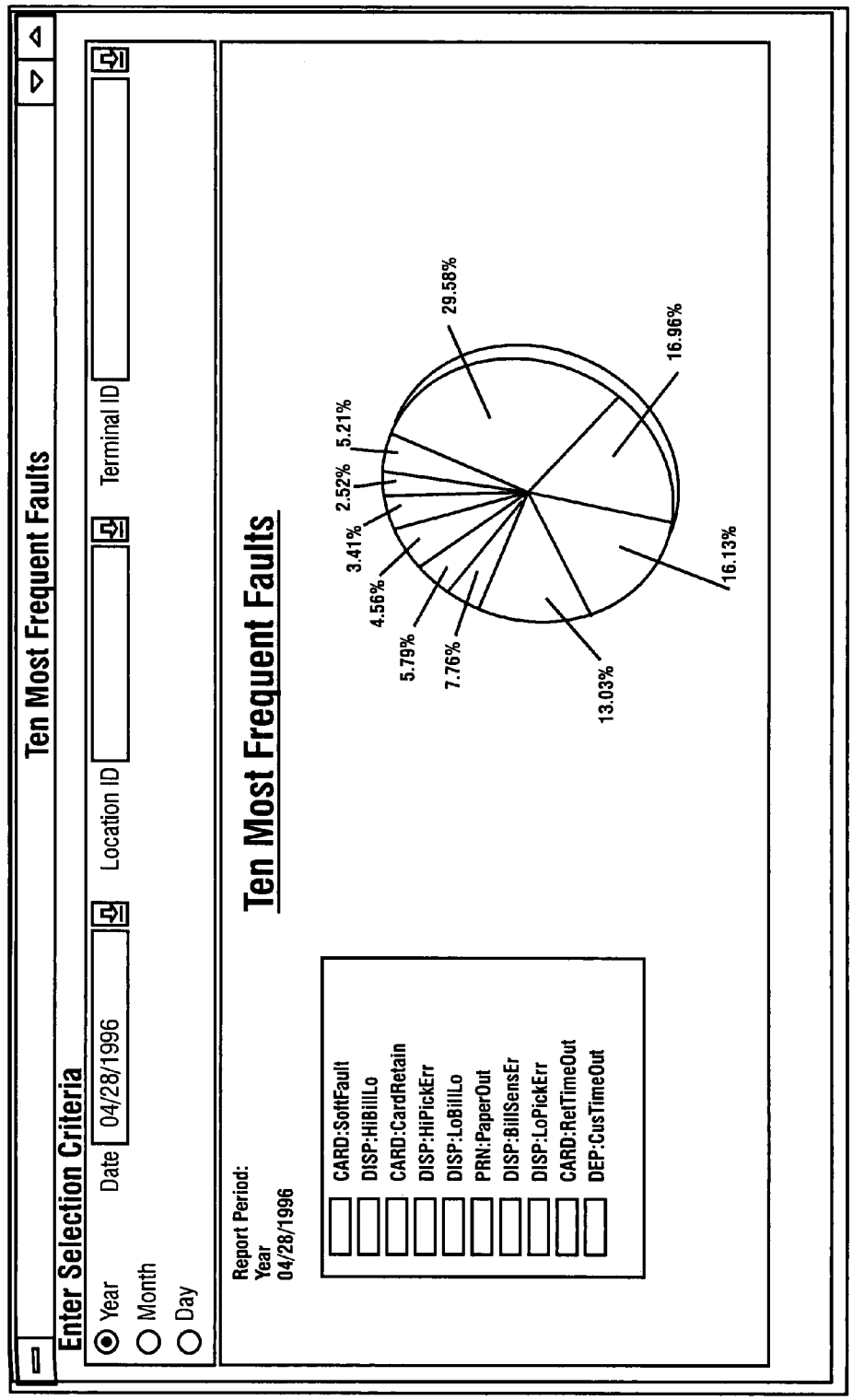

The MMR of the event management system is preferably configured to provide record data indicative of the 10 most frequent faults which are generated by machines. This is reflected in a fault frequency analysis window 124 shown in FIG. 37. This analysis provides a user with an indication of the 10 most frequent faults. This may be selectively calculated by the computer and provided system wide, or by location or terminal. Further, this information may be selectively provided either by the year, month or day in accordance with inputs to the system by the user.

Figure 38:
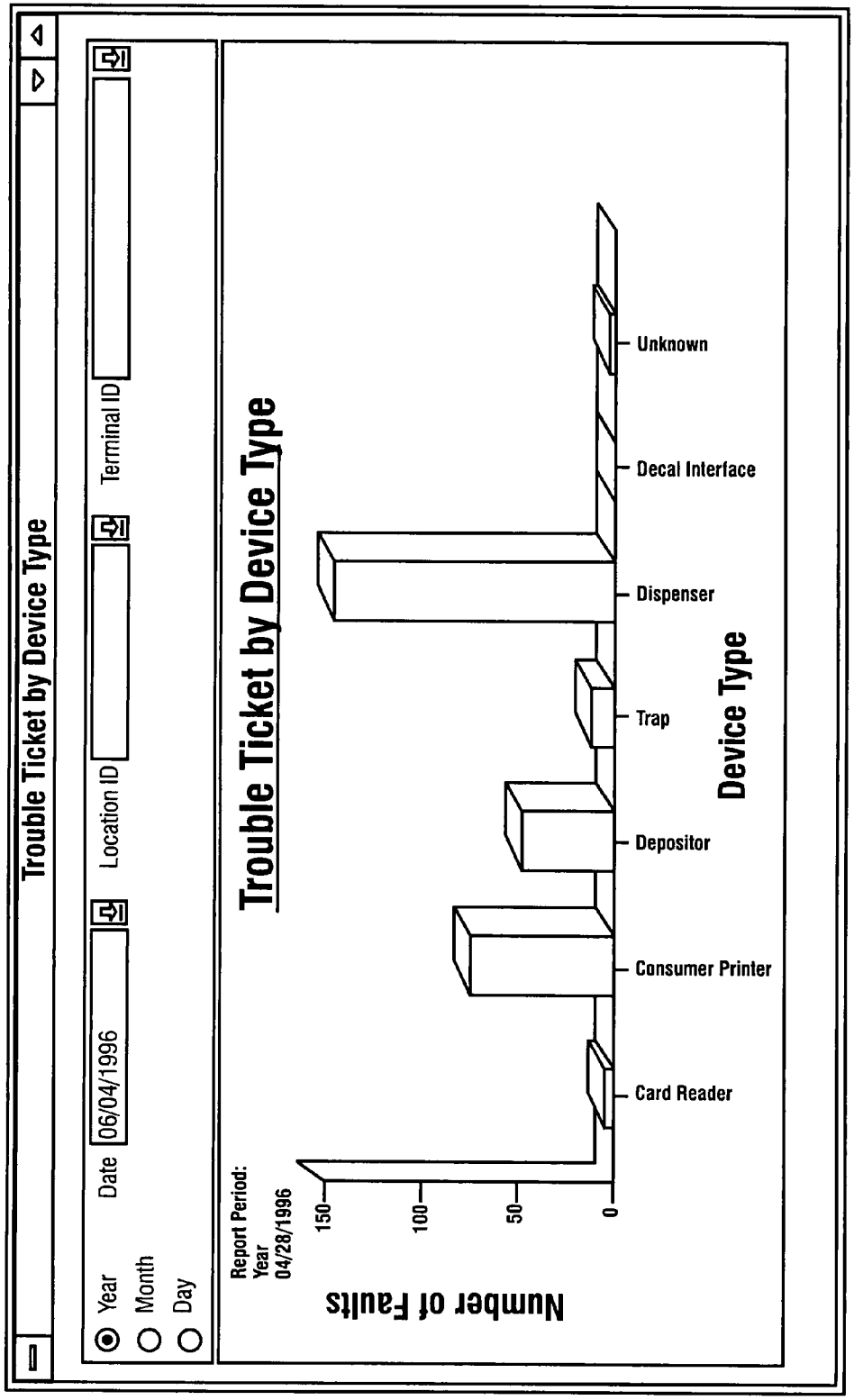

The event management system is further configured to calculate and provide a trouble ticket by device type window 126 shown in FIG. 38. Again, the system is operative to provide a graphic display of the number of faults by device type system wide, by location or by terminal. This data can also be reported by month, day or year as selected by the user.

Figure 39:
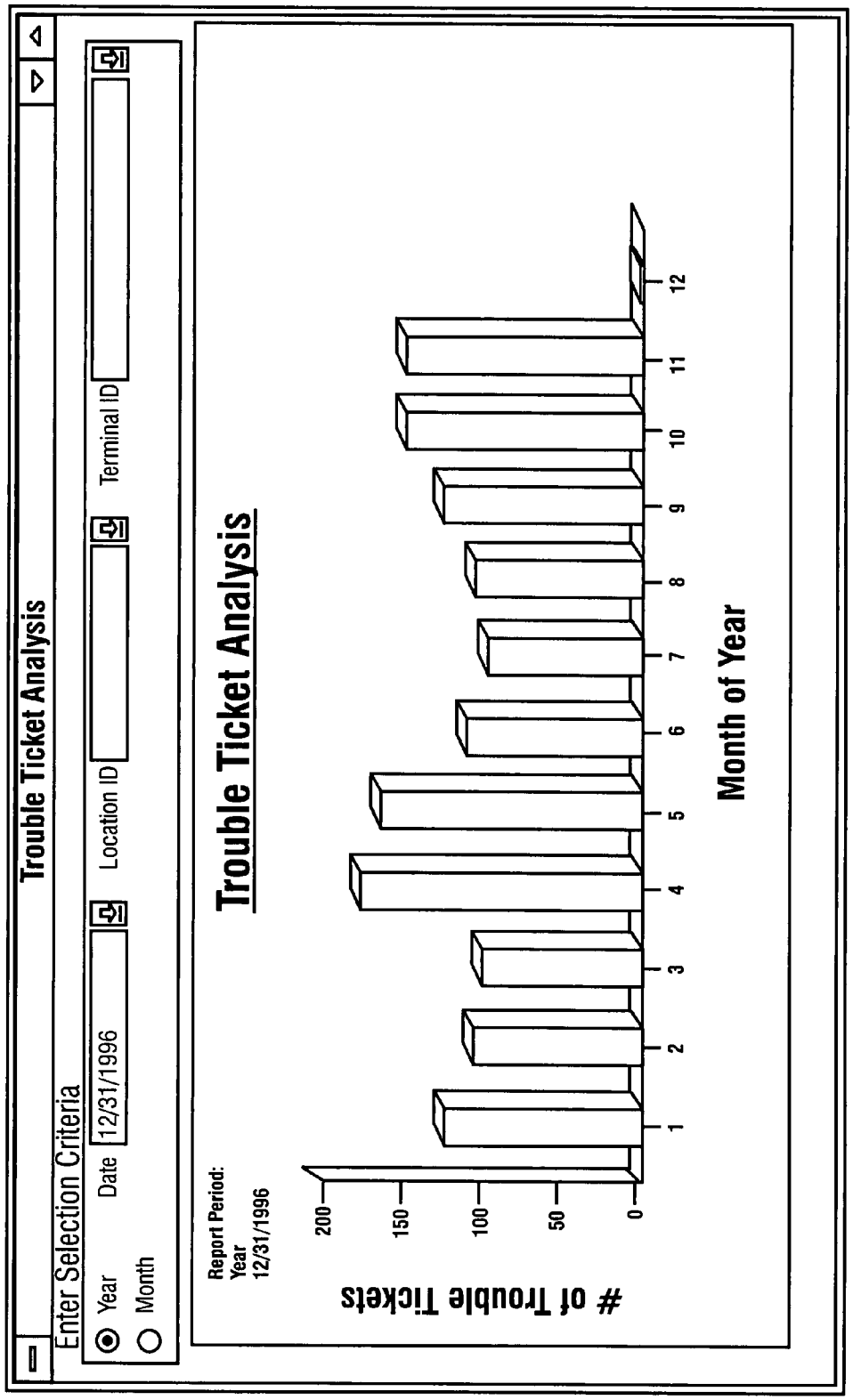
Figure 40:
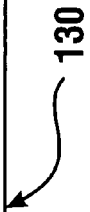

Another standardized reporting feature includes a trouble ticket analysis window 128 shown in FIG. 39. The trouble ticket analysis window provides an indication of the number of trouble tickets system wide by location or by terminal during a month or year. A further standardized reporting feature in the event management system is a trouble ticket summary report which is provided in a trouble ticket summary report window 130 shown in FIG. 40. The trouble ticket summary report window is operative to provide information on the resolution of trouble tickets during a selected period of time. The summary can be provided in accordance with selection criteria including the character of the calls as either first or second line, the location, the network, the vendors or the particular status which was involved. This report feature enables the user of the system to analyze numerous aspects of the performance of machines and service providers.

Figure 41:
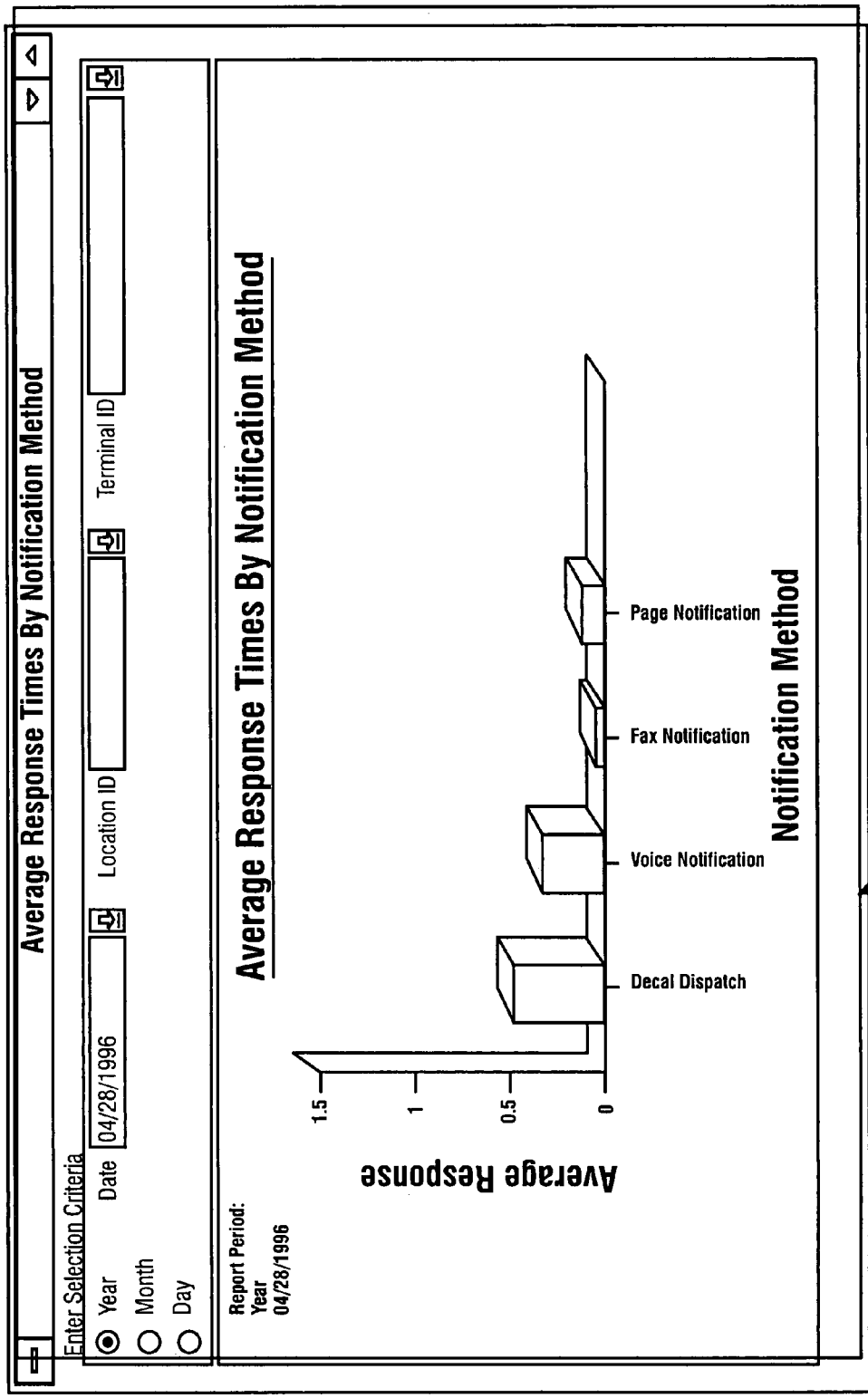

An average response time report is also provided by the preferred embodiment of the event management system. The information on average response times is shown as an average response time by notification method window indicated 132 in FIG. 41. The preferred embodiment enables a user to display average response times by various notification methods for locations or terminals and for selected periods of a particular day, month or year.

Figure 42:
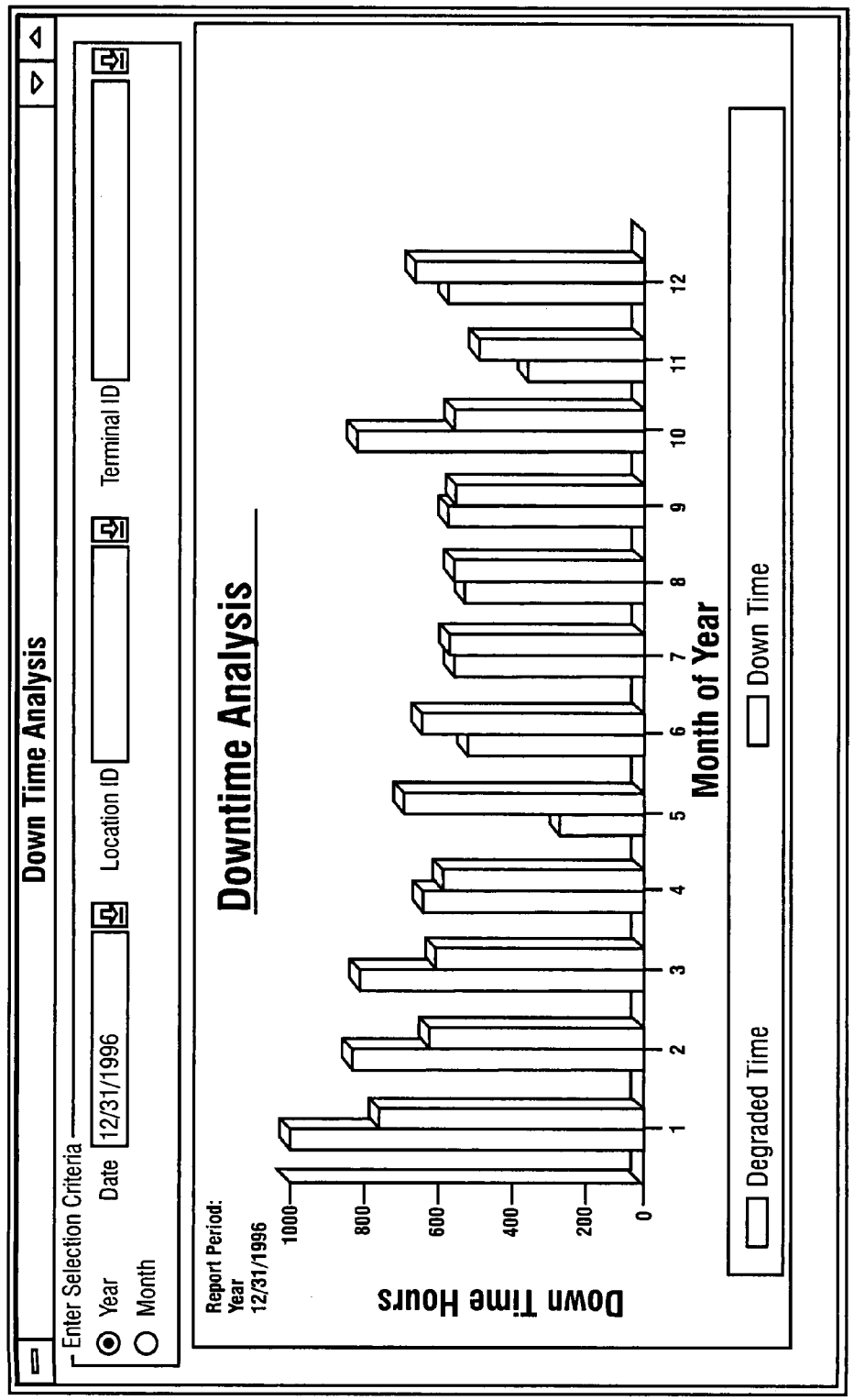

A further aspect of the preferred embodiment of the event management system is the ability to conduct downtime analysis. As previously discussed, certain fault conditions place an ATM out of service while others place the ATM in a degraded operation mode. The event management system is programmed to provide downtime analysis which includes both downtime and degraded time for particular locations, terminals or the entire system. This information can be provided during selected time intervals of particular months or for an entire year based on user inputs. The information is provided graphically through a downtime analysis window indicated 134 in FIG. 42.

An ATM summary report window indicated 136 in FIG. 43 is generated in response to the event management system conducting an analysis of incident response times, degraded time and downtime, and availability of banking machines connected to the event management system. This information may be selectively provided for locations, terminals as well as the particular machines connected to the system. The information may be provided over a reporting period of a day, month or year.

The event management system of the preferred embodiment is further operative to provide a user with report data concerning ATM availability. This ATM availability data is provided to the user in an ATM availability report windows indicated 138 in FIG. 44. The ATM availability report window provides a user with ATM availability and the cause of any downtime or degraded time. This can be provided for each terminal for which a report is selected based on reporting periods of a month, day or year.

Further, the MMR of the event management system of the preferred embodiment is operative to provide a report of overall systems availability for banking machines connected to the system. This overall systems availability is provided in the form of a systems availability report displayed in a systems availability report window designated 140 in FIG. 45. The systems availability report window provides a summary of all the causes of downtime and degraded time throughout the system over a period selected by the user. In an embodiment the selected period may be a day, month or year.

The report data which is provided by the system will preferably provide it in the form of report windows on a display as previously disclosed, and may alternatively provide it in other ways such as a hard copy record on paper. Such report data may also be provided on tape or other machine readable media or may be transmitted electronically to other locations. Of course, and as previously discussed, because the preferred embodiment of the event management system is used in a client/server environment, any computer connected to the network with the computer that runs the event management system software has access to the report data.

As shown in the foregoing description, the exemplary embodiment enables an operator of an ATM network to automatically and reliably dispatch messages to entities who need to be notified of conditions which occur at banking machines so that fault conditions may be responded to and corrected in a prompt and proper manner. The exemplary embodiment also enables tracking progress towards resolution of the conditions which cause the fault signals to be generated, and maintains records of activities toward the resolution of such conditions in a manner which may be reviewed and analyzed so that improvements may be achieved in the overall operation of the system.

It should be understood that while embodiments have been described with regard to a preferred embodiment which operates in a particular manner and which includes a number of features and capabilities, other embodiments may be operated using other types of systems and programming techniques. Other embodiments may achieve the results described herein using other components and systems, and through the use of different methods and processes. Further, while the foregoing discussion has centered on the system sending messages to and receiving responses from servicers who repair or otherwise conduct some activity with regard to an ATM, it should be understood that the term "servicer" encompasses any entity that acts to receive messages from or to input messages to the system.

Thus, the new fault tracking and notification system achieves the above stated objectives, eliminates difficulties in the use of prior devices, systems and methods, solves problems and attains the desirable results described herein.

In the foregoing description certain terms have been used for brevity, clarity and understanding however no unnecessary limitations are to be implied therefrom because such terms are for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means capable of performing the recited function, and shall not be deemed limited to the particular means shown in the foregoing description as performing the function or mere equivalents thereof.

Having described the features, discoveries and principles of the invention, the manner in which it is constructed and operated and the advantages and useful results attained, the new and useful structures, devices, elements, arrangements, parts, combinations, systems, equipment, operations, methods, processes and relationships are set forth in the appended claims.

We claim:

1. A method comprising:
    a) outputting through a display device responsive to operation of a computer, indicia corresponding to a cash dispensing automated banking machine including a card reader operative to read data from cards and to utilize the data read from cards by the card reader, wherein the indicia includes a graphical representation of a visual appearance of the automated banking machine, wherein the graphical representation shows a visual appearance of a plurality of hardware devices included in the automated banking machine;
    b) receiving with the computer, data indicative of a condition of at least one of the plurality of hardware devices included in the automated banking machine;
    c) outputting through the display device responsive to operation of the computer, indicia representative of which of the plurality of hardware devices is associated with the condition.

2. The method according to claim 1, wherein in (b) the data is representative of a fault condition of the at least one hardware device.

3. The method according to claim 1, wherein in (c) the indicia further includes indicia representative of the status of the at least one hardware device.

4. The method according to claim 1 wherein in (a) the visual appearance is of a simulated automated banking machine.

5. The method according to claim 1 wherein in (b) the data is indicative of a fault condition with the at least one hardware device, and wherein (c) further includes outputting indicia representative of the fault condition.

6. The method according to claim 5 and further comprising:
    d) outputting through the display device indicia corresponding to actions to be taken in response to the fault condition.

7. Computer readable media, including computer executable instructions, wherein the instructions are operative to cause a computer to carry out a method comprising:
    a) outputting through a display device responsive to operation of the computer, indicia corresponding to a cash dispensing automated banking machine including a card reader operative to read data from cards and to utilize data read from cards by the card reader, wherein the indicia includes a graphical representation of a visual appearance of the automated banking machine, wherein the graphical representation shows a visual appearance of a plurality of hardware devices included in the automated banking machine;
    b) receiving with the computer, data indicative of a condition of at least one of the plurality of hardware devices included in the automated banking machine;
    c) outputting through the display device responsive to operation of the computer, indicia representative of which of the plurality of hardware devices is associated with the condition.

\* \* \* \* \*